United States Patent
Chapman et al.

(10) Patent No.: US 10,107,043 B1
(45) Date of Patent: Oct. 23, 2018

(54) SUPERABRASIVE ELEMENTS, DRILL BITS, AND BEARING APPARATUSES

(71) Applicant: US Synthetic Corporation, Orem, UT (US)

(72) Inventors: Mark Pehrson Chapman, Provo, UT (US); Damon Bart Crockett, Mapleton, UT (US); Craig Hodges Cooley, Saratoga Springs, UT (US); Jair Jahaziel Gonzalez, Provo, UT (US); Jedediah Jess Campbell, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 752 days.

(21) Appl. No.: 14/620,154

(22) Filed: Feb. 11, 2015

(51) Int. Cl.
| | |
|---|---|
| *C09K 3/14* | (2006.01) |
| *E21B 10/573* | (2006.01) |
| *B24D 99/00* | (2010.01) |
| *B24D 3/00* | (2006.01) |
| *B24D 3/02* | (2006.01) |
| *B24D 11/00* | (2006.01) |
| *B24D 18/00* | (2006.01) |

(52) U.S. Cl.
CPC ........ *E21B 10/5735* (2013.01); *B24D 99/005* (2013.01)

(58) Field of Classification Search
USPC .......................................... 51/307, 293, 309
See application file for complete search history.

(56) References Cited

U.S. PATENT DOCUMENTS

| | | |
|---|---|---|
| 4,268,276 A | 5/1981 | Bovenkerk |
| 4,410,054 A | 10/1983 | Nagel et al. |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton |
| 5,154,245 A | 10/1992 | Waldenstrom |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |

(Continued)

FOREIGN PATENT DOCUMENTS

WO 2012145586 10/2012

*Primary Examiner* — James E McDonough
(74) *Attorney, Agent, or Firm* — FisherBroyles, LLP

(57) ABSTRACT

A superabrasive element includes at least one superabrasive table including at least one coupling projection having a narrow portion and a wide portion having a greater width than the narrow portion. The superabrasive element includes a substrate defining at least one coupling recess, the at least one coupling recess extending from a narrow portion to a wide portion. At least a portion of the at least one coupling projection is disposed in the coupling recess and the at least one coupling projection and the at least one coupling recess mechanically couple the at least one superabrasive table to the substrate. A drill bit includes a superabrasive element having a superabrasive table.

20 Claims, 29 Drawing Sheets

(56) References Cited

U.S. PATENT DOCUMENTS

| | | | |
|---|---|---|---|
| 5,544,713 A | | 8/1996 | Dennis |
| 5,662,720 A | * | 9/1997 | O'Tighearnaigh ........ B22F 7/06 |
| | | | 51/295 |
| 6,793,681 B1 | | 9/2004 | Pope et al. |
| 7,866,418 B2 | | 1/2011 | Bertagnolli et al. |
| 8,261,858 B1 | | 9/2012 | Atkins et al. |
| 8,297,382 B2 | | 10/2012 | Bertagnolli et al. |
| 8,663,349 B2 | | 3/2014 | Sani et al. |
| 2011/0023375 A1 | * | 2/2011 | Sani .................. B22F 3/24 |
| | | | 51/297 |
| 2011/0174549 A1 | * | 7/2011 | Dolan ................ E21B 10/5673 |
| | | | 175/428 |
| 2014/0110180 A1 | * | 4/2014 | Yu .................... E21B 10/5735 |
| | | | 175/374 |

* cited by examiner

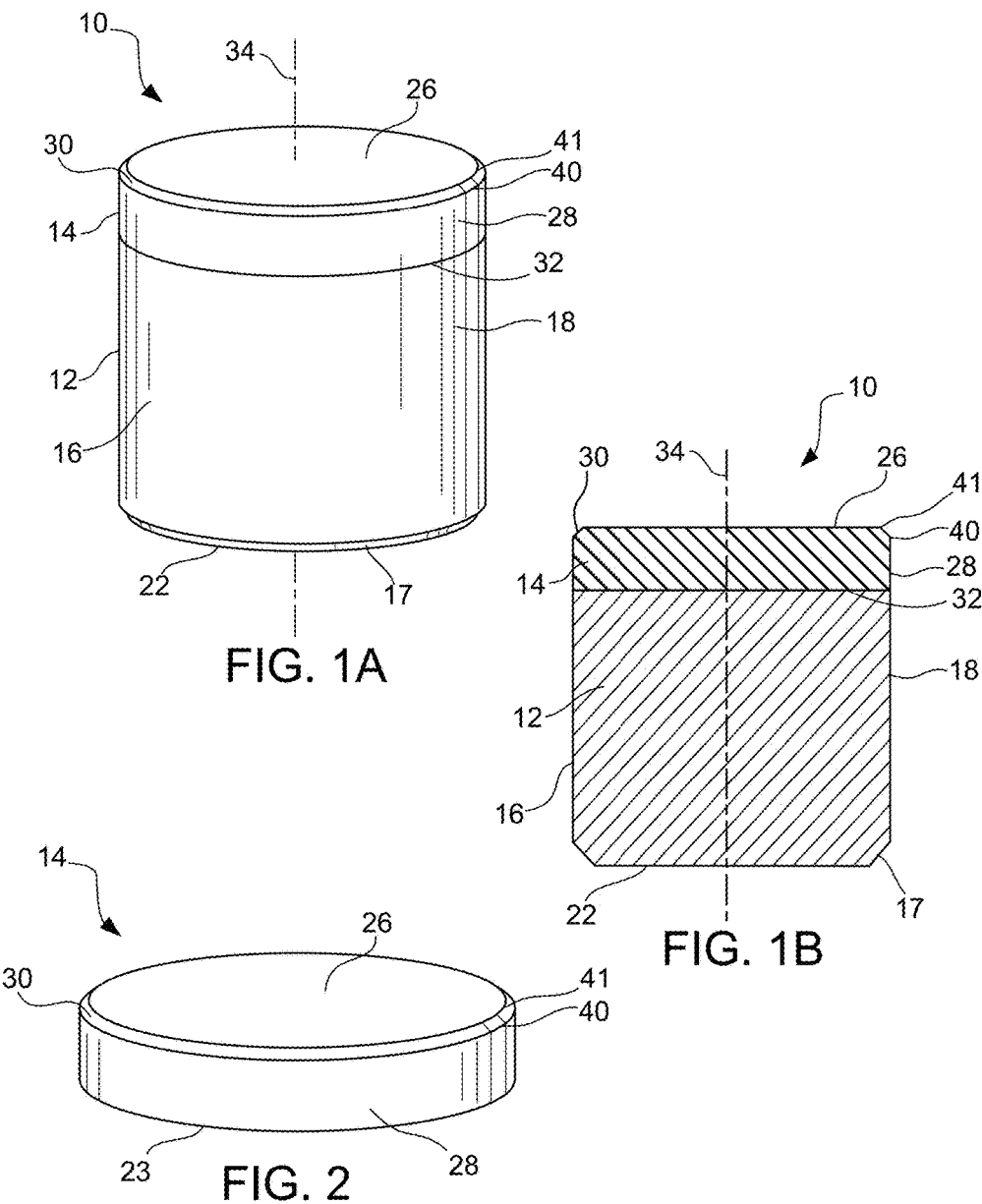

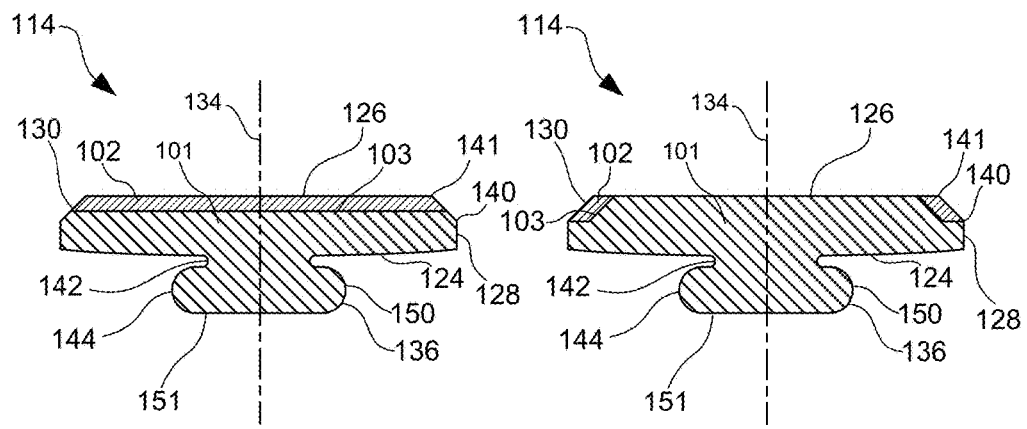
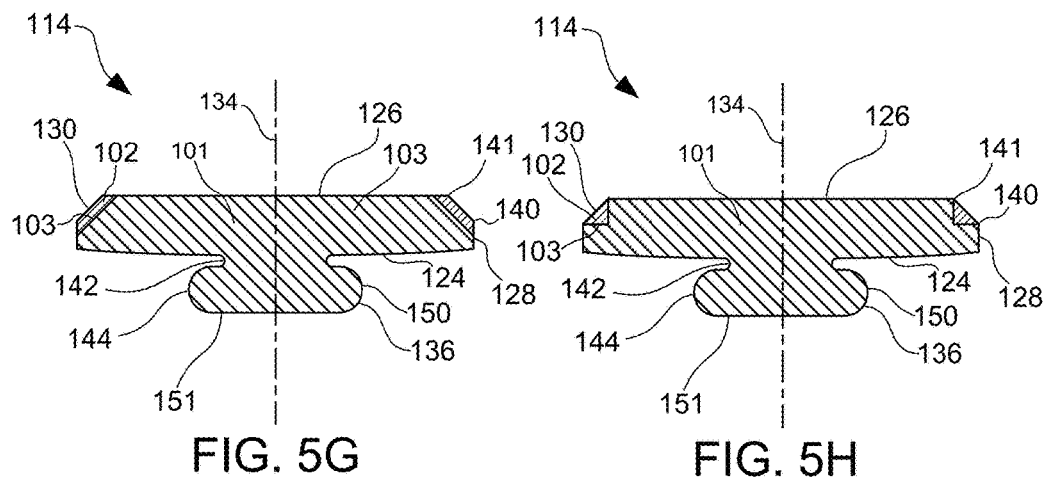

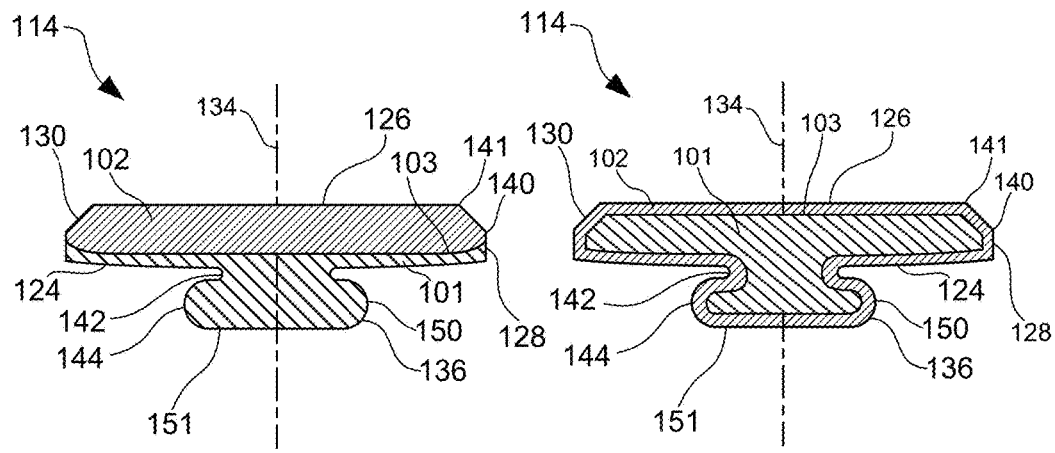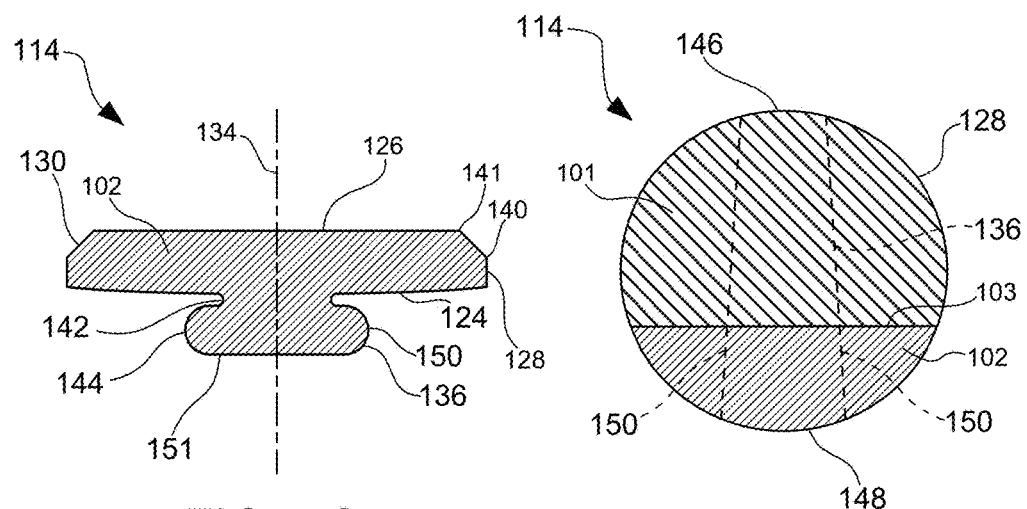

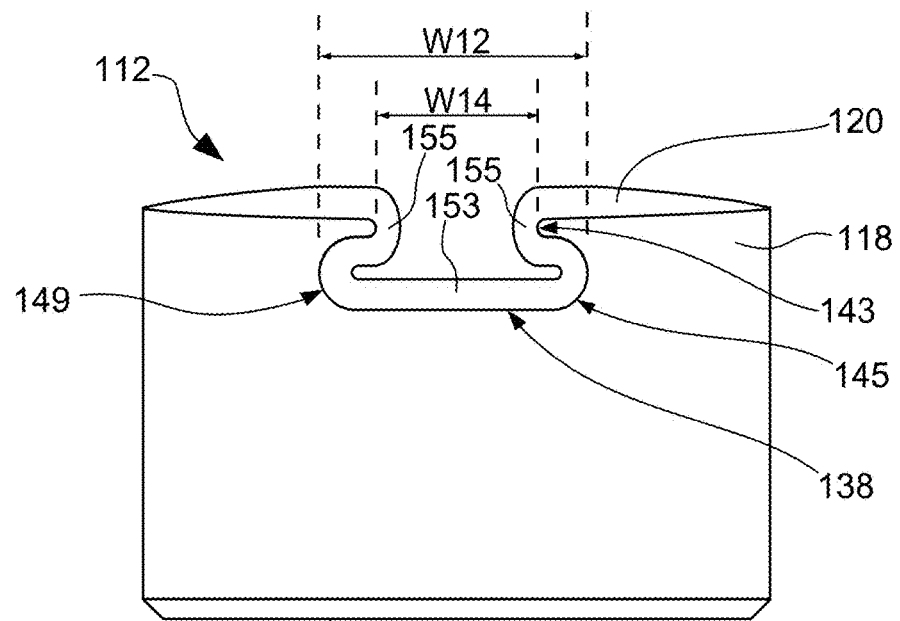
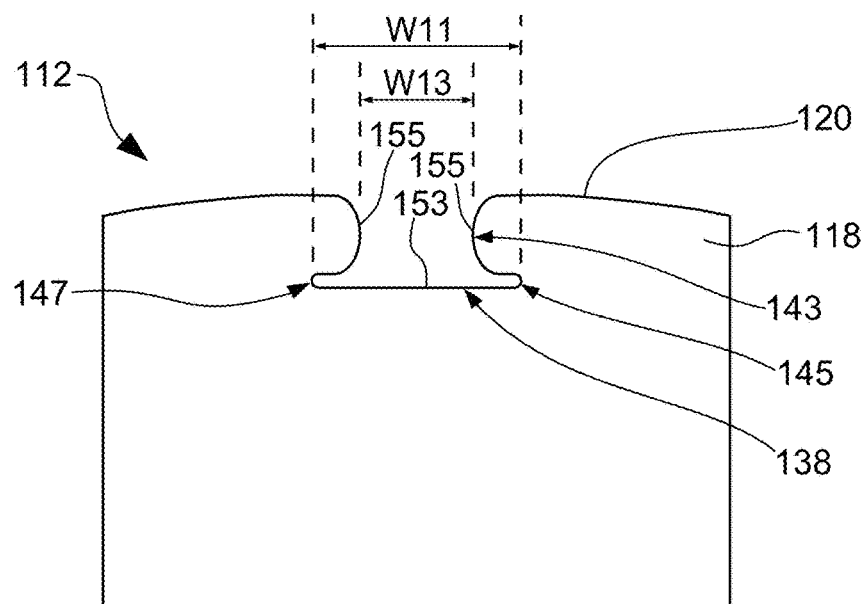

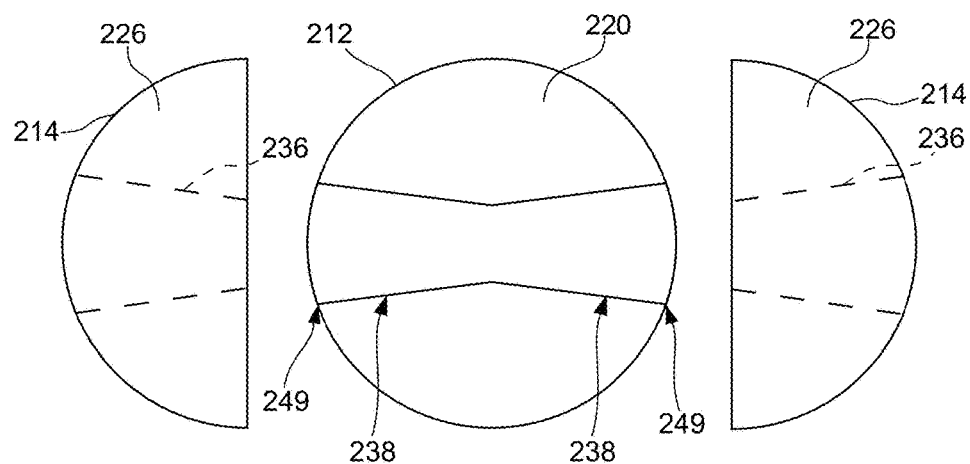
FIG. 9A
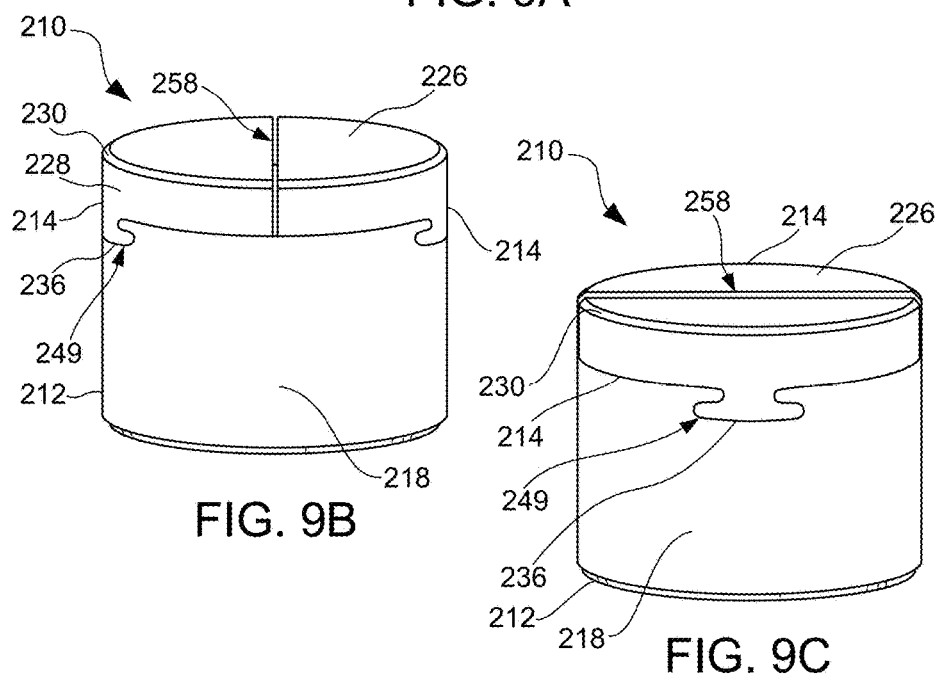
FIG. 9B
FIG. 9C

SUPERABRASIVE ELEMENTS, DRILL BITS, AND BEARING APPARATUSES

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems.

Conventional superabrasive materials have found utility as superabrasive cutting elements in rotary drill bits, such as roller cone drill bits and fixed-cutter drill bits. A conventional cutting element may include a superabrasive layer or table, such as a PCD table, that is formed and bonded to a substrate using an ultra-high pressure, ultra-high temperature ("HPHT") process. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

Conventional superabrasive materials have also found utility as bearing elements in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Superabrasive elements having a PCD table are typically fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particles may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. In this example, the cobalt acts as a catalyst to facilitate the formation of bonded diamond crystals. Optionally, a metal-solvent catalyst may be mixed with diamond particles prior to subjecting the diamond particles and substrate to the HPHT process. The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving diamond and graphite, the metal-solvent catalyst may also carry tungsten and/or tungsten carbide from the substrate into the PCD layer.

The presence of the solvent catalyst in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. At extremely high temperatures, portions of diamond grains may transform to carbon monoxide, carbon dioxide, graphite, or combinations thereof, thereby degrading the mechanical properties of the PCD material.

Accordingly, it is desirable to remove metallic materials, such as metal-solvent catalysts, from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer. While leaching can increase the thermal stability of a PCD layer in high-temperature environments, leaching may also reduce residual stresses developed in the PCD layer during leaching, thereby weakening the PCD layer and increasing the likelihood that the PCD layer will be damaged during drilling.

SUMMARY

The instant disclosure is directed to superabrasive elements, drill bits, and bearing assemblies. According to at least one embodiment, a superabrasive element may comprise at least one superabrasive table (e.g., a polycrystalline diamond table) including at least one coupling projection, the at least one coupling projection having a narrow portion and a wide portion having a greater width than the narrow portion. The superabrasive element may also comprise a substrate defining at least one coupling recess, the at least one coupling recess extending from a narrow portion to a wide portion. At least a portion of the at least one coupling projection of the at least one superabrasive table may be disposed in the at least one coupling recess defined in the substrate such that the narrow portion of the at least one coupling projection is adjacent to the narrow portion of the at least one coupling recess and the wide portion of the at least one coupling projection is adjacent to the wide portion of the at least one coupling recess. The at least one coupling projection and the at least one coupling recess may mechanically couple the at least one superabrasive table to the substrate.

According to at least one embodiment, the at least one coupling projection may taper in a width direction and in a height direction. At least one gap may be defined between the superabrasive table and the substrate. According to various embodiments, the coupling recess may also narrow along a direction extending inward from a side surface of the substrate.

According to at least one embodiment of the superabrasive element the at least one superabrasive table may comprise a cylindrical surface. In at least one embodiment, the at least one coupling recess may comprise a plurality of coupling recesses and the at least one superabrasive table may comprise a plurality of coupling projections, at least a portion of each of the plurality of coupling projections being disposed in a corresponding one of the plurality of coupling recesses, respectively.

According to at least one embodiment, the substrate may include a first substrate portion and a second substrate portion, the first substrate portion comprising a different material than the second substrate portion. The second substrate portion may be disposed between the superabrasive table and the first substrate portion. At least a portion of the coupling recess may be defined in the second substrate portion. In various embodiments, at least another portion of the coupling recess may be defined in the first substrate portion. According to at least one embodiment, the at least one superabrasive table may be at least partially leached. In some embodiments, the coupling projection may be unleached.

According to certain embodiments, the at least one superabrasive table may be substantially completely leached. The at least one superabrasive table may comprise a plurality of separate superabrasive inserts. Additionally, the superabrasive element may further comprise an intervening superabrasive table positioned between the at least one superabrasive table and the substrate. According to at least one embodiment, a malleable material (e.g., a shim, a coating, etc.) may be disposed in the at least one coupling recess between at least a portion of at least one superabrasive table and the substrate. The malleable material may comprise a metallic material.

In various embodiments, a superabrasive element may comprise a superabrasive table having a superabrasive face, a rear surface, a side surface extending between the superabrasive face and the rear surface, and a coupling projection extending from the rear surface. The coupling projection may include a narrow portion, a wide portion having a greater width than the narrow portion, and a pair of end surfaces disposed opposite each other, each of the pair of end surfaces extending between the narrow portion and the wide portion.

A drill bit may comprise a bit body and at least one superabrasive element coupled to the bit body. The drill bit may comprise at least one superabrasive element having a superabrasive table including at least one coupling projection, the at least one coupling projection having a narrow portion and a wide portion having a greater width than the narrow portion. In some embodiments, at least one superabrasive table may be coupled to the bit body, the at least one superabrasive table including at least one coupling projection.

In additional embodiments, the bit body may define at least one coupling recess extending from a narrow portion to a wide portion. At least a portion of the at least one coupling projection of the at least one superabrasive table may be disposed in the at least one coupling recess defined in the bit body such that the narrow portion of the at least one coupling projection is adjacent to the narrow portion of the at least one coupling recess and the wide portion of the at least one coupling projection is adjacent to the wide portion of the at least one coupling recess. The at least one coupling projection and the at least one coupling recess may mechanically couple the at least one superabrasive table to the bit body.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 1A is a perspective view of an exemplary superabrasive element according to at least one embodiment.

FIG. 1B is a cross-sectional side view of an exemplary superabrasive element illustrated in FIG. 1A.

FIG. 2 is a perspective view of an exemplary superabrasive table according to at least one embodiment.

FIG. 5E is a cross-sectional side view of an exemplary superabrasive table according to at least one embodiment.

FIG. 5F is a cross-sectional side view of an exemplary superabrasive table according to at least one embodiment.

FIG. 5G is a cross-sectional side view of an exemplary superabrasive table according to at least one embodiment.

FIG. 5H is a cross-sectional side view of an exemplary superabrasive table according to at least one embodiment.

FIG. 5M is a cross-sectional side view of an exemplary superabrasive table according to at least one embodiment.

FIG. 5N is a cross-sectional side view of an exemplary superabrasive table according to at least one embodiment.

FIG. 5O is a cross-sectional side view of an exemplary superabrasive table according to at least one embodiment.

FIG. 5P is a cross-sectional top view of an exemplary superabrasive table according to at least one embodiment.

FIG. 6A is a side view of an exemplary substrate according to at least one embodiment.

FIG. 6B is a side view of the exemplary substrate shown in FIG. 6A.

FIG. 9A is an exploded top view of an exemplary superabrasive element according to at least one embodiment.

FIG. 9B is a perspective view of the exemplary superabrasive element shown in FIG. 9A.

FIG. 9C is a perspective view of the exemplary superabrasive element shown in FIGS. 9A and 9B.

Figure 3:
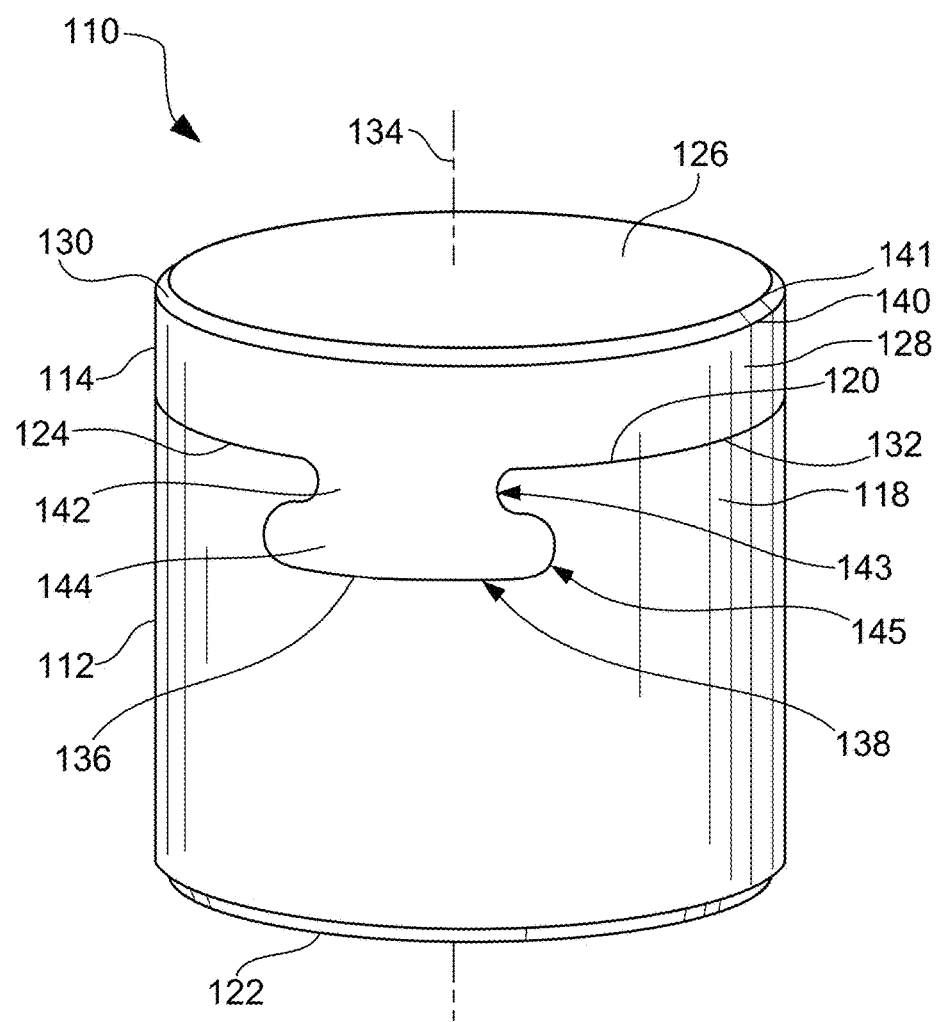
FIG. 3 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to superabrasive cutting elements, designs and methods for attaching a superabrasive table to a substrate, bearing apparatuses, and drill bits used in drilling and/or cutting operations. Such superabrasive elements may be used as cutting elements for use in a variety of applications, such as drilling tools, machining equipment, cutting tools, and other apparatuses, without limitation. Superabrasive elements, as disclosed herein, may also be used as bearing elements in a variety of bearing applications, such as thrust bearings, radial bearings, and other bearing apparatuses, without limitation.

As used herein, the terms "superabrasive" and "superhard" may refer to materials exhibiting a hardness that is at least equal to a hardness of tungsten carbide. For example, a superabrasive article may represent an article of manufacture, at least a portion of which may exhibit a hardness that is equal to or greater than the hardness of tungsten carbide. Moreover, the word "cutting" may refer broadly to machining processes, drilling processes, boring processes, or any other material removal process utilizing a cutting element.

FIGS. 1A and 1B illustrate an exemplary superabrasive element 10 according to at least one embodiment. As illustrated in FIGS. 1A and 1B, superabrasive element 10 may comprise a superabrasive table 14 affixed to or formed upon a substrate 12. Superabrasive table 14 may be affixed to substrate 12 at interface 32, which may be a planar or nonplanar interface. Superabrasive element 10 may comprise a rear surface 22, a superabrasive face 26, and a peripheral surface 16. In some embodiments, peripheral surface 16 may include a substrate side surface 18 formed by substrate 12 and a superabrasive side surface 28 formed by superabrasive table 14. Rear surface 22 may be formed by substrate 12.

Superabrasive element 10 may also comprise a chamfer 30 (i.e., sloped or angled) formed by superabrasive table 14. Chamfer 30 may comprise an angular and/or rounded edge formed at the intersection of superabrasive side surface 28 and superabrasive face 26. Any other suitable surface shape may also be formed at the intersection of superabrasive side surface 28 and superabrasive face 26, including, without limitation, an arcuate surface (e.g., a radius, an ovoid shape, or any other rounded shape), a sharp edge, multiple chamfers/radii, a honed edge, a spline, and/or combinations of the foregoing. At least one edge may be formed at the intersection of chamfer 30 and superabrasive face 26 and/or at the intersection of chamfer 30 and superabrasive side surface 28. For example, cutting element 10 may comprise one or more cutting edges, such as an edge 40 and/or an edge 41. Edge 40 and/or edge 41 may be formed adjacent to chamfer 30 and may be configured to be exposed to and/or in contact with a formation, such as a subterranean formation, during drilling.

In some embodiments, superabrasive element 10 may be utilized as a cutting element for a drill bit, in which chamfer 30 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 26 acting as a bearing surface) configured to contact oppositely facing bearing elements.

According to various embodiments, superabrasive element 10 may also comprise a substrate chamfer 17 formed by substrate 12. For example, a substrate chamfer 17 comprising an angular and/or rounded edge may be formed by substrate 12 at the intersection of substrate side surface 18 and rear surface 22. Any other suitable surface shape may also be formed at the intersection of substrate side surface 18 and rear surface 22, including, without limitation, an arcuate surface (e.g., a radius, an ovoid shape, or any other rounded shape), a sharp edge, multiple chamfers/radii, a honed edge, and/or combinations of the foregoing.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 34 of superabrasive element 10, as illustrated in FIGS. 1A and 1B. Substrate side surface 18 and superabrasive side surface 28 may, for example, be substantially cylindrical and may have any suitable diameters relative to central axis 34, without limitation. According to various embodiments, substrate side surface 18 and superabrasive side surface 28 may have substantially the same outer diameter relative to central axis 34. Superabrasive element 10 may also comprise any other suitable shape, including, for example, an oval, ellipsoid, triangular, pyramidal, square, cubic, rectangular, and/or composite shape, and/or a combination of the foregoing, without limitation.

Substrate 12 may comprise any suitable material to which superabrasive table 14 may be coupled. In at least one embodiment, substrate 12 may comprise a cemented carbide material, such as a cobalt-cemented tungsten carbide material, a metallic material (e.g., steel, titanium, etc.), a ceramic material, and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, ceramics, carbides, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

Following sintering, various materials, such as a metal-solvent catalyst, remaining in interstitial regions within the as-sintered PCD body may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superabrasive table 14. Removing a metal-solvent catalyst from the as-sintered PCD body may reduce damage to the PCD material of superabrasive table 14 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, electrochemical, chemical, and/or gaseous leaching may be used to remove a metal-solvent catalyst from the as-sintered PCD body up to a desired depth from a surface thereof. The as-sintered PCD body may be leached by immersion in an acid or acid solution, such as aqua regia, nitric acid, hydrofluoric acid, or subjected to another suitable process to remove at least a portion of the metal-solvent catalyst from the interstitial regions of the PCD body and form superabrasive table 14 comprising a PCD table. For example, the as-sintered PCD body may be immersed in an acid solution for more than 4 hours, more than 10 hours, between 24 hours to 48 hours, about 2 to about 7 days (e.g., about 3, 5, or 7 days), for a few weeks (e.g., about 4 weeks), or for 1-2 months, depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superabrasive table 14 may comprise a volume of PCD material that is at least partially free or substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

FIG. 2 illustrates an exemplary superabrasive table 14 according to various embodiments. Superabrasive table 14 may be separate from a substrate. As shown in FIG. 2, superabrasive table 14 may include a superabrasive rear surface 24, a superabrasive face 26, and a superabrasive side surface 28. Superabrasive table 14 may also comprise a chamfer 30 (i.e., sloped or angled) and/or any other suitable surface shape at the intersection of superabrasive side surface 28 and superabrasive face 26, including, without limitation, an arcuate surface (e.g., a radius, an ovoid shape, or any other rounded shape), a sharp edge, multiple chamfers/radii, a honed edge, and/or combinations of the foregoing. At least one edge, such as an edge 40 and/or or an edge 41, may be formed at the intersection of chamfer 30 and each of superabrasive face 26 and superabrasive side surface 28, respectively.

According to various embodiments, any suitable surface shape may be formed at the intersection of substrate side surface 18 and superabrasive rear surface 24, or in superabrasive rear surface 24 itself, including, without limitation, an arcuate surface (e.g., a radius, an ovoid shape, or any other rounded shape), a sharp edge, one or more chamfers/radii, a honed edge, and/or combinations of the foregoing.

Superabrasive table 14 may be formed using any suitable technique, including, for example, HPHT sintering, as described above. In some examples, superabrasive table 14 may be created by first forming a superabrasive element 10 that includes a substrate 12 and a superabrasive table 14, as detailed above in reference to FIGS. 1A and 1B. Once superabrasive element 10 has been produced, superabrasive table 14 may be separated from substrate 12. For example, prior to or following leaching, superabrasive table 14 may be separated from substrate 12 using any suitable process, including a lapping process, a grinding process, a wire-electrical-discharge machining ("wire EDM") process, or any other suitable material-removal process, without limitation.

According to some embodiments, superabrasive table 14 may be processed and utilized either with or without an attached substrate. For example, following leaching, superabrasive table 14 may be secured to a substrate or directly to a cutting tool, such as a drill bit, or to a bearing component, such as a rotor or stator, according to any of the techniques described herein.

FIG. 3 is a perspective view of an exemplary superabrasive element 110 according to at least one embodiment. As illustrated in FIG. 3, superabrasive element 110 may comprise a superabrasive table 114 attached to a substrate 112. Superabrasive table 114 may include a superabrasive face 126, a superabrasive side surface 128, and a coupling projection 136 extending from superabrasive rear surface 124. Substrate 112 may include a substrate side surface 118, a substrate rear surface 122, a substrate forward surface 120, and a coupling recess 138 defined adjacent substrate forward surface 120 for receiving coupling projection 136 of superabrasive table 114. Coupling projection 136 may include a projection narrow portion 142 and a projection wide portion 144. Coupling recess 138 may also include a recess narrow portion 143 and a recess wide portion 145 for receiving projection narrow portion 142 and projection wide portion 144 of coupling projection 136. Superabrasive table 114 may be coupled to substrate 112 at an interface 132.

Superabrasive table 114 may also include a chamfer 130 and one or more cutting edges, such as edge 140 and edge 141, adjacent to chamfer 130. Any other suitable surface shape may also be formed at the intersection of superabrasive side surface 128 and superabrasive face 126, including, without limitation, an arcuate surface (e.g., a radius, an ovoid shape, or any other rounded shape), a sharp edge, multiple chamfers/radii, a honed edge, and/or combinations of the foregoing.

Superabrasive table 114 may be formed using any suitable technique, including, for example, HPHT sintering, as described above. According to at least one embodiment, superabrasive table 114 may be formed to a desired shape and configuration during sintering of a diamond particle volume to form superabrasive table 114 comprising a polycrystalline diamond material. For example, a container surrounding the diamond particle volume during sintering, such as a sintering can, may include an interior features for molding in superabrasive table 114 to a desired shape and configuration.

In additional embodiments, superabrasive table 114 may be formed by removing material from a volume of sintered polycrystalline diamond material (i.e., after HPHT sintering). For example, superabrasive table 114 may be formed by first forming a superabrasive element comprising a superabrasive layer bonded to a substrate, such as, for example, superabrasive element 10 that includes substrate 12 and superabrasive table 14 (see FIGS. 1A and 1B). Superabrasive table 14 may be separated from the substrate 12 using any suitable process, including a lapping process, a grinding process, a wire EDM process, or any other suitable material removal process, without limitation. Superabrasive table 14, once removed from substrate 12, may be further machined or formed to any desired shape and configuration, without limitation, to form superabrasive table 114. For example, material may be removed from superabrasive table 14 be formed by machining, laser ablation, grinding, and/or otherwise removing selected portions of superabrasive table 14. Explaining further, portions of superabrasive table 14 may be removed through, for example, milling, grinding, lapping, centerless grinding, turning, and/or any other suitable mechanical and/or chemical processing technique. Accordingly, material may be removed from superabrasive table 14 to form desired geometrical features by using any suitable technique, including, as discussed above, laser cutting or ablation, electrical discharge machining (e.g., plunge EDM, sinker EDM), electrical discharge grinding ("EDG"), electro-chemical erosion, water jet cutting, and/or abrasive water jet machining.

Substrate 112 may also be formed to any desired shape and configuration. For example, substrate 112 may be molded or otherwise shaped to form a desired shape and configuration (e.g., by any of the processes discussed above with respect to shaping superabrasive table 14). In some embodiments, portions of a substrate material, such as a tungsten carbide material, may be removed through, for example, milling, grinding, lapping, centerless grinding, turning, and/or any other suitable mechanical and/or chemical processing technique to form substrate 112. Accordingly, material may be removed from a substrate material to form desired geometrical features in substrate 112, such as coupling recess 138, using any suitable technique, including, by way of example, laser cutting or ablation, electrical discharge machining (e.g., plunge EDM, sinker EDM), EDG, electro-chemical erosion, water jet cutting, and/or abrasive water jet machining.

In at least one embodiment, substrate 112 may be formed from a superabrasive element comprising a superabrasive layer bonded to a substrate (see, e.g., superabrasive element 10 including substrate 12 and superabrasive table 14 as illustrated in FIGS. 1A and 1B). Superabrasive table 14 may be separated from the substrate 12 by, for example, a lapping process, a grinding process, a wire EDM process, or any other suitable material removal process, without limitation. In another embodiment, a new substrate 12 may be provided (e.g., a substantially cylindrical substrate). Subsequently, substrate 12 may be further shaped using any of the techniques described herein to form substrate 112 comprising coupling recess 138.

Following formation of superabrasive table 114 and substrate 112, coupling projection 136 of superabrasive table 114 may be at least partially inserted or positioned within coupling recess 138 of substrate 112. Superabrasive table 114 may meet substrate 112 at an interface 132. Coupling projection 136 may be secured in coupling recess 138 formed in substrate 112 as will be described in greater detail below. Superabrasive table 114 may also be secured to substrate 112 through, for example, press-fitting, interference-fitting, brazing, welding, sintering, expansion and contraction of substrate 112 through heating and cooling, or through any other suitable method of attachment, as will be described in further detail below.

FIGS. 4A-4D illustrate various views of the exemplary superabrasive table 114 shown in FIG. 3. As shown, superabrasive table 114 may include a superabrasive face 126, a superabrasive rear surface 124, a superabrasive side surface 128, and a coupling projection 136 extending from superabrasive rear surface 124. Superabrasive table 114 may also include a chamfer 130 and one or more cutting edges, such as edge 140 and edge 141, adjacent to chamfer 130.

Figure 4A:
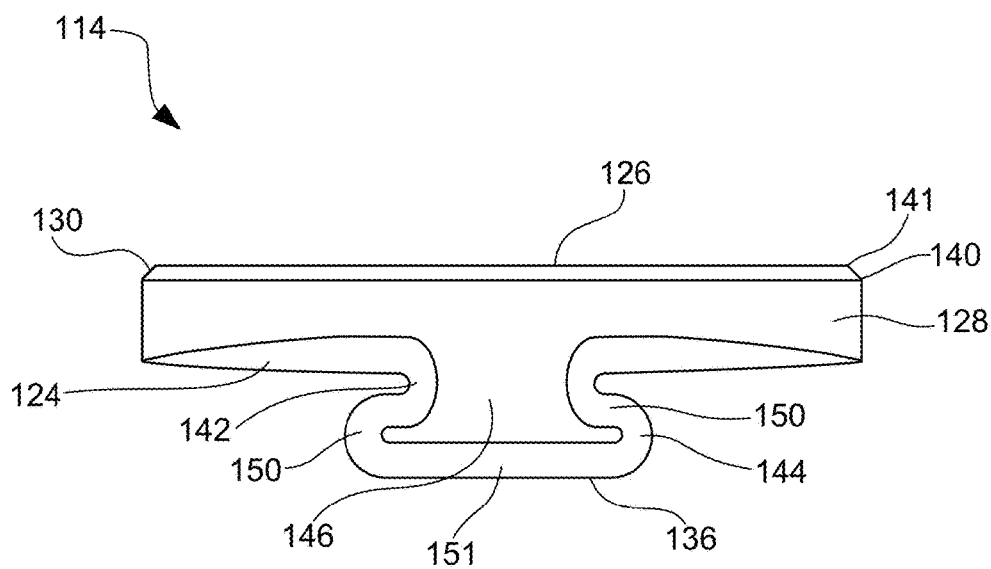
FIG. 4A is a side view of an exemplary superabrasive table according to at least one embodiment.
Figure 4B:
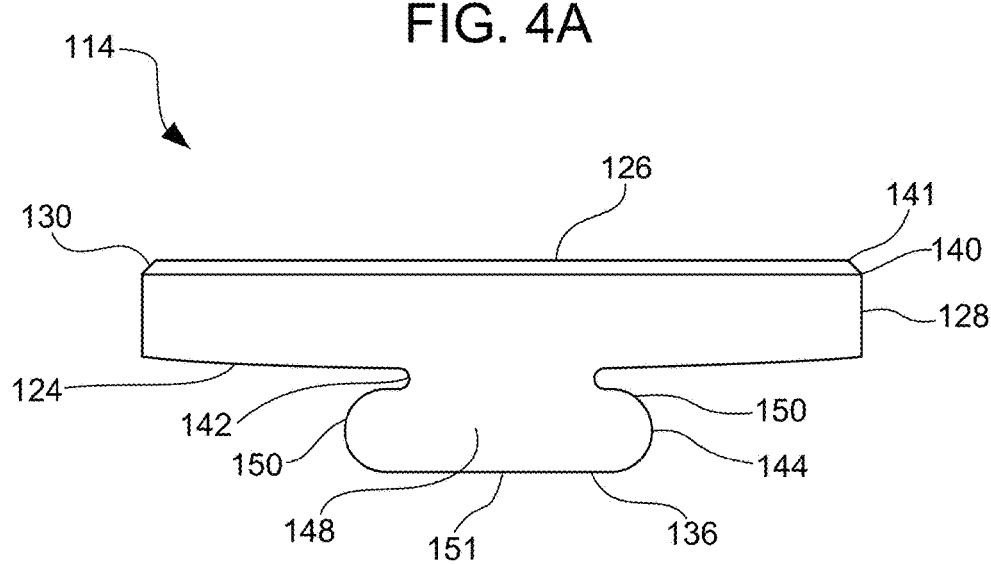
FIG. 4B is a side view of the exemplary superabrasive table shown in FIG. 4A.

FIGS. 4A and 4B are side views of superabrasive table 114. In various embodiments, coupling projection 136 of superabrasive table 114 may extend away from superabrasive rear surface 124 of superabrasive table 114. Coupling projection 136 may include a first end surface 146 and a second end surface 148, with coupling projection 136 extending between first end surface 146 and second end surface 148. First end surface 146 and/or second end surface 148 may be adjacent to and/or coincident with superabrasive side surface 128 of superabrasive table 114. Coupling projection 136 may comprise a projection narrow portion 142 adjacent to superabrasive rear surface 124 of superabrasive table 114, and a projection wide portion 144 having a greater width than projection narrow portion 142 such that a gap is defined between projection wide portion 144 and superabrasive rear surface 124. Projection narrow portion 142 and projection wide portion 144 may be formed to any suitable shape and configuration, without limitation, and may include rounded, angular, and/or linear surface portions, and/or any other suitable surface geometry. Coupling projection 136 may further include projection side surfaces 150 and a projection rear surface 151 extending between first end surface 146 and second end surface 148.

Figure 4C:
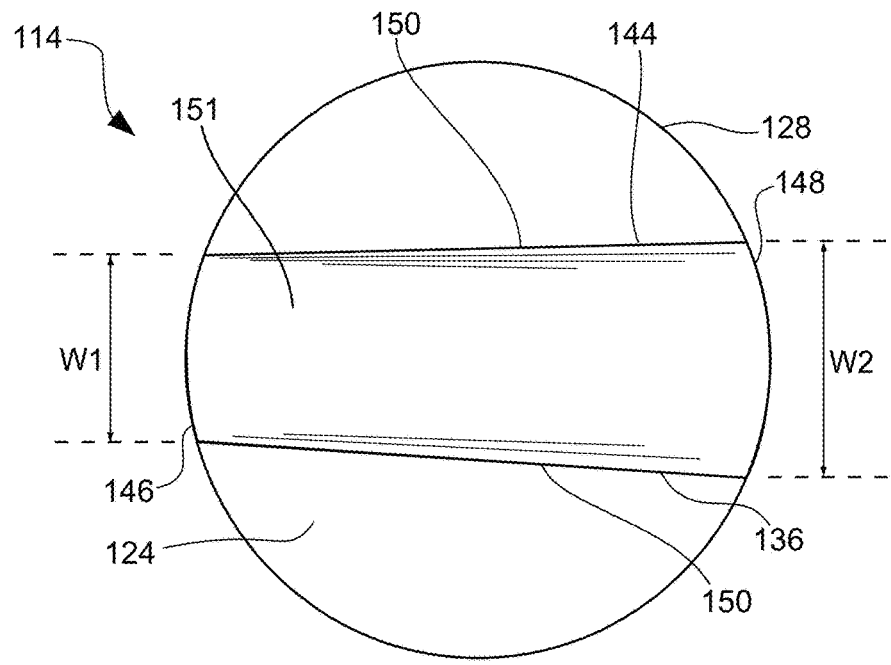
FIG. 4C is a bottom view of the exemplary superabrasive table shown in FIG. 4A.
Figure 4D:
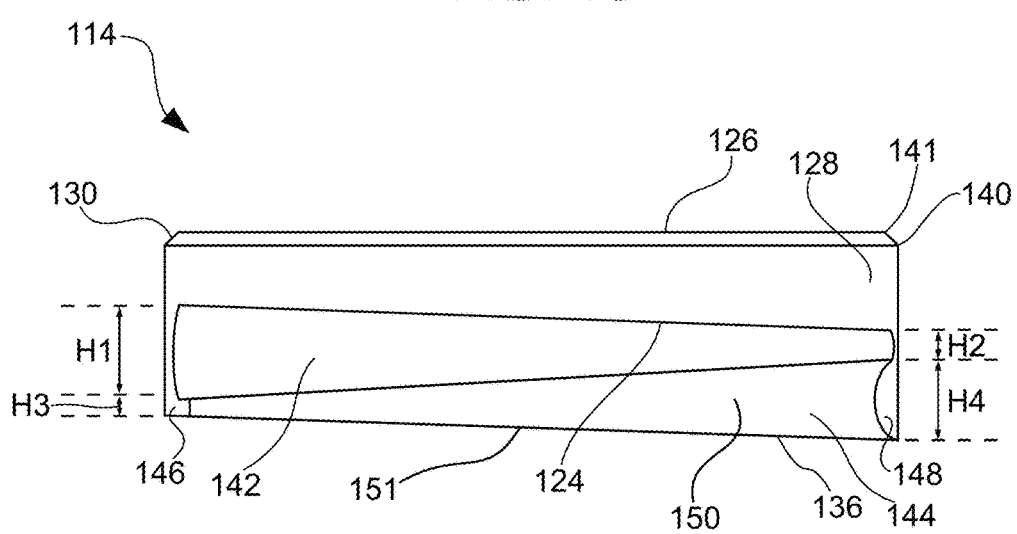
FIG. 4D is a side view of the exemplary superabrasive table shown in FIG. 4A.

FIG. 4C is a bottom view of superabrasive table 114 and FIG. 4D is a side view of superabrasive table 114. Coupling projection 136 may extend at least partially across a diameter of superabrasive table 114. For example, as shown in FIG. 4C, coupling projection 136 may extend longitudinally across substantially the entire diameter of superabrasive table 114. In some embodiments, coupling projection 136 may extend longitudinally across only a portion of superabrasive table 114 such that first end surface 146 and/or second end surface 148 of coupling projection 136 does not extend to superabrasive side surface 128 (see, e.g., FIG. 16). At least a portion of coupling projection 136 may be tapered in one or more directions. For example, as illustrated in FIGS. 4C and 4D, coupling projection 136 may taper in at least two directions, including at least the width and height directions.

Generally, as shown in FIG. 4C, coupling projection 136 may taper in a width direction as coupling projection 136 extends between first end surface 146 and second end surface 148. Projection side surfaces 150 may be tapered such that, as projection side surfaces 150 extend between second end surface 148 and first end surface 146, a width between projection side surfaces 150 of coupling projection 136 is reduced. Due to the tapering of projection side surfaces 150, first end surface 146 may have a smaller width than second end surface 148. More particularly, a portion of projection wide portion 144 adjacent to first end surface 146 may have a width W1 (e.g., a width adjacent first end surface 146) that is less than a width W2 (e.g., a width adjacent second end surface 148) of a portion of projection wide portion 144 adjacent to second end surface 148. Additionally, a portion of projection narrow portion 142 adjacent to first end surface 146 may have a width that is less than a width of a portion of projection narrow portion 142 adjacent to second end surface 148.

As illustrated in FIG. 4D, projection narrow portion 142 and/or projection wide portion 144 of coupling projection 136 may also taper in a height direction as coupling projection 136 extends between first end surface 146 and second end surface 148. For example, projection narrow portion 142 of coupling projection 136 may taper between first end surface 146 and second end surface 148 such that a portion of projection narrow portion 142 adjacent to first end surface 146 has a height H1 between superabrasive rear surface 124 and projection wide portion 144 that is greater than a height H2 of a portion of projection narrow portion 142 adjacent to second end surface 148. Additionally, as shown in FIG. 4D, projection wide portion 144 of coupling projection 136 may taper between first end surface 146 and second end surface 148 such that a portion of projection wide portion 144 adjacent to first end surface 146 has a height H3 between projection rear surface 151 and projection narrow portion 142 that is less than a height H4 of a portion of projection wide portion 144 adjacent to second end surface 148. In certain embodiments, coupling projection 136 may not taper in a height direction and/or a width direction.

As shown in FIG. 4D, superabrasive rear surface 124 and/or projection rear surface 151 of superabrasive table 114 may extend at a non-parallel angle with respect to superabrasive face 126. According to various embodiments, superabrasive rear surface 124 may be substantially parallel to projection rear surface 151. In some embodiments, superabrasive rear surface 124 and/or projection rear surface 151 may be substantially parallel to superabrasive face 126.

Figures 5A, 5B:
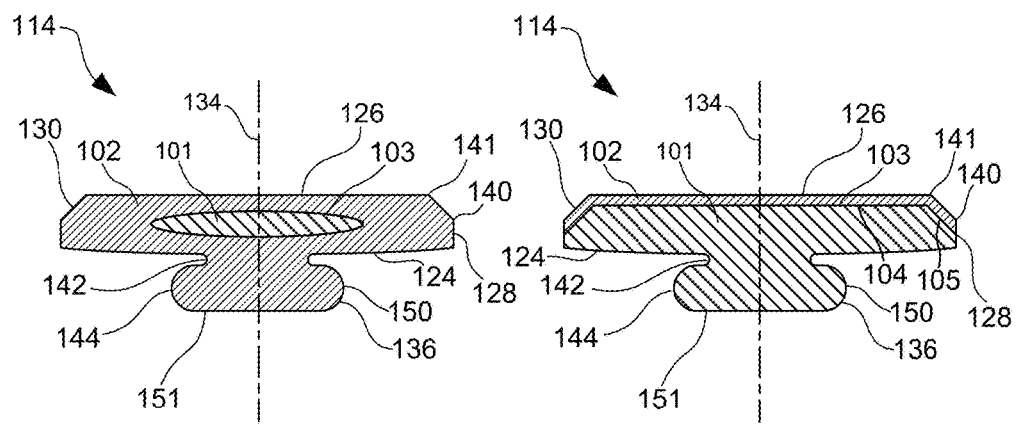
FIG. 5A is a cross-sectional side view of an exemplary superabrasive table according to at least one embodiment.
FIG. 5B is a cross-sectional side view of an exemplary superabrasive table according to at least one embodiment.

FIGS. 5A to 5P illustrate exemplary superabrasive tables 114 having various leached volumes according to some embodiments. As discussed above, an as-sintered PCD body (e.g., superabrasive table 14 illustrated in FIGS. 1-2) may be separated from a substrate to be further processed. The as-sintered PCD body may be leached prior and/or following separation of the as-sintered PCD body from the substrate. Additionally, the as-sintered PCD body may be leached prior to and/or following removal of material from the as-sintered PCD body. In some embodiments, only selected portions of the as-sintered PCD body may be leached, leaving remaining portions of resulting superabrasive table 114 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superabrasive table 114 may comprise a volume of PCD material that is at least partially free or substantially free of a metal-solvent catalyst.

FIGS. 5A-5P illustrate exemplary superabrasive tables 114 having leached volumes formed in various configurations. Superabrasive table 114 may include a superabrasive face 126, a superabrasive rear surface 124, a superabrasive side surface 128, and a coupling projection 136. Superabrasive table 114 may also form a chamfer 130 and one or more cutting edges, such as edge 140 and edge 141, adjacent to chamfer 130.

Superabrasive table 114 may include a first volume 101 comprising an interstitial material and a second volume 102 having a lower concentration of the interstitial material than first volume 101. Portions of superabrasive table 114, such as second volume 102 may be leached or otherwise processed to remove interstitial materials, such as a metal-solvent catalyst, from the interstitial regions. Second volume 102 may be created during leaching of superabrasive table 114 according to any suitable leaching technique. For example, portions of superabrasive table 114 and/or an as-sintered body PCD body used to form superabrasive table 114 may be masked and/or otherwise covered during at least part of a leaching process to prevent a leaching solution from contacting selected portions of superabrasive element superabrasive table 114. In some embodiments, superabrasive table 114 and/or an as-sintered body PCD body used to form superabrasive table 114 may first be leached, after which portions of superabrasive element 110 and/or superabrasive table 114 may be removed to modify the shape of first volume 101 and/or second volume 102.

A boundary region 103 may extend between first volume 101 and second volume 102. Boundary region 103 may include amounts of metal-solvent catalyst varying between an amount of metal-solvent catalyst in first volume 101 and an amount of metal-solvent catalyst in second volume 102. Boundary region 103 may extend along a generally straight, angular, curved, and/or variable (e.g., zigzag, undulating) profile between first volume 101 and second volume 102. First volume 101 may be formed in any suitable shape and configuration. For example, as illustrated in FIGS. 5A-5N, first volume 101 may be located adjacent to a central portion of superabrasive face 126 and/or may be located away from superabrasive face 126. Second volume 102 may also be formed in any suitable shape and configuration. For example, second volume 102 may be formed adjacent to and/or surrounding at least a portion of first volume 101. In some embodiments, second volume 102 may comprise a generally annular-shaped or ring-shaped volume.

As illustrated in FIG. 5A, first volume 101 may be disposed about central axis 134. Superabrasive table 114 may be substantially leached of metal-solvent catalyst such that first volume 101 is disposed in a central region of superabrasive table 114 away from exposed surfaces of superabrasive table 114. Second volume 102 may be located adjacent to superabrasive face 126, superabrasive side surface 128, superabrasive rear surface 124, and coupling projection 136. Boundary region 103 may extend along any suitable profile within superabrasive table 114, including, for example, a linear, rectangular, circular, oval, arcuate, and/or any other suitable profile, without limitation. In additional embodiments, superabrasive table 114 may be substantially leached of metal-solvent catalyst so that second volume 102 substantially comprises the entire volume of superabrasive table 114, with little or no metal-solvent catalyst remaining within interstitial spaces of superabrasive table 114. U.S. Pat. No. 8,663,349 discusses and discloses embodiments related to polycrystalline diamond elements having residual metal-solvent catalyst remaining in the polycrystalline diamond material following leaching; any such embodiments and the disclosure, in its entirety, are incorporated herein by this reference.

In some embodiments, as illustrated in FIG. 5B, boundary region 103 may include a sloped boundary portion 105 that extends between superabrasive side surface 128 and a central boundary portion 104 of boundary region 103 along any suitable profile, including, for example, a generally straight, angular, curved, and/or variable (e.g., zigzag, undulating) profile. According to at least one embodiment, a portion of boundary region 103 may lie upon or intersect superabrasive chamfer 130 and/or a surface region adjacent to superabrasive chamfer 130 (e.g., superabrasive side surface 128). Accordingly, as shown in FIG. 5B, second volume 102 may be located directly adjacent to a central portion of superabrasive face 126 as well as chamfer 130 and/or a portion of superabrasive side surface 128. First volume 101 may substantially comprise the remaining volume of superabrasive table 114, including coupling projection 136.

Figures 5C, 5D:
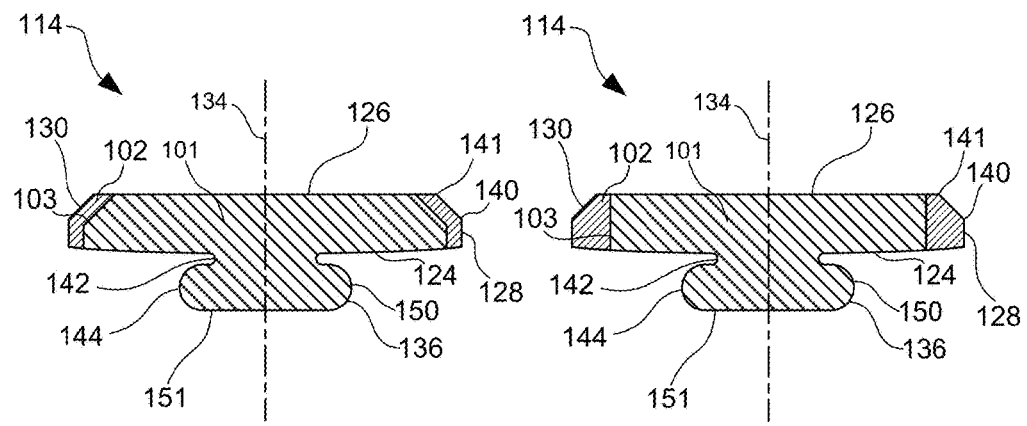
FIG. 5C is a cross-sectional side view of an exemplary superabrasive table according to at least one embodiment.
FIG. 5D is a cross-sectional side view of an exemplary superabrasive table according to at least one embodiment.

In various embodiments, as illustrated in FIG. 5C, second volume 102 may be formed adjacent to superabrasive chamfer 130, superabrasive face 126, and superabrasive side surface 128. Additionally, a boundary region 103 may extend from superabrasive face 126 to superabrasive rear surface 124, with a portion of boundary region 103 extending along and/or generally parallel to superabrasive chamfer 130 and another portion of boundary region 103 extending along and/or generally parallel to superabrasive side surface 128. First volume 101 may substantially comprise the remaining volume of superabrasive table 114, including coupling projection 136.

According to some embodiments, as illustrated in FIG. 5D, second volume 102 may be formed adjacent to superabrasive chamfer 130, superabrasive face 126, and superabrasive side surface 128. Boundary region 103 may extend from superabrasive face 126 to superabrasive rear surface 124, with at least a portion of boundary region 103 extending along and/or generally parallel to superabrasive side surface 128. First volume 101 may substantially comprise the remaining volume of superabrasive table 114, including coupling projection 136.

According to certain embodiments, as illustrated in FIG. 5E, boundary region 103 may extend across superabrasive table 114 so as to define superabrasive face 126 and at least a portion of superabrasive chamfer 130. As shown, a portion of boundary region 103 may intersect or lie upon superabrasive chamfer 130 and/or a surface region adjacent to superabrasive chamfer 130 (e.g., superabrasive side surface 128). Accordingly, second volume 102 may be disposed about central axis 134 so as to be located adjacent to a central portion of superabrasive face 126. First volume 101 may substantially comprise the remaining volume of superabrasive table 114, including coupling projection 136.

In additional embodiments, as illustrated in FIG. 5F, second volume 102 may be formed adjacent to superabrasive chamfer 130 and superabrasive face 126. Boundary region 103 may extend from superabrasive face 126 to edge 140 formed at the intersection of superabrasive chamfer 130 and superabrasive side surface 128, with a portion of boundary region 103 extending along and/or generally parallel to superabrasive chamfer 130. First volume 101 may substantially comprise the remaining volume of superabrasive table 114, including coupling projection 136.

As illustrated in FIG. 5G, second volume 102 may be formed adjacent to superabrasive chamfer 130, superabrasive face 126, and superabrasive side surface 128. Boundary region 103 may extend along and/or generally parallel to superabrasive chamfer 130 from superabrasive face 126 to superabrasive side surface 128. First volume 101 may substantially comprise the remaining volume of superabrasive table 114, including coupling projection 136.

According to some embodiments, as illustrated in FIG. 5H, second volume 102 may be formed adjacent to superabrasive chamfer 130. Boundary region 103 may extend from edge 140 to edge 141, which are each adjacent to superabrasive chamfer 130. Boundary region 103 may extend along any suitable profile between edge 140 and edge 141, without limitation. For example, boundary region 103 may comprise an angular profile, as illustrated in FIG. 5H. According to additional embodiments, boundary region 103 may comprise an arcuate profile. First volume 101 may substantially comprise the remaining volume of superabrasive table 114, including coupling projection 136.

Figures 5I, 5J:
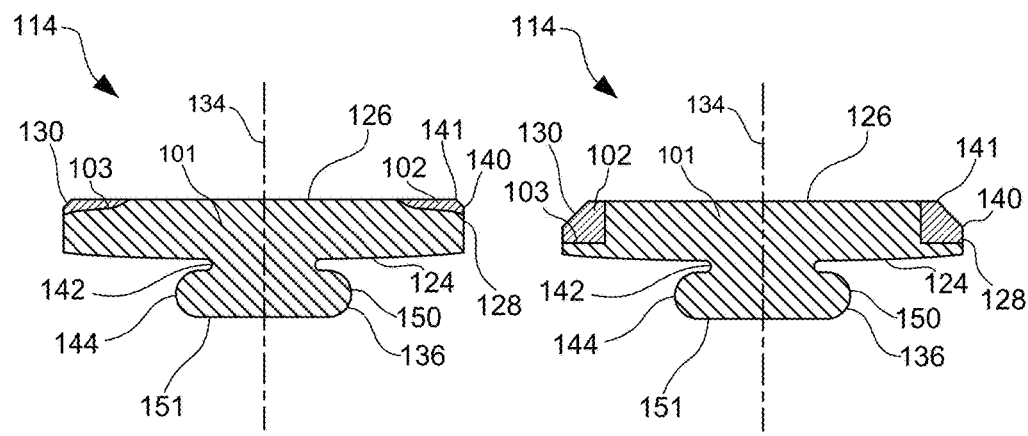
FIG. 5I is a cross-sectional side view of an exemplary superabrasive table according to at least one embodiment.
FIG. 5J is a cross-sectional side view of an exemplary superabrasive table according to at least one embodiment.

As illustrated in FIG. 5I, second volume 102 may be formed adjacent to superabrasive chamfer 130. Boundary region 103 may extend from superabrasive face 126 to a surface region near superabrasive chamfer 130 (e.g., superabrasive side surface 128). Boundary region 103 may extend along any suitable profile between superabrasive face 126 and superabrasive side surface 128, without limitation. Boundary region 103 may comprise, for example, a profile that generally slopes between superabrasive face 126 and superabrasive side surface 128. According to some embodiments, as shown in FIG. 5I, the generally annular-shaped second volume 102 may comprise a generally ring-shaped volume that is not perfectly symmetric but is irregular in one or more dimensions. For example, second volume 102 may vary in leach depth and/or profile shape, as defined by boundary region 103, at different peripheral regions about central axis 134. First volume 101 may substantially comprise the remaining volume of superabrasive table 114, including coupling projection 136.

According to some embodiments, as illustrated in FIG. 5J, second volume 102 may be formed adjacent to superabrasive chamfer 130, superabrasive face 126, and superabrasive side surface 128. Boundary region 103 may extend from superabrasive side surface 128 to superabrasive face 126. Boundary region 103 may extend along any suitable profile between superabrasive side surface 128 and superabrasive face 126, without limitation. For example, boundary region 103 may comprise an angular profile, as illustrated in FIG. 5J. First volume 101 may substantially comprise the remaining volume of superabrasive table 114, including coupling projection 136.

Figures 5K, 5L:
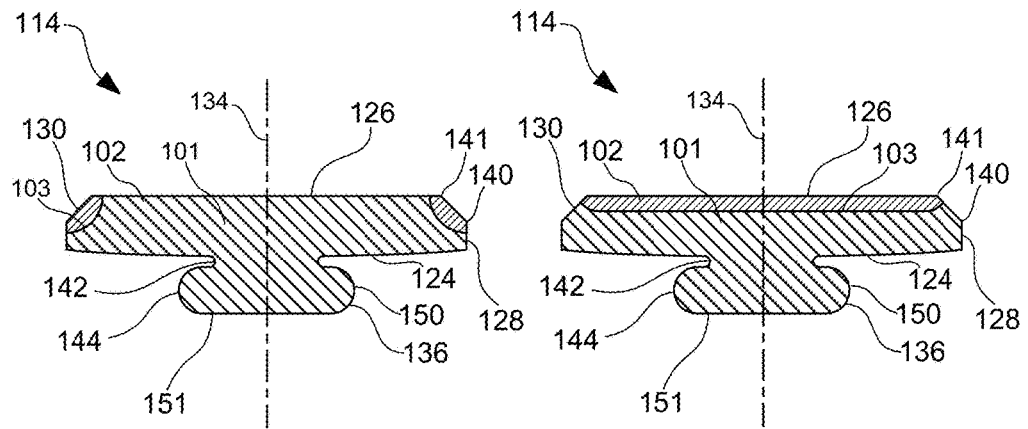
FIG. 5K is a cross-sectional side view of an exemplary superabrasive table according to at least one embodiment.
FIG. 5L is a cross-sectional side view of an exemplary superabrasive table according to at least one embodiment.

In at least one embodiment, as illustrated in FIG. 5K, second volume 102 may be formed adjacent to superabrasive chamfer 130, superabrasive face 126, and superabrasive side surface 128. Boundary region 103 may extend from superabrasive side surface 128 to superabrasive face 126. Boundary region 103 may extend along any suitable profile between superabrasive side surface 128 and superabrasive face 126, without limitation. For example, boundary region 103 may comprise an arcuate profile, as illustrated in FIG. 5K. First volume 101 may substantially comprise the remaining volume of superabrasive table 114, including coupling projection 136.

According to certain embodiments, as illustrated in FIG. 5L, second volume 102 may be formed adjacent to superabrasive face 126 and at least a portion of chamfer 130. For example, as shown, superabrasive face 126 may be substantially defined by second volume 102. Boundary region 103 may intersect or lie upon superabrasive chamfer 130. First volume 101 may substantially comprise the remaining volume of superabrasive table 114, including coupling projection 136.

In some embodiments, as illustrated in FIG. 5M, second volume 102 may be formed directly adjacent to a central portion of superabrasive face 126 and at least a portion of chamfer 130. For example, as shown, superabrasive face 126 may be substantially defined by second volume 102. Boundary region 103 may intersect or lie upon a surface region adjacent to superabrasive chamfer 130, such as superabrasive side surface 128. First volume 101 may substantially comprise the remaining volume of superabrasive table 114, including coupling projection 136.

Superabrasive table 114 comprising first volume 101 and second volume 102 may exhibit properties of increased thermal stability, fatigue resistance, strength, and/or wear resistance. Such properties may be enhanced by the shape, size, and/or locations of first volume 101, second volume 102, and/or boundary region 103 of superabrasive table 114. Accordingly, any configurations of superabrasive table 114 illustrated in FIGS. 5A-5P, combinations thereof, as well as other configurations illustrated and described herein, may provide significant resistance to undesired spalling, cracking, and/or thermal damage of superabrasive portions, such as superabrasive table 114, of the superabrasive elements during drilling and/or other use.

In some embodiments, as illustrated in FIG. 5N, first volume 101 may be disposed about central axis 134. Second volume 102 of superabrasive table 114 may be substantially leached of metal-solvent catalyst such that first volume 101 is disposed in a central region of superabrasive table 114 away from exposed surfaces of superabrasive table 114. Second volume 102 may be located adjacent to superabrasive face 126, superabrasive side surface 128, superabrasive rear surface 124, and coupling projection 136. Boundary region 103 may extend along any suitable profile within superabrasive table 114. For example, boundary region 103 may generally extend along profile path at a selected depth from superabrasive face 126, superabrasive side surface 128, superabrasive rear surface 124, and coupling projection 136.

In various embodiments, as illustrated in FIG. 5O, superabrasive table 114 may be substantially leached of metal-solvent catalyst so that second volume 102 comprises, or substantially comprises, the entire volume of superabrasive table 114, with little or no metal-solvent catalyst remaining within interstitial spaces of superabrasive table 114.

FIG. 5P is a cross-sectional top view of exemplary superabrasive table 114 according to at least one embodiment. Superabrasive table 114 may be leached to a desired depth from a side surface region of superabrasive table 114. For example, as shown in FIG. 5P, a portion of superabrasive table 114 that includes second end surface 148 of coupling projection 136 may be at least partially leached to boundary region 103. Superabrasive table 114 may be leached by, for example, submerging or exposing only a selected portion of superabrasive table 114 in a leaching solution. For example, a portion of superabrasive table 114 that includes second end surface 148 of coupling projection 136 may be submerged in a leaching solution such that the leaching solution contacts portions of superabrasive table 114 extending from second end surface 148 to a region at or near boundary region 103.

Figure 6C:
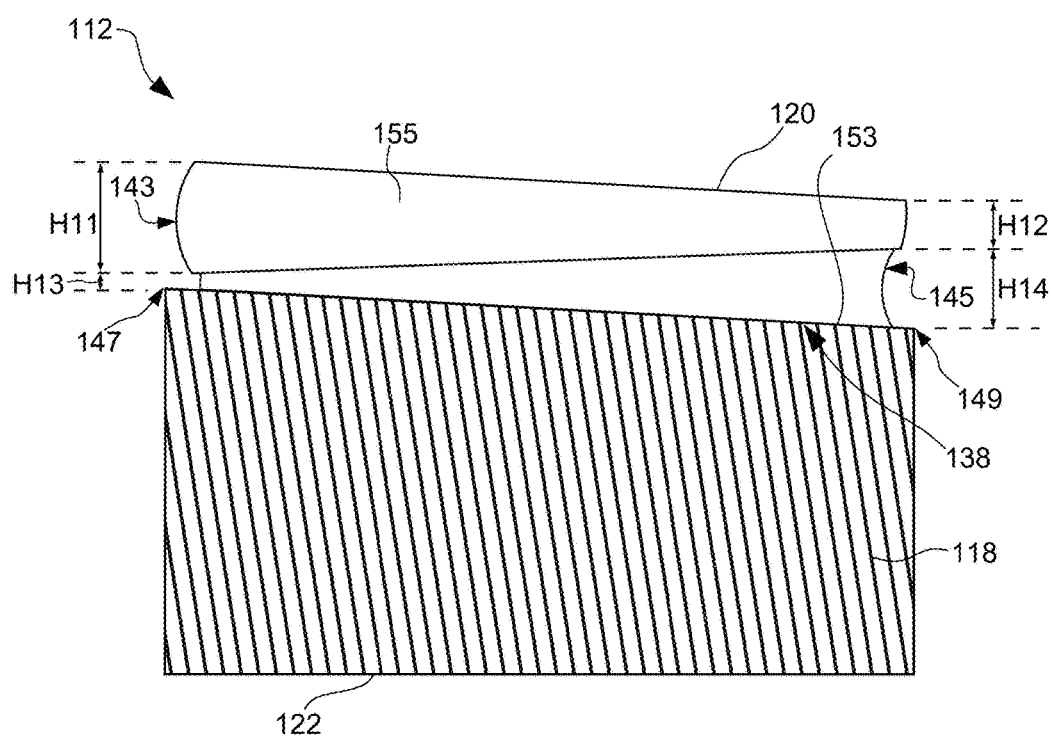
FIG. 6C is a cross-sectional side view of the exemplary substrate shown in FIG. 6A.

FIGS. 6A and 6B are side views of the exemplary substrate 112 shown in FIG. 3 and FIG. 6C is a cross-sectional side view of exemplary substrate 112. Substrate 112 may include a substrate forward surface 120, a substrate rear surface 122, a substrate side surface 118, and a coupling recess 138 defined adjacent to substrate forward surface 120. Coupling recess 138 may be sized, shaped, and configured to accommodate coupling projection 136. For example, coupling recess 138 may be configured to securely hold coupling projection 136, thereby coupling substrate 112 to superabrasive table 114. According to various embodiments, coupling recess 138 may include a recess narrow portion 143 and a recess wide portion 145 respectively corresponding to projection narrow portion 142 and projection wide portion 144. Coupling recess 138 may be defined by recess side surfaces 155 and recess rear surface 153 extending between portions of substrate side surface 118 at opposite ends of coupling recess 138.

In various embodiments, coupling recess 138 of substrate 112 may be formed adjacent to substrate forward surface 120 and portions of substrate side surface 118. Recess side surfaces 155 and recess rear surface 153 may define coupling recess 138. Recess side surfaces 155 may have any suitable shape, such as, for example, rounded, angular, and/or linear surface portions, and/or any other suitable surface geometry, without limitation. A first end opening 147 and a second end opening 149 may be defined in substrate side surface 118. First end opening 147 and second end opening 149 may be open to coupling recess 138 such that recess side surfaces 155 and recess rear surface 153 extend through substrate 112 from first end opening 147 to second end opening 149.

Coupling recess 138 may extend at least partially across a diameter of substrate 112 and/or at least partially across a diameter of superabrasive table 114. For example, as shown in FIG. 6C, coupling recess 138 may extend longitudinally across substantially the entire diameter of substrate 112. In some embodiments, coupling recess 138 may extend longitudinally across only a portion of substrate 112. At least a portion of coupling recess 138 may be tapered in one or more directions. For example, as illustrated in FIGS. 6A-6C, coupling recess 138 may taper in at least two directions, including at least the width and height directions.

Generally, as shown in FIGS. 6A and 6B, coupling recess 138 may taper in a width direction as coupling recess 138 extends between first end opening 147 and second end opening 149. Recess side surfaces 155 may be tapered so that, as recess side surfaces 155 extend between second end opening 149 and first end opening 147, a width of coupling recess 138 between recess side surfaces 155 may become smaller. Due to the tapering of recess side surfaces 155, first end opening 147 may have a smaller width than second end opening 149. More particularly, as shown in FIGS. 6A and 6B, a portion of recess wide portion 145 adjacent to first end opening 147 may have a width W11 that is less than a width W12 of a portion of recess wide portion 145 adjacent to second end opening 149. Additionally, a portion of recess narrow portion 143 adjacent to first end opening 147 may have a width W13 that is less than a width W14 of a portion of recess narrow portion 143 adjacent to second end opening 149.

As illustrated in FIG. 6C, recess narrow portion 143 and/or recess wide portion 145 of coupling recess 138 may also taper in a height direction as coupling recess 138 extends between first end opening 147 and second end opening 149. For example, recess narrow portion 143 of coupling recess 138 may taper between first end opening 147 and second end opening 149 such that a portion of recess narrow portion 143 adjacent to first end opening 147 has a height H11 between substrate top surface 120 and recess wide portion 145 that is greater than a height H12 of a portion of recess narrow portion 143 adjacent to second end opening 149. Additionally, as shown in FIG. 6C, recess wide portion 145 of coupling recess 138 may taper between first end opening 147 and second end opening 149 such that a portion of recess wide portion 145 adjacent to first end opening 147 has a height H13 between recess rear surface 153 and recess narrow portion 143 that is less than a height H14 of a portion of recess wide portion 145 adjacent to second end opening 149.

Figure 7:
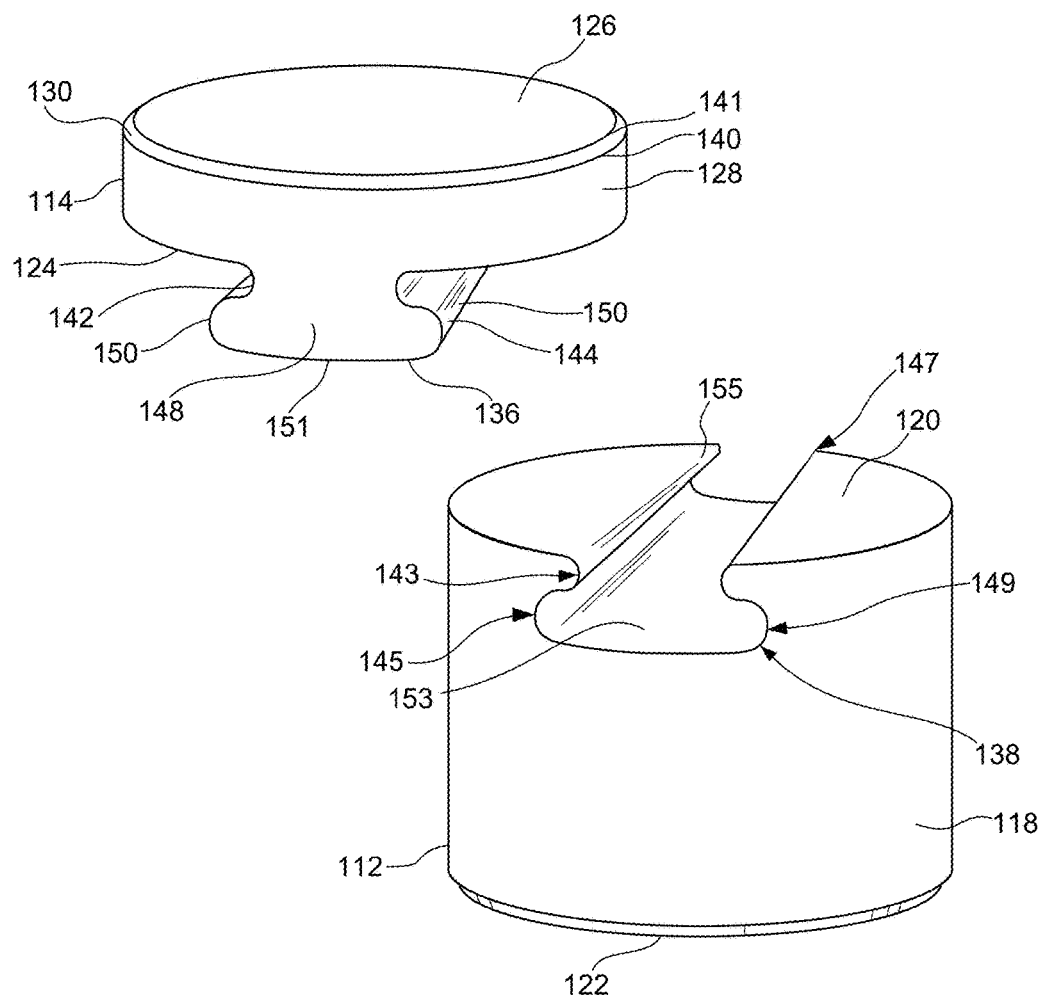
FIG. 7 is an exploded perspective view of a superabrasive element according to at least one embodiment.

FIG. 7 is a perspective view of an exemplary superabrasive table 114 and substrate 112 used to form superabrasive element 110 according to at least one embodiment. Coupling projection 136 of superabrasive table 114 may be at least partially inserted or positioned within coupling recess 138 defined in substrate 112. More particularly, first end surface 146 of coupling projection 136 may be inserted into or at least partially positioned within second end opening 149 of coupling recess 138 defined in substrate 112. Coupling projection 136 may be slid or positioned within coupling recess 138 generally in a direction from second end opening 149 to first end opening 147 of coupling recess 138. According to at least one embodiment, coupling projection 136 may be inserted into or positioned at least partially within coupling recess 138 until coupling projection 136 closely abuts one or more portions of substrate 112 defining coupling recess 138.

In some embodiments, when coupling projection 136 is positioned or secured within coupling recess 138, second end surface 148 of coupling projection 136 may be positioned adjacent to second end opening 149 of coupling recess 138 and/or first end surface 146 of coupling projection 136 may be positioned adjacent to first end opening 147 of coupling recess 138. Additionally, when coupling projection 136 is positioned or secured within coupling recess 138, superabrasive rear surface 124 of superabrasive table 114 may be located adjacent to substrate forward surface 120 of substrate 112 and projection side surfaces 150 of coupling projection 136 may be adjacent to corresponding recess side surfaces 155 defining coupling recess 138. Coupling projection 136 may be positioned or secured within coupling recess 138 in any suitable manner, as will be discussed in greater detail below.

Figure 8A:
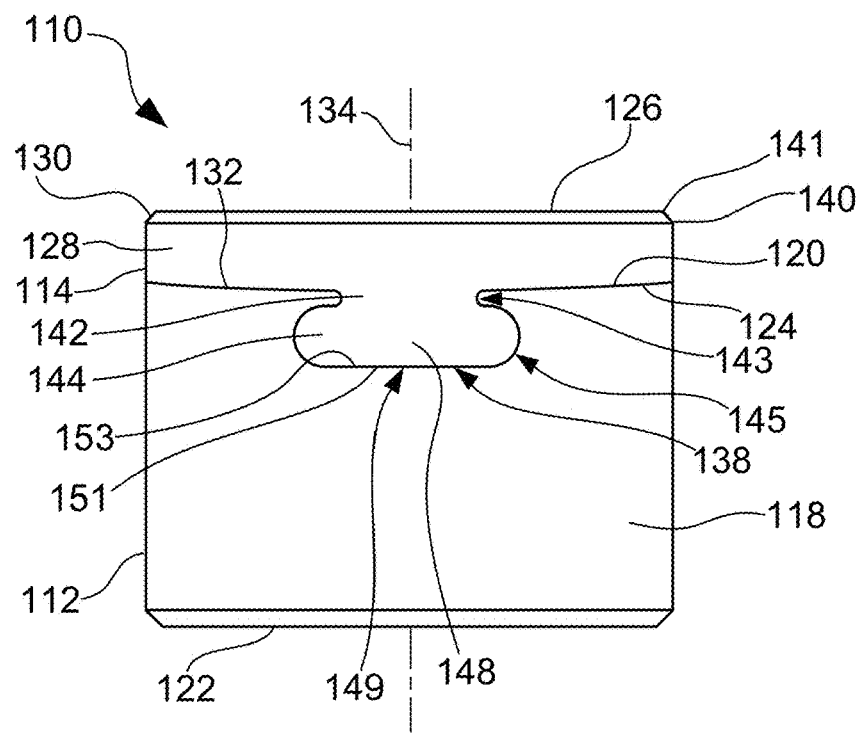
FIG. 8A is a side view of an exemplary superabrasive element according to at least one embodiment.
Figure 8B:
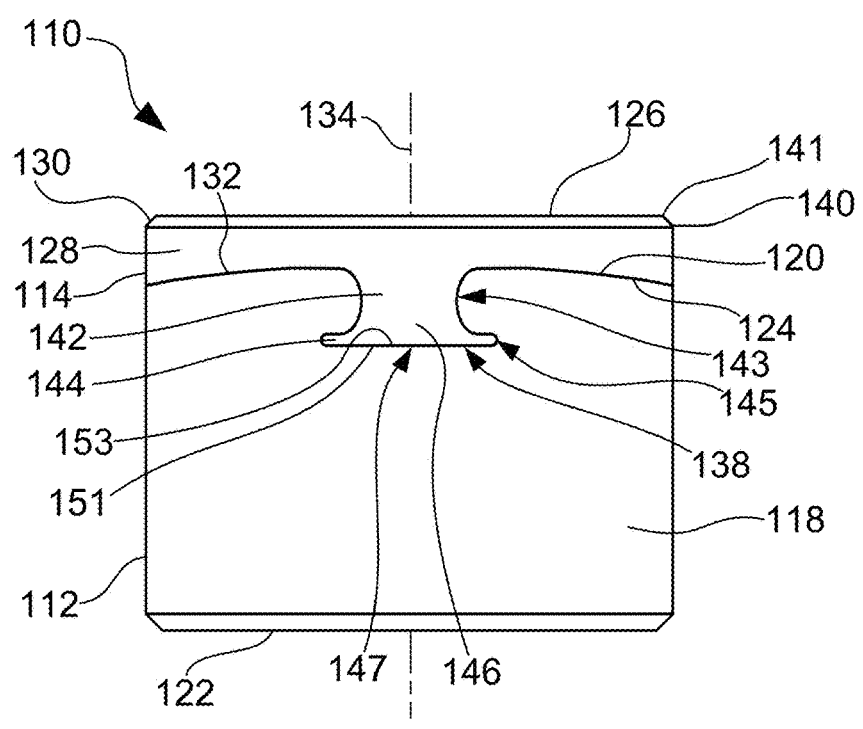
FIG. 8B is a side view of the exemplary superabrasive element shown in FIG. 8A.

FIGS. 8A and 8B illustrate side views of exemplary superabrasive element 110. FIG. 8A is a side view of superabrasive element 110 facing second end opening 149 of coupling recess 138 defined in substrate 112 and second end surface 148 of coupling projection 136 of superabrasive table 114. FIG. 8B is a side view of superabrasive element 110 facing first end opening 147 of coupling recess 138 defined in substrate 112 and first end surface 146 of coupling projection 136 of superabrasive table 114. When coupling projection 136 of superabrasive table 114 is disposed within coupling recess 138 of substrate 112, projection side surfaces 150 may be adjacent to corresponding recess side surfaces 155 and projection rear surface 151 may be adjacent to recess rear surface 153. In some embodiments, first end surface 146 may be adjacent to first end opening 147 and/or second end surface 148 may be adjacent to second end opening 149. Additionally, when coupling projection 136 of superabrasive table 114 is disposed within coupling recess 138 of substrate 112, coupling projection 136 and coupling recess 138 may be aligned such that that projection narrow portion 142 is adjacent to recess narrow portion 143 and projection wide portion 144 of coupling projection 136 is adjacent to recess wide portion 145 of coupling recess 138.

Coupling projection 136 may be secured in coupling recess 138 formed in substrate 112 through any suitable coupling technique, without limitation. For example, coupling projection 136 of superabrasive table 114 may be secured at least partially within coupling recess 138 through, for example, press-fitting, interference-fitting, brazing, welding, sintering, bonding, pin attachment, frictional engagement, threaded attachment, mechanical fastening, and/or through any other suitable attachment technique, without limitation. For example, coupling projection 136 of superabrasive table 114 may be secured in coupling recess 138 of substrate 112 through an interference fit between coupling projection 136 and coupling recess 138. In some embodiments, coupling projection 136 may be positioned within coupling recess 138 until one or more surface regions of superabrasive table 114 are brought into abutment with one or more adjacent surface regions of substrate 112. For example, portions of projection side surfaces 150, projection rear surface 151, and/or superabrasive rear surface 124 of superabrasive table 114 may abut corresponding portions of recess side surfaces 155, recess rear surface 153, and/or substrate top surface 120, respectively.

As surface regions of superabrasive table 114 contact or otherwise abut surface regions of substrate 112, superabrasive table 114 and substrate 112 may cause or exert stresses on each other. For example, coupling projection 136 and/or coupling recess 138 may be subjected to compressive, tensile, and/or shear stresses. Additionally, portions of superabrasive table 114 and/or substrate 112 near coupling projection 136 and/or coupling recess 138 may be subjected to compressive, tensile, and/or shear stresses. A magnitude of such stresses may increase as coupling projection 136 is further forced into coupling recess 138 and into closer abutment with portions of substrate 112 defining coupling recess 138. For example, coupling projection 136 may be forced into a compressed state within coupling recess 138 by substrate 112 and at least a portion of substrate 112 may be forced outward by coupling projection 136. Additionally, at least a portion of substrate 112 disposed between superabrasive rear surface 124 of superabrasive table 114 and wide portion 144 of coupling projection 136 may be compressed by superabrasive table 114 and wide portion 144 of coupling projection 136 may be forced away from superabrasive rear surface 124 by substrate 112.

Stresses exerted by superabrasive table 114 and substrate 112 on one another may secure superabrasive table 114 to substrate 112. For example, such stresses may result in frictional engagement between superabrasive table 114 and substrate 112 as superabrasive table 114 and substrate 112 are forced against one another, thereby securing superabrasive table 114 to substrate 112 and limiting or preventing separation/movement of superabrasive table 114 with respect to substrate 112 during use. Surface portions of superabrasive table 114 and/or substrate 112 may be processed using any suitable technique to further enhance frictional engagement between superabrasive table 114 and substrate 112. For example, at least a portion of superabrasive table 114 and/or substrate 112 may be processed using any suitable technique to produce polished and/or roughened surface regions. Additionally, as will be discussed in greater detail below, any suitable material may be disposed between at least a portion of superabrasive table 114 and substrate 112. For example, any suitable metallic, polymer, and/or other suitable compound may be disposed between at least a portion of superabrasive table 114 and substrate 112 to more securely couple superabrasive table 114 to substrate 112 and/or to otherwise customize the coupling between superabrasive table 114 and substrate 112 as desired.

In some embodiments, stresses exerted by superabrasive table 114 and substrate 112 on one another may also produce desired characteristics within superabrasive element 110. For example, tensile and compressive stresses developed within at least a portion of superabrasive table 114 due to coupling of superabrasive table 114 to substrate 112 may inhibit fracture initiation and/or propagation within superabrasive table 114. Accordingly, damage and/or wear to superabrasive element 110 during use may be reduced.

In some embodiments, a shim and/or other layer, such as a malleable layer, may be placed between at least a portion of superabrasive table 114 and substrate 112. For example, a malleable metallic and/or polymer layer may be disposed between coupling projection 136 and a portion of substrate 112 defining coupling recess 138. The malleable layer may be a metallic foil, a coating (e.g., on substrate coupling recess, superabrasive table coupling projection, or both), such as a chemical vapor deposition ("CVD") coating, an amorphous diamond like carbon coating ("ADLC") coating, and/or a monocrystalline diamond coating, an adhesive, a brazing metal, a refractory metal, and/or any other suitable material. In some embodiments, coupling projection 136 may be brazed or welded into place in coupling recess 138. As another example, substrate 112, and consequently coupling recess 138, may be expanded through heating and then subsequently cooled in order to contract around coupling projection 136 such that substrate 112 causes compressive stress on coupling projection 136. For example, substrate 112 may be heated prior to coupling substrate 112 to superabrasive table 114. Coupling projection 136 of superabrasive table 114 may then be positioned into coupling recess 138 of substrate 112. Subsequently, substrate 112 may be cooled such that portions of substrate 112 defining coupling recess 138 contract around coupling projection 136 of superabrasive table 114. In some embodiments, coupling projection 136 may be cooled (in combination with or independently from heating of coupling recess 138) prior to positioning coupling projection 136 at least partially within coupling recess 138. For example, coupling projection 136 may be cooled by exposure to and/or immersion in liquid nitrogen.

In certain embodiments, superabrasive table 114 may be coupled to substrate 112 in such a manner that superabrasive table 114 may subsequently be removed from substrate 112 (e.g., if superabrasive table 114 becomes worn or damaged). For example, superabrasive element 110 may be heated to a temperature sufficient to cause expansion of substrate 112 so as to facilitate removal of coupling projection 136 from coupling recess 138. In some embodiments, superabrasive element 110 may be heated to a temperature sufficient to cause a brazing metal or other material disposed between superabrasive table 114 and substrate 112 to soften and/or melt, facilitating separation of superabrasive table 114 from substrate 112.

In various embodiments, coupling projection 136 may not extend entirely across superabrasive table 114 from one portion of superabrasive side surface 128 to an opposite portion of superabrasive side surface 128. As such, first end surface 146 and/or second end surface 148 of coupling projection 136 may not extend to the same diameter or position as superabrasive side surface 128. Additionally, coupling recess 138 may not extend entirely across substrate 112 from one portion of substrate side surface 118 to an opposite portion of superabrasive side surface 118. Accordingly, first end opening 147 and/or second end opening 149 may not be defined in substrate side surface 118 of substrate 112. Rather, coupling recess 138 may include a single end opening (e.g., second end opening 149) defined in substrate side surface 118.

In various embodiments, a superabrasive element may comprise a superabrasive table formed of a plurality of superabrasive table segments. FIGS. 9A-9C show an exemplary superabrasive element 210 comprising a plurality of superabrasive table segments 214 according to at least one embodiment. As illustrated in FIGS. 9A-9C, superabrasive element 210 may include a substrate 212 defining two coupling recesses 238. Each coupling recess 238 may include an end opening 249 defined in substrate side surface 218. In some embodiments, coupling recesses 238 may connect to one another as shown in FIG. 9A. In additional embodiments, coupling recesses 238 may be separated from each other by a portion of substrate 212 disposed therebetween. Superabrasive element 210 may comprise two superabrasive table segments 214 each having a coupling projection 236 configured to fit within a corresponding coupling recess 238 defined within substrate 212. Each superabrasive table segment 214 may include a superabrasive face 226, a superabrasive side surface 228, a chamfer 230, and a coupling projection 236.

Superabrasive table segments 214 and substrate 212 may be manufactured and formed using any suitable technique, such as those described above with respect to FIGS. 1A, 1B, 4A-4D and 6A-6C. In some embodiments, superabrasive table segments 214 may be formed separately from each other. In additional embodiments, a single superabrasive table may be manufactured and then formed into separate superabrasive table segments 214 using any suitable technique, such as, for example, those described in the instant disclosure or any other suitable technique, without limitation. For example, both of superabrasive table segments 214 may be formed from a single superabrasive table (e.g., superabrasive table 14 illustrated in FIG. 2). According to at least one embodiment, as shown in FIGS. 9A-9C, superabrasive table segments 214 may each comprise a substantially semi-cylindrical or partial-cylindrical shape (excluding the coupling projection 236) corresponding to portions of substrate 212, which has a substantially cylindrical shape. Superabrasive table segments 214 and substrate 212 may comprise any other suitable shape, size, and configuration, including non-cylindrical shapes, without limitation.

Coupling projections 236 of superabrasive table segments 214 may be at least partially inserted or positioned within corresponding coupling recesses 238 defined in substrate 212. As shown in FIGS. 9B and 9C, coupling projections 236 of superabrasive table segments 214 may be inserted or positioned within coupling recesses 238 defined in substrate 212 such that superabrasive side surface 228 is adjacent to and/or substantially aligned with substrate side surface 218. Coupling projection 236 of each superabrasive table segment 214 may be positioned and secured within a corresponding coupling recess 238 in substrate 212 through any suitable coupling technique, without limitation. Such coupling techniques may include any techniques discussed herein, including, for example, those described above with respect to FIGS. 7, 8A, and 8B. For example, coupling projections 236 of superabrasive table segments 214 may be secured within coupling recesses 238 through, for example, press-fitting, interference-fitting, brazing, welding, sintering, bonding, pin attachment, frictional engagement, threaded attachment, mechanical fastening, and/or through any other suitable attachment technique, without limitation. In some embodiments, coupling projections 236 may be inserted or positioned into coupling recesses 238 until one or more surface regions of superabrasive table segments 214 are brought into abutment with one or more adjacent surface regions of substrate 212. In certain embodiments, superabrasive element 210 may include only one superabrasive table segment 214 coupled to substrate 212.

According to at least one embodiment, superabrasive table segments 214 secured to substrate 212 may be disposed near and/or adjacent to each other. Superabrasive table segments 214 may at least partially abut one another or may be separated from one another when they are both coupled to substrate 212. In some embodiments, as shown in FIGS. 9B and 9C, superabrasive table segments 214 may be separated from one another by a gap 258, thereby ensuring that superabrasive table segments 214 may be sufficiently positioned and secured within coupling recesses 238 without encountering resistance from each other.

The multiple superabrasive table segments 214 may enable the cutting or bearing life of superabrasive element 210 to be extended and/or may reduce costs for repairing worn and/or damaged cutting surfaces of superabrasive element 210. For example, superabrasive table segments 214 may each be coupled to substrate 212 in such a manner that superabrasive table segments 214 may be individually removed from substrate 212. For example, superabrasive element 210 may be heated to a temperature sufficient to cause expansion of substrate 212 so as to facilitate removal of one or more of superabrasive table segments 214 from substrate 212. In some embodiments, superabrasive element 210 may be heated to a temperature sufficient to cause a brazing metal or other material disposed between one or more of superabrasive table segments 214 and substrate 212 to melt, enabling separation of one or more superabrasive table segments 214 from substrate 212. In some environments, one of superabrasive table segments 214 may become excessively worn and/or damaged prior to the other superabrasive table segment 214. Superabrasive element 210 may be configured to enable only the excessively worn and/or damaged superabrasive table segment 214 to be removed and subsequently replaced, while leaving the other superabrasive table segment 214 coupled to substrate 212. Accordingly, costs for repairing worn superabrasive elements 210 may be reduced.

Figure 10A:
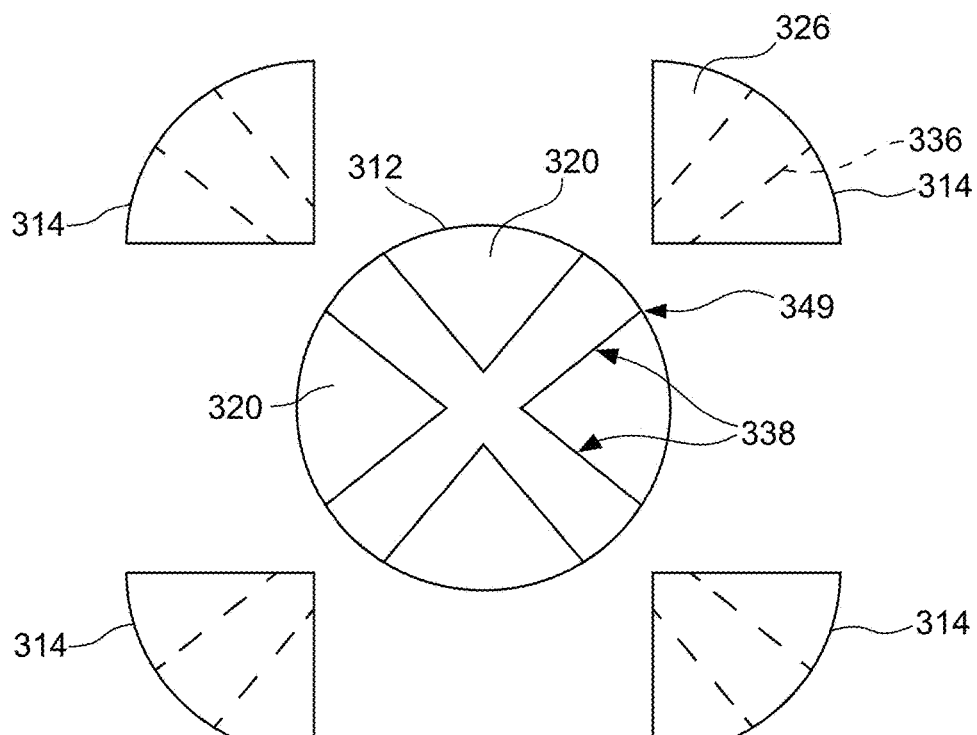
FIG. 10A is an exploded top view of an exemplary superabrasive element according to at least one embodiment.
Figure 10B:
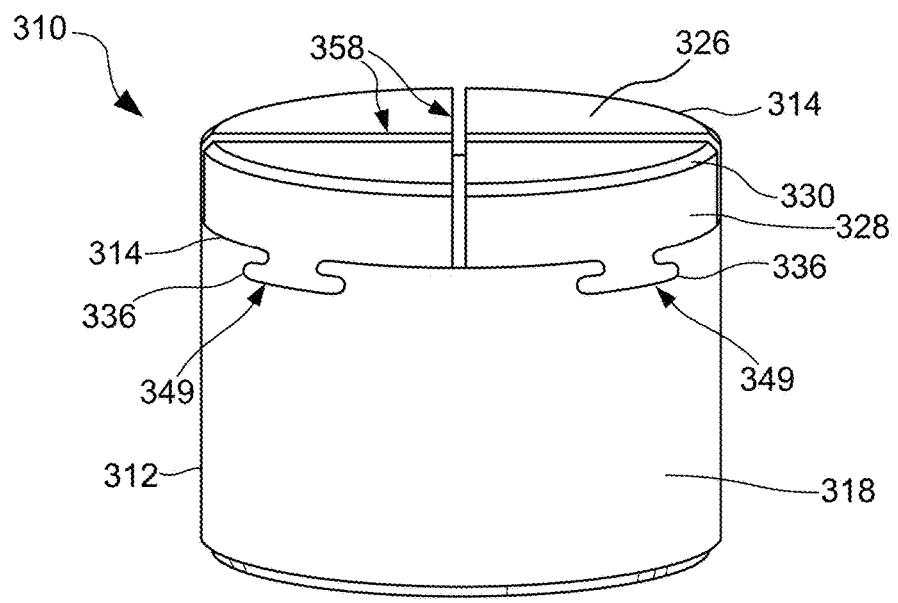
FIG. 10B is a perspective view of the exemplary superabrasive element shown in FIG. 10A.

FIGS. 10A and 10B show an exemplary superabrasive element 310 comprising a plurality of superabrasive table segments 314 according to at least one embodiment. As illustrated in FIGS. 10A and 10B, superabrasive element 310 may comprise a substrate 312 defining four coupling recesses 338. Each coupling recess 338 may include an end opening 349 defined in substrate side surface 318. In some embodiments, coupling recesses 338 may connect to one another as shown in FIG. 10A. In additional embodiments, two or more of coupling recesses 338 may be separated from each other by a portion of substrate 312 disposed therebetween. Superabrasive element 310 may comprise four superabrasive table segments 314 each having a coupling projection 336 configured to fit within a corresponding coupling recess 338 defined within substrate 312. Each superabrasive table segment 314 may include a superabrasive face 326, a superabrasive side surface 328, a chamfer 330, and a coupling projection 336.

Superabrasive table segments 314 and substrate 312 may be manufactured and formed using any suitable technique, such as those described above with respect to FIGS. 1A, 1B, 4A-4D and 6A-6C. In some embodiments, superabrasive table segments 314 may be formed separately from each other. In additional embodiments, a single superabrasive table may be manufactured and then formed (e.g., by grinding, cutting, laser ablation, or any other process) into separate superabrasive table segments 314 using any suitable technique, such as, for example, those described in the instant disclosure or any other suitable technique, without limitation. For example, each of superabrasive table segments 314 may be formed from a single superabrasive table (e.g., superabrasive table 14 illustrated in FIG. 2). According to at least one embodiment, as shown in FIGS. 10A and 10B, superabrasive table segments 314 may each comprise a substantially partial-cylindrical shape (excluding coupling projection 336) corresponding to portions of substrate 312, which has a substantially cylindrical shape. Superabrasive table segments 314 and substrate 312 may comprise any other suitable shape, size, and configuration, including non-cylindrical shapes, without limitation.

Coupling projections 336 of superabrasive table segments 314 may be at least partially inserted or positioned within corresponding coupling recesses 338 defined in substrate 312. As shown in FIG. 10B, coupling projections 336 of superabrasive table segments 314 may be inserted or positioned within coupling recesses 338 defined in substrate 312 such that superabrasive side surface 328 is adjacent to and/or substantially aligned with substrate side surface 318. Coupling projection 336 of each superabrasive table segment 314 may be positioned and secured within a corresponding coupling recess 338 in substrate 312 through any suitable coupling technique, without limitation. Such coupling techniques may include any techniques discussed herein, including, for example, those described above with respect to FIGS. 7, 8A, and 8B. For example, coupling projections 336 of superabrasive table segments 314 may be secured within coupling recesses 338 through, for example, press-fitting, interference-fitting, brazing, welding, sintering, bonding, pin attachment, frictional engagement, threaded attachment, mechanical fastening, and/or through any other suitable attachment technique, without limitation. In some embodiments, coupling projections 336 may be positioned within coupling recesses 338 until one or more surface regions of superabrasive table segments 314 are brought into abutment with one or more adjacent surface regions of substrate 312. For example, coupling projections 336 may be positioned in coupling recesses 338 until two or more surface regions of superabrasive table segments 314 contact or are compressed by two or more adjacent surface regions of substrate 312. In certain embodiments, superabrasive element 310 may include only one superabrasive table segment 314 coupled to substrate 312.

According to at least one embodiment, superabrasive table segments 314 secured to substrate 312 may be disposed near and/or adjacent to each other. Superabrasive table segments 314 may at least partially abut one another along one or more surfaces or may be separated from one another when they are coupled to substrate 312. In some embodiments, as shown in FIG. 10B, superabrasive table segments 314 may be separated from one another by a gap 358, thereby ensuring that superabrasive table segments 314 may be sufficiently positioned and secured within coupling recesses 338 without encountering resistance from each other.

The multiple superabrasive table segments 314 may enable the cutting or bearing life of superabrasive element 310 to be extended and/or may reduce costs for repairing worn and/or damaged cutting surfaces of superabrasive element 310. For example, superabrasive table segments 314 may each be coupled to substrate 312 in such a manner that superabrasive table segments 314 may be individually removed from substrate 312. For example, superabrasive element 310 may be heated to a temperature sufficient to cause expansion of substrate 312 so as to facilitate removal of one or more of superabrasive table segments 314 from substrate 312. In some embodiments, superabrasive element 310 may be heated to a temperature sufficient to cause a brazing metal or other material disposed between one or more of superabrasive table segments 314 and substrate 312 to melt, enabling separation of one or more superabrasive table segments 314 from substrate 312. In some environments, at least one of superabrasive table segments 314 may become excessively worn and/or damaged prior to the other superabrasive table segment 314. Superabrasive element 310 may be configured to enable only the excessively worn and/or damaged superabrasive table segments 314 to be removed and subsequently replaced, while leaving other superabrasive table segments 314 coupled to substrate 312. Accordingly, costs for repairing worn superabrasive elements 310 may be reduced.

Figure 11A:
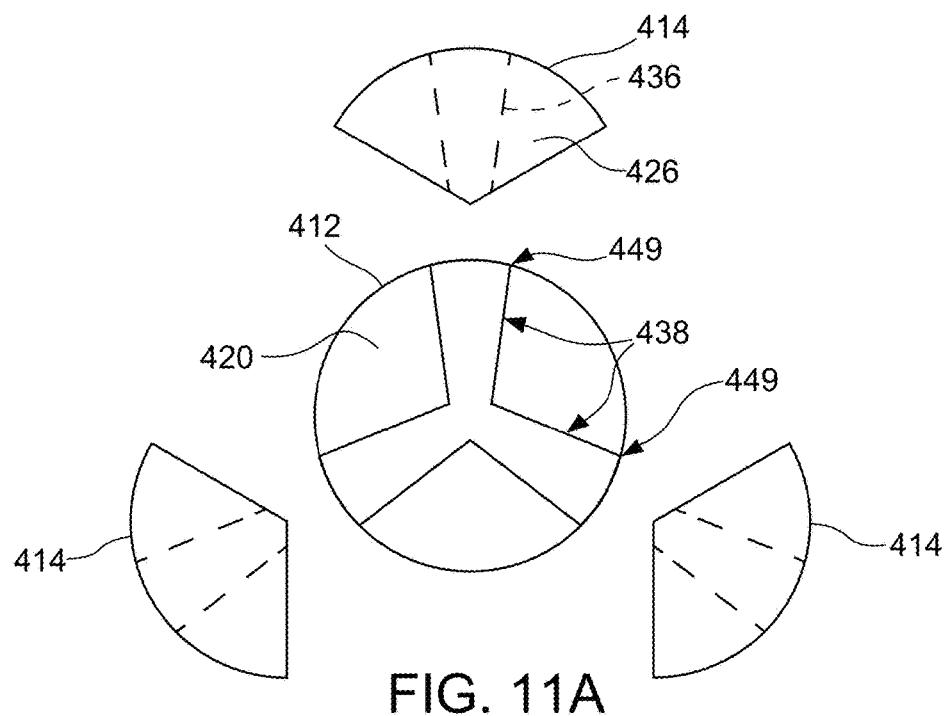
FIG. 11A is an exploded top view of an exemplary superabrasive element according to at least one embodiment.
Figure 11B:
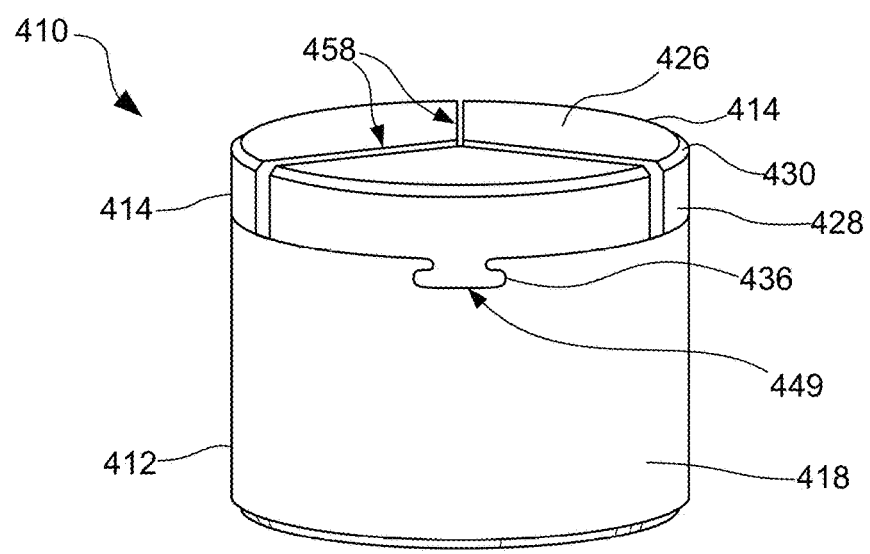
FIG. 11B is a perspective view of the exemplary superabrasive element shown in FIG. 11A.

FIGS. 11A and 11B show an exemplary superabrasive element 410 comprising a plurality of superabrasive table segments 414 according to at least one embodiment. As illustrated in FIGS. 11A and 11B, superabrasive element 410 may comprise a substrate 412 defining three coupling recesses 438. Each coupling recess 438 may include an end opening 449 defined in substrate side surface 418. In some embodiments, coupling recesses 438 may intersect as shown in FIG. 11A. In additional embodiments, two or more of coupling recesses 438 may be separated from each other by a portion of substrate 412 disposed therebetween. Superabrasive element 410 may comprise three superabrasive table segments 414 each having a coupling projection 436 configured to fit within a corresponding coupling recess 438 defined within substrate 412. Each superabrasive table segment 414 may include a superabrasive face 426, a superabrasive side surface 428, a chamfer 430, and a coupling projection 436.

Superabrasive table segments 414 and substrate 412 may be manufactured and formed using any suitable technique, such as those described above with respect to FIGS. 1A, 1B, 4A-4D and 6A-6C. In some embodiments, superabrasive table segments 414 may be formed separately from each other. In additional embodiments, a single superabrasive table may be manufactured and then formed into separate superabrasive table segments 414 using any suitable technique, such as, for example, those described in the instant disclosure or any other suitable technique, without limitation. For example, each of superabrasive table segments 414 may be formed from a single superabrasive table (e.g., superabrasive table 14 illustrated in FIG. 2). According to at least one embodiment, as shown in FIGS. 11A and 11B, superabrasive table segments 414 may each comprise a substantially partial-cylindrical shape (excluding coupling projection 436) corresponding to portions of substrate 412, which has a substantially cylindrical shape. Superabrasive table segments 414 and substrate 412 may comprise any other suitable shape, size, and configuration, including non-cylindrical shapes, without limitation.

Coupling projections 436 of superabrasive table segments 414 may be at least partially inserted or positioned within corresponding coupling recesses 438 defined in substrate 412. As shown in FIG. 11B, coupling projections 436 of superabrasive table segments 414 may be positioned within coupling recesses 438 defined in substrate 412 such that superabrasive side surface 428 is adjacent to and/or substantially aligned with substrate side surface 418. Coupling projection 436 of each superabrasive table segment 414 may be positioned and secured within a corresponding coupling recess 438 in substrate 412 through any suitable coupling technique, without limitation. Such coupling techniques may include any techniques discussed herein, including, for example, those described above with respect to FIGS. 7, 8A, and 8B. For example, coupling projections 436 of superabrasive table segments 414 may be secured within coupling recesses 438 through, for example, press-fitting, interference-fitting, brazing, welding, sintering, bonding, pin attachment, frictional engagement, threaded attachment, mechanical fastening, and/or through any other suitable attachment technique, without limitation. In some embodiments, coupling projections 436 may be positioned within coupling recesses 438 until one or more surface regions of superabrasive table segments 414 are brought into abutment with one or more adjacent surface regions of substrate 412. For example, coupling projections 436 may be positioned in coupling recesses 438 until two or more surface regions of superabrasive table segments 414 contact or are compressed by two or more adjacent surface regions of substrate 412. In certain embodiments, superabrasive element 410 may include only one superabrasive table segment 414 coupled to substrate 412.

According to at least one embodiment, superabrasive table segments 414 secured to substrate 412 may be disposed near and/or adjacent to each other. Superabrasive table segments 414 may contact one another or may be separated from one another when they are coupled to substrate 412. In some embodiments, as shown in FIG. 11B, superabrasive table segments 414 may be separated from one another by a gap 458, thereby ensuring that superabrasive table segments 414 may be sufficiently positioned and secured within coupling recesses 438 without encountering resistance from each other.

The multiple superabrasive table segments 414 may enable the cutting or bearing life of superabrasive element 410 to be extended and/or may reduce costs for repairing worn and/or damaged cutting surfaces of superabrasive element 410. For example, superabrasive table segments 414 may each be coupled to substrate 412 in such a manner that superabrasive table segments 414 may be individually removed from substrate 412. For example, superabrasive element 410 may be heated to a temperature sufficient to cause expansion of substrate 412 so as to facilitate removal of one or more of superabrasive table segments 414 from substrate 412. In some embodiments, superabrasive element 410 may be heated to a temperature sufficient to cause a brazing metal or other material disposed between one or more of superabrasive table segments 414 and substrate 412 to melt, enabling separation of one or more superabrasive table segments 414 from substrate 412. In some environments, at least one of superabrasive table segments 414 may become excessively worn and/or damaged prior to the other superabrasive table segment 414. Superabrasive element 410 may be configured to enable only the excessively worn and/or damaged superabrasive table segments 414 to be removed and subsequently replaced, while leaving other superabrasive table segments 414 coupled to substrate 412. Accordingly, costs for repairing worn superabrasive elements 410 may be reduced.

While FIGS. 9A-11B show superabrasive elements having superabrasive tables formed of 2, 3, and 4 superabrasive table segments, respectively, superabrasive elements may contain any other suitable number and/or configuration of superabrasive table segments, without limitation.

Figure 12A:
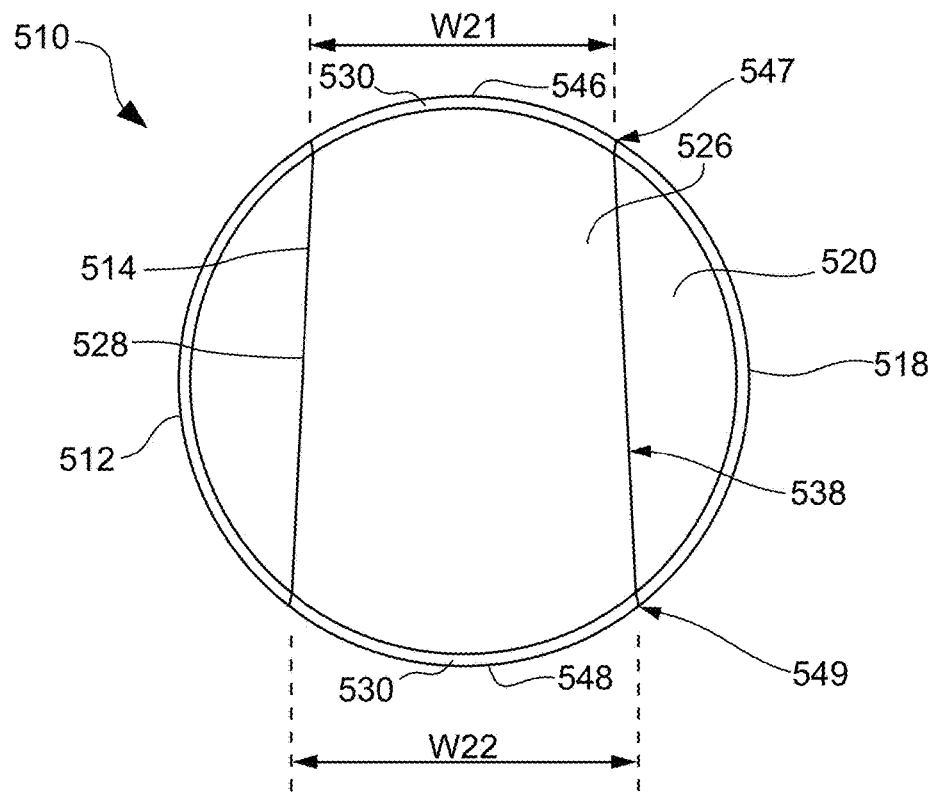
FIG. 12A is a top view of an exemplary superabrasive element according to at least one embodiment.
Figure 12B:
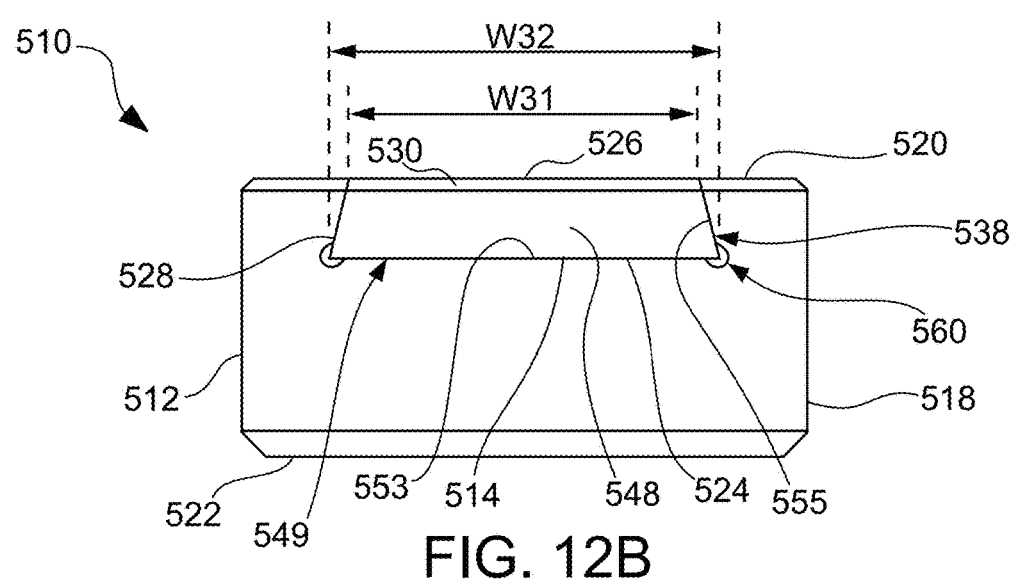
FIG. 12B is a side view of the exemplary superabrasive element shown in FIG. 12A.

FIGS. 12A and 12B show an exemplary superabrasive element 510 according to at least one embodiment. As illustrated in FIGS. 12A and 12B, superabrasive element 510 may include a superabrasive insert 514 and a substrate 512. Superabrasive insert 514 may include a superabrasive face 526, an insert rear surface 524, insert side surfaces 528, a first end surface 546, a second end surface 548, and chamfers 530 formed at the intersections of first and second end surfaces 546 and 548 and superabrasive face 526. Substrate 512 may include a substrate forward surface 520, a substrate rear surface 522, and a substrate side surface 518 extending between substrate forward surface 520 and substrate rear surface 522. A coupling recess 538 for securing superabrasive insert 514 to substrate 512 may be defined in substrate 512. Superabrasive insert 514 and substrate 512 may be manufactured and formed using any suitable method such as those described above with respect to FIGS. 1A, 1B, 4A-4D and 6A-6C.

As illustrated in FIG. 12A, insert side surfaces 528 of superabrasive insert 514 may extend between first end surface 546 and second end surface 548. Generally, superabrasive insert 514 may taper in a width direction as superabrasive insert 514 extends between first end surface 546 and second end surface 548. Insert side surfaces 528 may be tapered such that, as projection side surfaces 158 extend between second side surface 548 and first side surface 546, a width between insert side surfaces 528 is reduced. Due to the tapering of insert side surfaces 528, first end surface 546 may have a smaller width than second end surface 548. More particularly, a portion of insert rear surface 524 adjacent to first end surface 546 may have a width W21 that is less than a width W22 of a portion of insert rear surface 524 adjacent to second end surface 548. Additionally, a portion of superabrasive face 526 adjacent to first end surface 546 may have a width that is less than a width of a portion of superabrasive face 526 adjacent to second end surface 548.

FIG. 12B is a side view of superabrasive element 510. As illustrated in FIG. 12B, superabrasive insert 514 may taper in a width direction as superabrasive insert 514 extends between superabrasive face 526 and insert rear surface 524. For example, a portion of superabrasive face 526 adjacent second end surface 548 may have a width W31 that is less than a width W32 of a portion of insert rear surface 524 adjacent second end surface 548. In some embodiments, superabrasive insert 514 may also taper in a height direction as superabrasive insert 514 extends between first end surface 546 and second end surface 548 (see, e.g., wide portion 144 of coupling projection 136 illustrated in FIG. 4D). In certain embodiments, superabrasive insert 514 may not taper in a height direction and/or a width direction.

As further illustrated in FIGS. 12A and 12B, coupling recess 538 defined in substrate 512 may substantially conform to, complement, or be congruent with a shape of superabrasive insert 514. Coupling recess 538 may be formed to have a first end opening 547 and a second end opening 549 defined in opposite side portion of substrate side surface 518. To correspond with the shape and taper of superabrasive insert 514, first end opening 547 may be narrower than second end opening 549 with recess side surfaces 555 formed to taper as they extend from second end opening 549 to first end opening 547. Additionally, recess side surfaces 555 may also taper as they extend from recess rear surface 553 defining coupling recess 538 to substrate forward surface 520 of substrate 512. In some embodiments, coupling recess 538 may additionally include cavities 560 defined adjacent at least a portion of coupling recess 538. Cavities 560 may be formed such that sharp corners 561 of superabrasive insert 514 do not contact substrate 512. For example, as shown in FIG. 12B, cavities 560 may be defined adjacent recess rear surface 553 of coupling recess 538 at an intersection region between recess side surfaces and recess rear surface 553.

Coupling recess 538 may be sized, shaped, and configured to accommodate superabrasive insert 514. For example, coupling recess 538 may be configured to securely hold superabrasive insert 514, thereby coupling substrate 512 to superabrasive insert 514. Accordingly, a first end opening 547 of coupling recess 538 may be narrower than a second end opening 549 of coupling recess 538. Recess side surfaces 555 may be formed to taper as they extend from second end opening 549 to first end opening 547. Optionally, recess side surfaces 555 may also taper as they extend from recess rear surface 553 of coupling recess 538 to substrate forward surface 520. Coupling recess 538 may further include cavities 560 at the corners of coupling recess 538. In some embodiments, cavities 560 may be defined adjacent at least a portion of coupling recess 538. For example, as shown in FIG. 12B, cavities 560 may be defined adjacent recess rear surface 553 of coupling recess 538 at intersection regions between recess side surfaces 555 and recess rear surface 553.

Superabrasive insert 514 and substrate 512 may be manufactured and formed using any suitable technique described herein (see, e.g., FIGS. 1A, 1B, 4A-4D and 6A-6C). In some embodiments, a superabrasive element may include a plurality of superabrasive inserts and/or corresponding coupling recesses. In at least one embodiment, superabrasive insert 514 may be at least partially formed and/or shaped during, for example, a sintering process to form superabrasive insert 514. In various embodiments, a superabrasive table (e.g., superabrasive table 14 illustrated in FIG. 2) may first be manufactured and then processed using any suitable technique, including, for example, a lapping process, a grinding process, a wire EDM process, or any other suitable material-removal process to form one or more superabrasive inserts 514.

Superabrasive insert 514 may be coupled to substrate 512 to form superabrasive element 510. Superabrasive insert 514 may be at least partially inserted or positioned within coupling recess 538 defined in substrate 512. First end surface 546 of superabrasive insert 514 may be inserted or positioned within coupling recess 538 through second end opening 549 of coupling recess 538 defined in substrate 512. Superabrasive insert 514 may be positioned within coupling recess 538 of substrate 512 so that second end surface 548 of superabrasive insert 514 is adjacent to second end opening 549 of coupling recess 538, first end surface 546 is adjacent to first end opening 547, and insert side surfaces 528 are adjacent to the corresponding recess side surfaces 555. According to at least one embodiment, superabrasive face 526 of superabrasive insert 514 may be substantially level with substrate forward surface 520 of substrate 512. In additional embodiments, superabrasive face 526 of superabrasive insert 514 may protrude in a forward direction past substrate forward surface 520 of substrate 512. In some embodiments, one or more clearance spaces may be defined between at least a portion of superabrasive insert 514 and substrate 512.

Superabrasive insert 514 may be secured in coupling recess 538 of substrate 512 through any suitable coupling technique, without limitation. For example, superabrasive insert 514 may be secured within coupling recess 538 through, for example, press-fitting, interference-fitting, brazing, welding, sintering, bonding, pin attachment, frictional engagement, threaded attachment, mechanical fastening, and/or through any other suitable attachment technique, without limitation. For example, superabrasive insert 514 may be secured in coupling recess 538 of substrate 512 through an interference fit between superabrasive insert 514 and coupling recess 538. In some embodiments, superabrasive insert 514 may be positioned within coupling recess 538 until one or more surface regions of superabrasive insert 514 are brought into abutment with one or more adjacent surface regions of substrate 512 defining coupling recess 538. For example, superabrasive insert 514 may be positioned in coupling recess 538 until two or more surface regions of superabrasive insert 514 contact or are compressed by two or more adjacent surface regions of substrate 512. For example, insert side surfaces 528 and/or insert rear surface 524 of superabrasive insert 514 may at least partially abut/contact corresponding recess side surfaces 555 and/or recess rear surface 553, respectively.

As surface regions of superabrasive insert 514 contact or otherwise abut surface regions of substrate 512, superabrasive insert 514 and substrate 512 may cause or exert stresses on each other. For example, superabrasive insert 514 and/or coupling recess 538 may be subjected to compressive, tensile, and/or shear stresses. Such stresses may increase as superabrasive insert 514 is further forced into coupling recess 538 and into closer abutment with portions of substrate 512 defining coupling recess 538. For example, superabrasive insert 514 may be forced into a compressed state within coupling recess 538 by substrate 512 and at least a portion of substrate 512 (e.g., the side portions) may be forced outward by coupling projection 536. In various embodiments, a stopping feature, such as, for example, a portion of a drill bit or bearing apparatus, may positioned adjacent to first end surface 546 to prevent superabrasive insert 514 from being forced beyond a desired position within coupling recess 538. For example, superabrasive element 510 may be positioned on a drill bit such that first end surface 546 of superabrasive insert 514 is disposed adjacent to and/or abutting a portion of the drill bit, which acts as a stopping feature (see, e.g., FIGS. 22-24, which each show a bit body 76 having a portion positioned adjacent to an end of superabrasive insert 114). Such a stopping feature may prevent superabrasive insert 114 from splitting, cracking, and/or otherwise damaging substrate 512 by preventing superabrasive insert 514 from being forced beyond a critical distance within coupling recess 538.

Stresses exerted by superabrasive insert 514 and substrate 512 on one another may secure superabrasive insert 514 to substrate 512. Additionally, as will be discussed in greater detail below with respect to FIG. 13A, any suitable material may be disposed between at least a portion of superabrasive insert 514 and substrate 512. For example, any suitable metallic, polymer, and/or other suitable compound may be disposed between at least a portion of superabrasive insert 514 and substrate 512 to more securely couple superabrasive insert 514 to substrate 512 and/or to otherwise customize the coupling between superabrasive insert 514 and substrate 512 as desired.

Figure 13A:
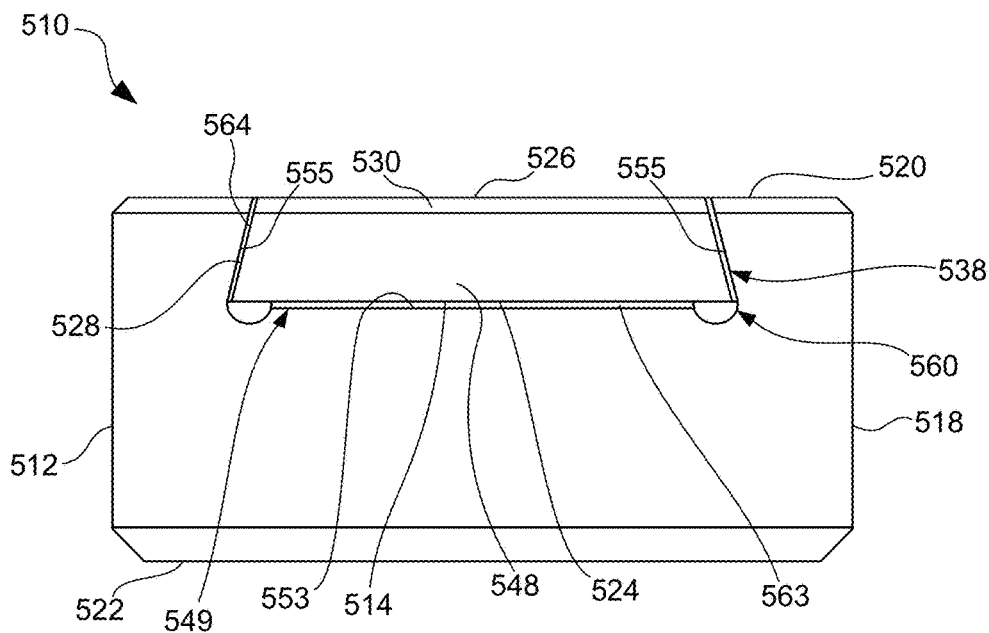
FIG. 13A is a side view of an exemplary superabrasive element according to at least one embodiment.

FIG. 13A illustrates an exemplary configuration for securing superabrasive insert 514 in coupling recess 538 of substrate 512. As illustrated in FIG. 13A, superabrasive insert 514 may be secured in coupling recess 538 of substrate 512, by disposing a material layer 563 between insert rear surface 524 of superabrasive insert 514 and recess rear surface 553 defining coupling recess 538 in substrate 512. In various embodiments, one or more material layers may be placed in between superabrasive insert 514 and substrate 512. For example, material layer 564 may be disposed between insert side surfaces 528 and recess side surfaces 555. As used herein, the terms "abut" and "contact" may refer to indirect contact and/or abutment through a thin layer. For example, as shown in FIG. 13A, superabrasive insert 514 may abut and/or contact substrate 512 through material layer 563 and/or material layer 564. As used herein, the terms "direct contact" and "directly abut" may refer to direct contact and/or abutment between portions of two or more items without a layer disposed between the portions. For example, as shown in FIG. 12B, at least a portion of superabrasive insert 514 may directly abut and/or directly contact substrate 512 without a material layer disposed therebetween.

Material layers 563 and 564 may comprise any suitable material and configuration, without limitation. For example, material layers 563 and 564 may comprise a malleable metallic and/or polymer material. In one embodiment, material layers 563 and/or 564 may each comprise a shim formed of a malleable metallic material, such as a copper material, and/or a malleable refractory material, such as tantalum, niobium, and/or molybdenum. In additional embodiments, material layers 563 and 564 may each comprise a plating or coating layer formed on surfaces of superabrasive insert 514 and/or on surfaces of substrate 512 defining coupling recess 538. For example, layers 563 and 564 may each comprise a material metallic foil, a coating, such as a CVD coating, an ADLC coating, and/or a monocrystalline diamond coating, an adhesive, a brazing metal, a refractory metal, and/or any other suitable material. Material layers 563 and/or 564 may provide a tighter and more secure fit between superabrasive insert 514 and coupling recess 538 of substrate 512 and may provide a more even distribution of stresses that are developed about superabrasive insert 514 while superabrasive insert 514 is disposed within coupling recess 538. Additionally, material layers 563 and/or 564 may prevent movement and/or vibration of superabrasive insert 514 with respect to substrate 512 during use. In some embodiments, material layers 563 and/or 564 may comprise a relatively conductive material, such as a metallic material, that may conduct heat away from superabrasive insert 514. Material layers 563 and/or 564 may also facilitate removal of superabrasive insert 514 from substrate 512. In some embodiments, for example, superabrasive insert 514 may be heated to a temperature sufficient to cause material layers 563 and/or 564 to soften, melt, and/or otherwise degrade, facilitating separation of superabrasive table 514 from substrate 512.

According to some embodiments, excess material from material layers 563 and/or 564 may migrate to one or more of cavities 560. For example, portions of material layers 563 and/or 564 may collect in cavities 560 in response to heat, force, and/or pressure applied to superabrasive insert 514, substrate 512, and/or material layers 563 and 564 during positioning or removal of superabrasive insert 514 with respect to substrate 512 and/or during usage of superabrasive element 510. One or more material layers may be incorporated into any of the embodiments described herein between one or more surfaces of a superabrasive insert or coupling projection and one or more corresponding surfaces of a coupling recess defined in a substrate, bit body, bearing apparatus, or other suitable member, without limitation.

Figure 13B:
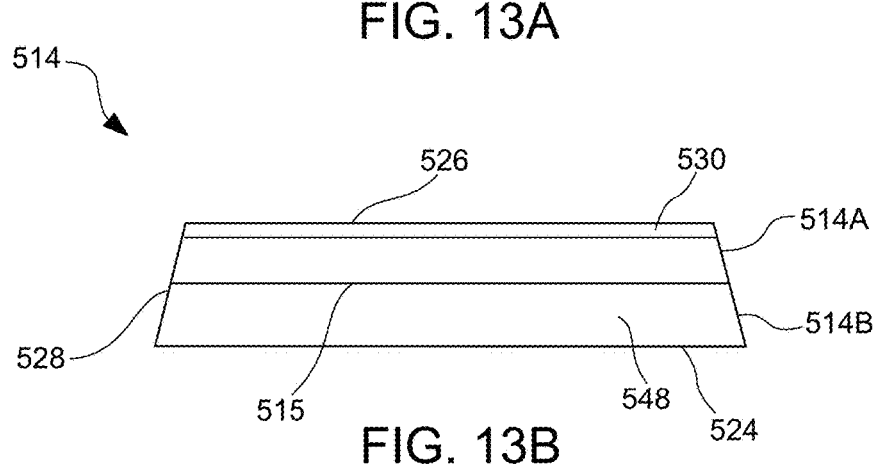
FIG. 13B is a side view of an exemplary superabrasive insert according to at least one embodiment.

FIG. 13B shows an exemplary superabrasive insert 514 according to at least one embodiment. As shown in FIG. 13B, superabrasive insert 514 may comprise a first insert volume 514A and a second insert volume 514B coupled to first insert volume 514A. First insert volume 514A may be coupled to second insert volume 514B through brazing, welding, sintering, pin attachment, frictional engagement, threaded attachment, mechanical fastening, and/or through any other suitable attachment technique, without limitation. According to at least one embodiment, first insert volume 514A and second insert volume 514B may each include different materials. For example, first insert volume 514A and second insert volume 514B may include materials that differ in various components and/or characteristics.

In some embodiments, first insert volume 514A and second insert volume 514B may each include a superabrasive material, such as a polycrystalline diamond material, with first insert volume 514A exhibiting characteristics differing from those exhibited by second insert volume 514B. For example, first insert volume 514A may comprise a polycrystalline diamond material exhibiting higher abrasion characteristics than second insert volume 514B. Additionally, second insert volume 514B may comprise, for example, a polycrystalline diamond material that exhibits greater durability (e.g., tensile strength, hardness, fracture resistance, etc.) in comparison with first insert volume 514A.

In certain embodiments, first insert volume 514A may include a superabrasive material, such as a polycrystalline diamond material, that is coupled to a second insert volume 514B comprising a non-superabrasive material, such as a carbide material. Examples of carbide materials in second insert volume 514B include, without limitation, cobalt, nickel, and/or iron-cemented tungsten carbide materials. Second insert volume 514B may additionally or alternatively include a metallic material (e.g., steel, titanium, etc.), a ceramic material, and/or any other suitable material.

Figure 14A:
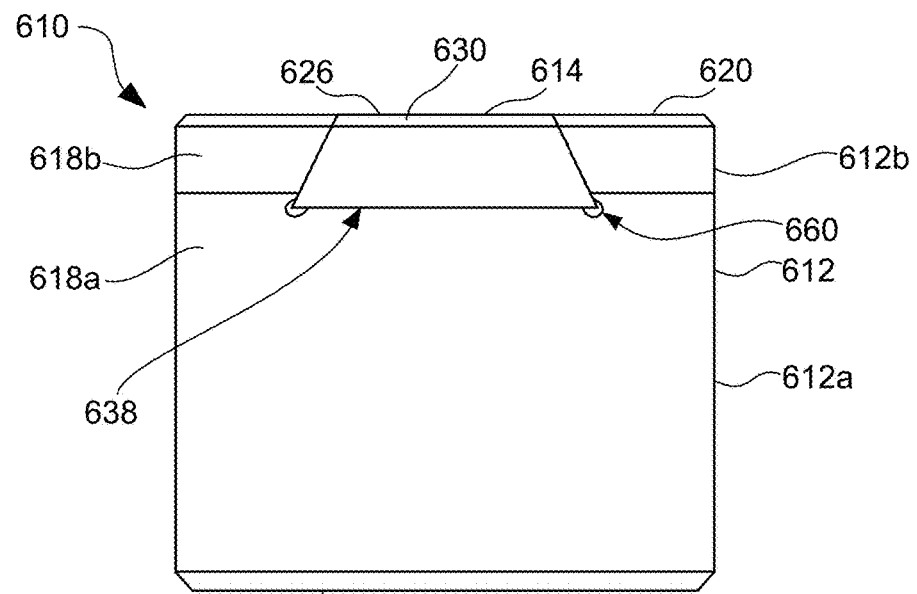
FIG. 14A is a side view of an exemplary superabrasive element according to at least one embodiment.

FIG. 14A is a side view of an exemplary superabrasive element 610 according to at least one embodiment. As illustrated in FIG. 14A, superabrasive element 610 may include a substrate 612 and a superabrasive insert 614 that is disposed in coupling recess 638 defined in substrate 612. Superabrasive insert 614 may taper in a width and/or a height direction (see, e.g., tapered coupling projections 136, 236, 336, and 436 described above with respect to FIGS. 3-11B and tapered superabrasive inserts 514 and 614 described above with respect to FIGS. 12A-14). In some embodiments, a clearance space may be defined between at least a portion of superabrasive insert 614 and substrate 612.

Substrate 612 may include a first substrate portion 612a and a second substrate portion 612b. As illustrated in FIG. 14A, superabrasive insert 614 may include a superabrasive face 626 and a chamfer 630 formed at the intersection of superabrasive face 626 and a side surface. First substrate portion 612a may include a substrate rear surface 622 and a first substrate side surface 618a extending between substrate rear surface 622 and second substrate portion 612b. Second substrate portion 612b may include a second substrate side surface 618b extending between first substrate portion 612a and substrate forward surface 620. Coupling recess 638 may further include cavities 660 at the corners of coupling recess 638. In some embodiments, a clearance space may be defined between at least a portion of superabrasive insert 614 and substrate 612. Such a clearance may prevent separation of first substrate portion 612a from second substrate portion 612b by reducing stresses between superabrasive insert 614 and substrate 612.

According to at least one embodiment, first substrate portion 612a and second substrate portion 612b may be formed of different materials. For example, first substrate portion 612a may comprise a cemented carbide material, such as a cobalt-cemented tungsten carbide material and/or any other suitable material. In some embodiments, first substrate portion 612a may include a suitable metal-solvent catalyst material, such as, for example, cobalt, nickel, iron, and/or alloys thereof. First substrate portion 612a may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof.

Second substrate portion 612b may comprise one or more of the materials listed above with respect to first substrate portion 612a. Second substrate portion 612b may additionally or alternatively comprise, for example, a PDC impregnated carbide material, a composite diamond material, and/or any other suitable material or combination of materials, without limitation. In some embodiments, first substrate portion 612a and second substrate portion 612b may each exhibit different characteristics. For example, second substrate portion 612b may be formed of a material having a greater hardness, erosion resistance, and/or fracture resistance than first substrate portion 612a.

As shown in FIG. 14A, coupling recess 638 defined in substrate 612 may extend entirely through second substrate portion 612b and/or through at least a portion of first substrate portion 612a. In some embodiments, coupling recess 638 may extend through only a portion of second substrate portion 612b. Accordingly, superabrasive insert 614 may abut only substrate second portion 612b, or superabrasive insert 614 may abut both first substrate portion 612a and second substrate portion 612b. Superabrasive insert 614 may be positioned and secured within substrate 612 to form superabrasive element 610 according to any of the techniques described herein (see, e.g., superabrasive element 510 shown in FIGS. 12A-13). For example, superabrasive insert 614 may be secured within coupling recess 638 through press-fitting, interference-fitting, brazing, welding, sintering, expansion and subsequent contraction of substrate 612 through heating and cooling, by mechanically capturing superabrasive insert 614 by bonding 612a to 612b, or through any other suitable method of attachment.

Figure 14B:
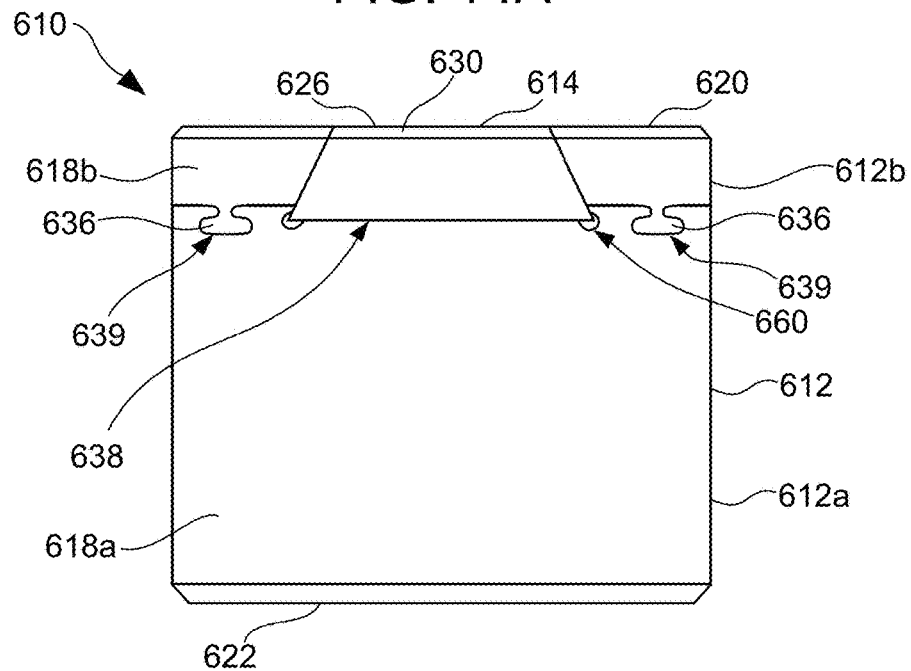
FIG. 14B is a side view of an exemplary superabrasive element according to at least one embodiment.

FIG. 14B is a side view of an exemplary superabrasive element 610 according to various embodiments. As illustrated in FIG. 14B, superabrasive element 610 may include a substrate 612, which includes a first substrate portion 612a and a second substrate portion 612b, and a superabrasive insert 614 that is disposed in coupling recess 638 defined in substrate 612. As illustrated in FIG. 14B, superabrasive insert 614 may include a superabrasive face 626 and a chamfer 630 formed at the intersection of superabrasive face 626 and a side surface. First substrate portion 612a may include a substrate rear surface 622 and a first substrate side surface 618a extending between substrate rear surface 622 and second substrate portion 612b. Second substrate portion 612b may include a second substrate side surface 618b extending between first substrate portion 612a and substrate forward surface 620.

Second substrate portion 612b may include one or more coupling projections 636 that are disposed within one or more coupling recesses 639 defined within first substrate portion 612a. For example, as shown in FIG. 14B, second substrate portion 612b may include two coupling projections 636 that are disposed within two corresponding coupling recesses 639 defined within first substrate portion 612a. In some embodiments, second substrate portion 612b may include two separate substrate members, each of which includes a coupling projection 636. Coupling projections 636 may taper in a width and/or a height direction (see, e.g., tapered coupling projections 136, 236, 336, and 436 described above with respect to FIGS. 3-11B and tapered superabrasive inserts 514 and 614 described above with respect to FIGS. 12A-14). Coupling recess 638 may further include cavities 660 at the corners of coupling recess 638.

Superabrasive insert 614 may be positioned and secured within substrate 612 to form superabrasive element 610 according to any of the techniques described herein (see, e.g., superabrasive element 510 shown in FIGS. 12A-13). For example, superabrasive insert 614 may be secured within coupling recess 638 through press-fitting, interference-fitting, brazing, welding, sintering, expansion and subsequent contraction of substrate 612 through heating and cooling, by mechanically capturing superabrasive insert 614 by bonding 612a to 612b, or through any other suitable method of attachment.

Figure 15A:
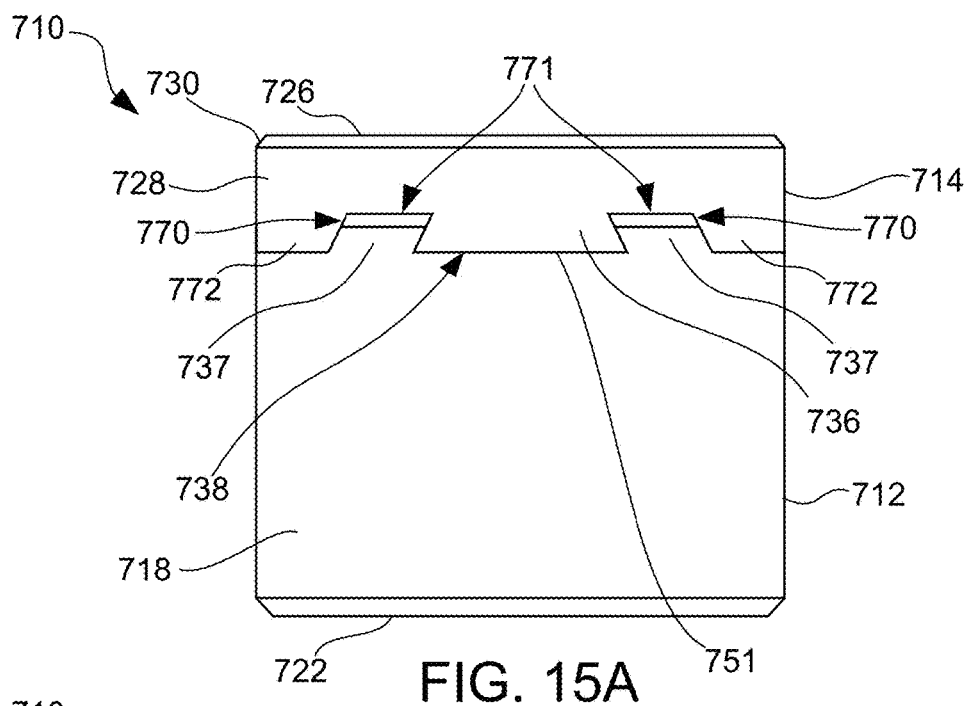
FIG. 15A is a side view of an exemplary superabrasive element according to at least one embodiment.

FIG. 15A is a side view of an exemplary superabrasive element 710 according to at least one embodiment. As illustrated in FIG. 15A, superabrasive element 710 may include a superabrasive table 714 and a substrate 712. Superabrasive table 714 and substrate 712 may be shaped, processed, and assembled in accordance with any of the techniques described herein.

Superabrasive table 714 may include a superabrasive face 726, a superabrasive side surface 728, a chamfer 730, a coupling projection 736 and one or more side projections 772, with recesses 771 being defined between coupling projection 736 and side projections 772. Coupling projection 736 may comprise any suitable shape and configuration. For example, coupling projection 736 may taper in a width and/or a height direction (see, e.g., tapered coupling projections 136, 236, 336, and 436 described above with respect to FIGS. 3-11B and tapered superabrasive inserts 514 and 614 described above with respect to FIGS. 12A-14). As illustrated in FIG. 15A, for example, coupling projection 736 may include a projection rear surface 751. Coupling projection 736 may have a greater width at projection rear surface 751 and may taper to a narrower width in a direction forward of projection rear surface 751. Side projections 772 may be disposed adjacent to superabrasive side surface 728 on opposite sides of coupling projection 736, as illustrated in FIG. 15A. Recesses 771 are formed in superabrasive table 714 between side projections 772 and coupling projection 736.

Substrate 712 may include substrate projections 737 extending in a generally forward direction and a coupling recess 738 defined in substrate 712 between substrate projections 737. When superabrasive table 714 is attached to substrate 712, substrate projections 737 may be disposed in corresponding recesses 771 defined in superabrasive table 714 between coupling projection 736 and side projections 772. As shown in FIG. 15A, substrate projections 737 may each taper in a manner corresponding to the taper of coupling projection 736. Coupling projection 736 and side projections 772 of superabrasive table 714 may contact surface portions of substrate 712 when superabrasive table 714 is coupled to substrate 712.

As further illustrated in FIG. 15A, substrate projections 737 disposed in recesses 771 of superabrasive table 714 may extend partially into recesses 771 so that relief gaps 770 are defined in recesses 771 between superabrasive table 714 and substrate 712. Superabrasive table 714 may be secured to substrate 712 to form superabrasive element 710 according to any of the techniques described herein. For example, coupling projection 736 of superabrasive table 714 may be secured within coupling recess 738 through press-fitting, interference-fitting, brazing, welding, sintering, expansion and subsequent contraction of substrate 612 through heating and cooling, or through any other suitable method of attachment. According to some embodiments, relief gaps 770 defined between superabrasive table 714 and substrate 712 may serve as reservoirs for bonding material or other material that is disposed between superabrasive table 714 and substrate 712. For example, relief gaps 770 between superabrasive table 714 and substrate 712 may be at least partially filled with a material, a material layer (as described hereinbefore), or a coating, such as a metal material, that is disposed between superabrasive table 714 and substrate 712 (e.g., for the purpose of securing superabrasive table 714 to substrate 712).

Figure 15B:
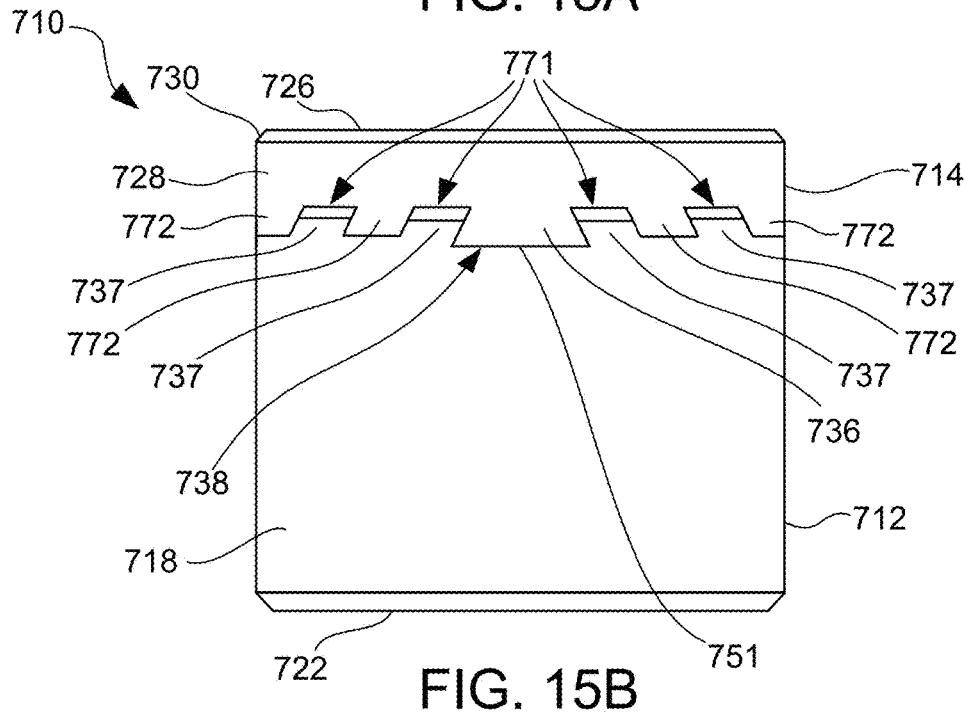
FIG. 15B is a side view of an exemplary superabrasive element according to at least one embodiment.

FIG. 15B is a side view of an exemplary superabrasive element 710 according to various embodiments. As illustrated in FIG. 15B, superabrasive element 710 may include a superabrasive table 714 and a substrate 712. Superabrasive table 714 and substrate 712 may be shaped, processed, and assembled in accordance with any of the techniques described herein.

Superabrasive table 714 may include a superabrasive face 726, a superabrasive side surface 728, a chamfer 730, a coupling projection 736 and a plurality of side projections 772, with recesses 771 being defined between coupling projection 736 and side projections 772. Coupling projection 736 may comprise any suitable shape and configuration. For example, coupling projection 736 may taper in a width and/or a height direction (see, e.g., tapered coupling projections 136, 236, 336, and 436 described above with respect to FIGS. 3-11B and tapered superabrasive inserts 514 and 614 described above with respect to FIGS. 12A-14). As illustrated in FIG. 15B, for example, coupling projection 736 may include a projection rear surface 751. Coupling projection 736 may have a greater width at projection rear surface 751 and may taper to a narrower width in a direction forward of projection rear surface 751.

Side projections 772 may be disposed adjacent to superabrasive side surface 728 on opposite sides of coupling projection 736, as illustrated in FIG. 15B. Projection rear surface 751 may be disposed at a distance from superabrasive face 726 that is substantially the same as a distance at which rear surfaces of side projections 736 are disposed from superabrasive face 726 (see, e.g., FIG. 15A). In some embodiments, projection rear surface 751 may be disposed at a distance from superabrasive face 726 that is different from a distance at which rear surfaces of side projections 736 are disposed from superabrasive face 726. For example, as illustrated in FIG. 15B, projection rear surface 751 may be disposed at a distance from superabrasive face 726 that is greater than a distance at which rear surfaces of side projections 736 are disposed from superabrasive face 726.

Substrate 712 may include a plurality of substrate projections 737 extending in a generally forward direction and a coupling recess 738 defined in substrate 712 between substrate projections 737. When superabrasive table 714 is attached to substrate 712, substrate projections 737 may be disposed in corresponding recesses 771 defined in superabrasive table 714. As shown in FIG. 15B, substrate projections 737 may each taper in a manner corresponding to the taper of coupling projection 736. Coupling projection 736 and side projections 772 of superabrasive table 714 may contact surface portions of substrate 712 when superabrasive table 714 is coupled to substrate 712.

As further illustrated in FIG. 15B, substrate projections 737 disposed in recesses 771 of superabrasive table 714 may extend partially into recesses 771 so that relief gaps (see, e.g., relief gaps 770 illustrated in FIG. 15A) are defined in recesses 771 between superabrasive table 714 and substrate 712. Superabrasive table 714 may be secured to substrate 712 to form superabrasive element 710 according to any of the techniques described herein. For example, coupling projection 736 of superabrasive table 714 may be secured within coupling recess 738 through press-fitting, interference-fitting, brazing, welding, sintering, expansion and subsequent contraction of substrate 612 through heating and cooling, or through any other suitable method of attachment. According to some embodiments, relief gaps 770 defined between superabrasive table 714 and substrate 712 may serve as reservoirs for bonding material or other material that is disposed between superabrasive table 714 and substrate 712. For example, relief gaps 770 between superabrasive table 714 and substrate 712 may be at least partially filled with a material, a material layer (as described hereinbefore), or a coating, such as a metal material, that is disposed between superabrasive table 714 and substrate 712 (e.g., for the purpose of securing superabrasive table 714 to substrate 712).

Figure 16:
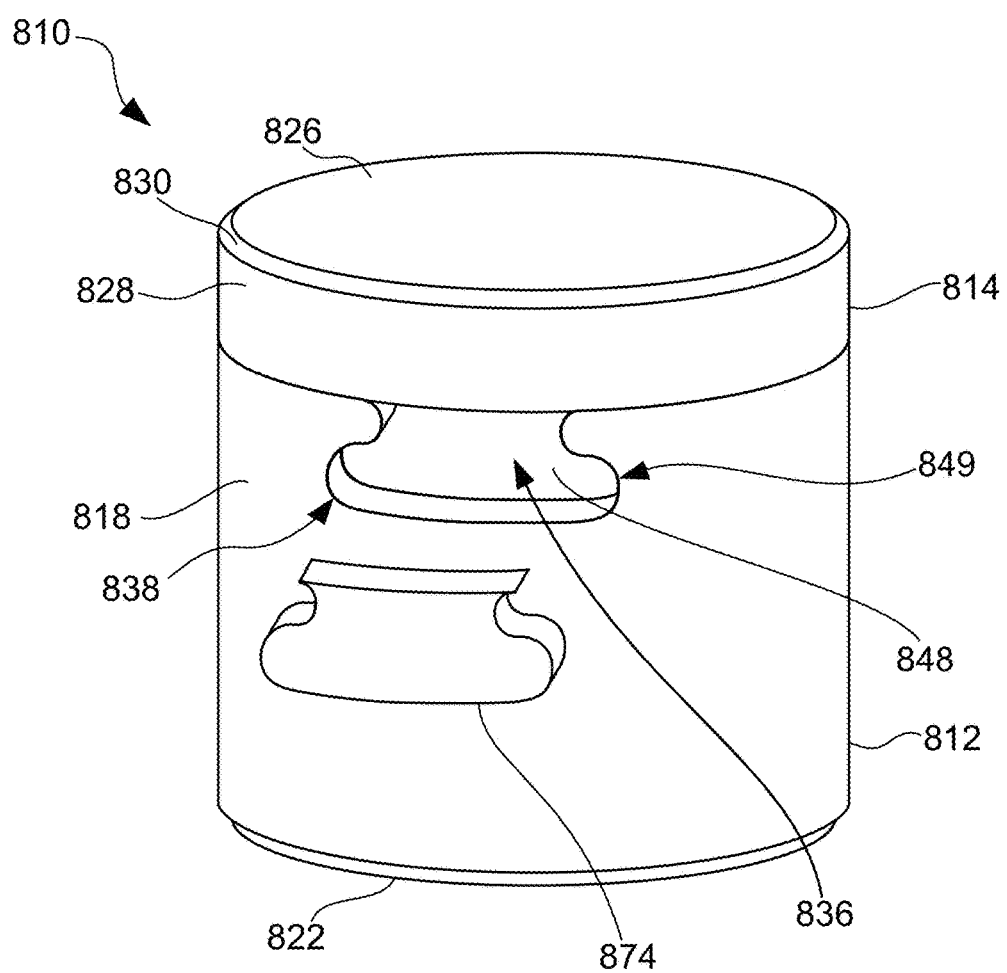
FIG. 16 is an exploded perspective view of an exemplary superabrasive element according to at least one embodiment.

FIG. 16 shows an exemplary superabrasive element 810 according to at least one embodiment. As illustrated in FIG. 16, superabrasive element 810 may include a superabrasive table 814 coupled to a substrate 812. Superabrasive table 814 may include a superabrasive face 826, a superabrasive side surface 828, a chamfer 830, and a coupling projection 836. Substrate 812 may include a substrate side surface 818, a substrate rear surface 822, and a coupling recess 838 for receiving coupling projection 836 of superabrasive table 814 (see, e.g., coupling projection 136 and coupling recess 138 illustrated in FIGS. 3-8B).

Superabrasive table 814 may include a coupling projection 836 that does not extend through the entire length of coupling recess 838 defined in substrate 812. For example, as illustrated in FIG. 16, coupling projection 836 of superabrasive table 814 may be disposed within coupling recess 838 of substrate 812 such that a portion of coupling recess 838 adjacent to an end of coupling projection 836 is open. In other embodiments, a portion of coupling recess 838 adjacent to an end of coupling projection 836 may be closed. For example, a portion of coupling recess 838 that is adjacent to an end surface 848 of coupling projection 836 may have a width that is wider than an opposite end surface (e.g., first end surface 146 shown in FIGS. 4C-4D) of coupling projection 836. As shown in FIG. 16, end surface 848 may be disposed inward of superabrasive side surface 828.

Optionally, superabrasive element 810 may include a coupling insert 874, which may be disposed within the portion of coupling recess 838 not occupied by coupling projection 836. Coupling insert 874 may comprise any material, shape, and configuration suitable for securing superabrasive table 814 to substrate 812. In some embodiments, coupling insert 874 may comprise any suitable material that is formed into a desired shape prior to inserting coupling insert 874 into the end portion of coupling recess 838. For example, coupling insert 874 may comprise a cemented carbide material, such as cobalt-cemented tungsten carbide, titanium carbide, niobium carbide, tantalum carbide, vanadium carbide, chromium carbide, and/or combinations of any of the preceding carbides cemented with iron, nickel, cobalt, and/or alloys thereof. Coupling insert 874 may be fixed within coupling recess 838 using any suitable technique, such as, for example, brazing, welding, and/or bonding, without limitation.

Coupling insert 874 may be secured in coupling recess 838 by brazing, welding, sintering, or through any other suitable means of attachment. Securing coupling insert 874 in coupling recess 838 after coupling projection 836 has been at least partially inserted or positioned within coupling recess 838 may facilitate securing of superabrasive table 814 to substrate 812. For example, coupling insert 874 may prevent coupling projection 836 from separating from coupling recess 838 by providing support that prohibits movement of coupling projection 836 out of coupling recess 838. Coupling insert 874 may additionally prevent vibration or other movement of superabrasive table 814 with respect to substrate 812 by limiting movement of coupling projection 836 within coupling recess 838.

In additional embodiments, a softened and/or liquid material may be disposed within the end portion of coupling recess 838, either in combination with or in place of a coupling insert 874. The material may then be hardened using any suitable technique, without limitation. For example, a melted metal and/or polymeric material may be disposed in coupling recess 838 so as to contact substrate 812 and coupling projection 836, thereby securing superabrasive element 810 to substrate 812.

Figure 17A:
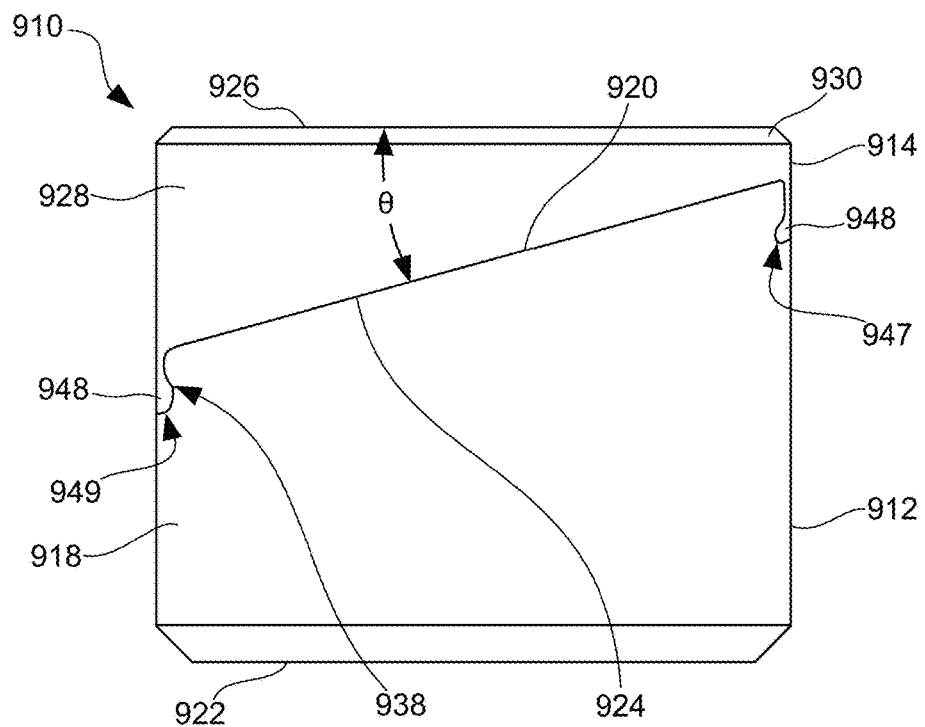
FIG. 17A is a side view of an exemplary superabrasive element according to at least one embodiment.

FIG. 17A shows an exemplary superabrasive element 910 according to at least one embodiment. Superabrasive element 910 may include a superabrasive table 914 coupled to a substrate 912. Superabrasive table 914 may include a superabrasive face 926, a superabrasive side surface 928, a chamfer 930, and a sloped coupling projection 936. Substrate 912 may include a substrate side surface 918, a substrate rear surface 922, and a sloped coupling recess 938 for receiving sloped coupling projection 936 of superabrasive table 914 (see, e.g., coupling projection 136 and coupling recess 138 illustrated in FIGS. 3-8B).

Figure 17B:
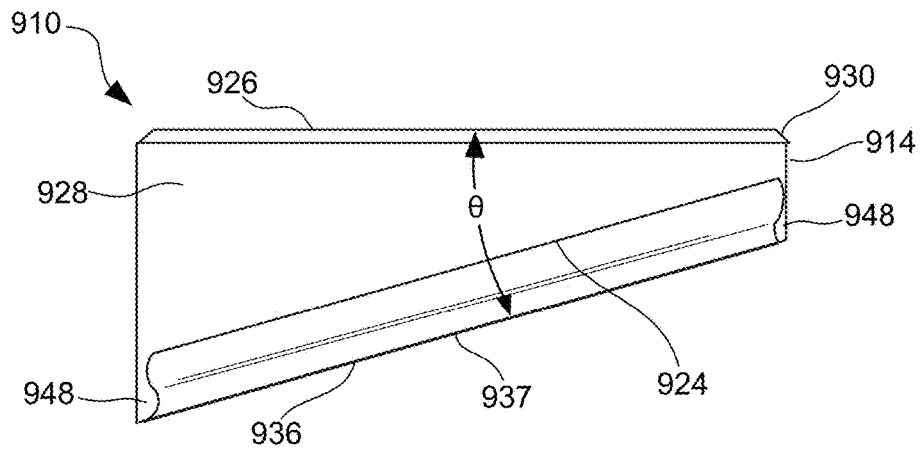
FIG. 17B is a side view of an exemplary superabrasive table according to at least one embodiment.

Sloped coupling projection 936 may include a first end surface 946 and a second end surface 948. First end surface 946 may have a smaller width than second end surface 948. As illustrated in FIGS. 17A and 17B, sloped coupling projection 936 and a superabrasive rear surface 924 adjacent sloped coupling projection 936 may each slope in a generally forward direction and may taper in width and/or height as they extend from second end surface 948 to first end surface 946. Accordingly, a distance between chamfer 930 and first end surface 946 of coupling projection 936 may be less than a distance between chamfer 930 and second end surface 948 of coupling projection 936. As shown in FIGS. 17A and 17B, angle $\theta$ is the inclined angle between superabrasive face 926 and lower surface 937 of coupling projection 936 and/or between superabrasive face 926 and superabrasive rear surface 924.

Sloped coupling recess 938 may include a first end opening 947 and a second end opening 949 corresponding, respectively, to first end surface 946 and second end surface 948 of coupling projection 936. First end opening 947 may have a smaller width than second end opening 949 or vice versa. Sloped coupling recess 938 and a substrate forward surface 920 of substrate 912 adjacent to sloped coupling recess 938 may each slope in a generally forward direction and may taper in width and/or height as they extend from second end opening 949 to first end opening 947 so as to accommodate sloped coupling projection 936.

Coupling projection 936 may be secured in coupling recess 938 defined in substrate 912 through any suitable coupling technique, without limitation. For example, coupling projection 936 of superabrasive table 914 may be secured within coupling recess 938 through, for example, press-fitting, interference-fitting, brazing, welding, sintering, bonding, pin attachment, frictional engagement, threaded attachment, mechanical fastening, and/or through any other suitable attachment technique, without limitation.

Figure 18:
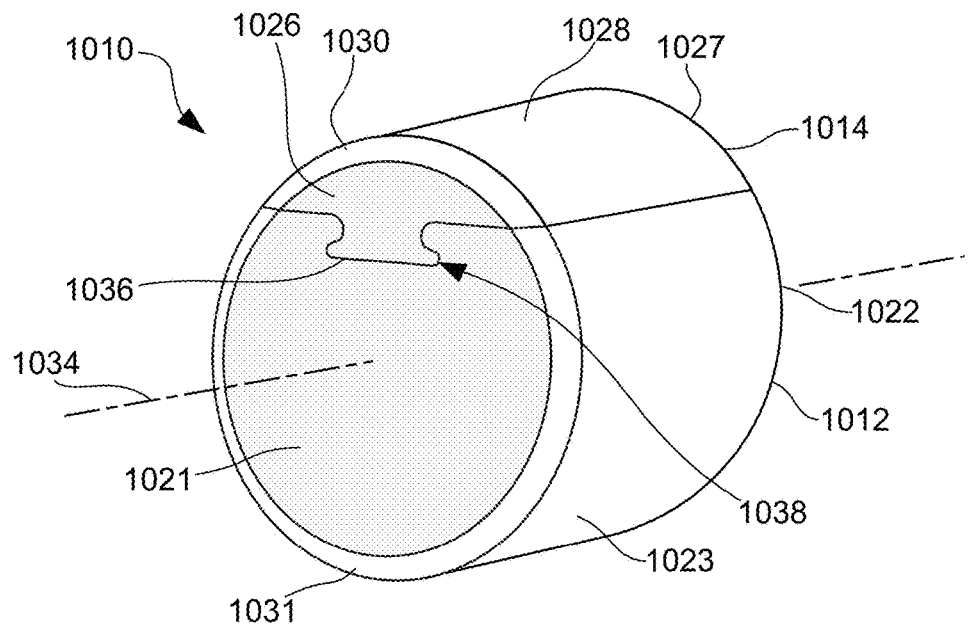
FIG. 18 is a perspective view of an exemplary superabrasive element according to at least one embodiment.

FIG. 18 shows an exemplary superabrasive element 1010 according to at least one embodiment. Superabrasive element 1010 may comprise a superabrasive insert 1014 coupled to a substrate 1012. Superabrasive table 1014 may include a forward superabrasive surface 1026, a rear superabrasive surface 1027, a superabrasive side surface 1028 extending between forward superabrasive surface 1026 and rear superabrasive surface 1027, a chamfer 1030, and a coupling projection 1036. Substrate 1012 may include a forward substrate surface 1021, a rear substrate surface 1022, a substrate side surface 1023 extending between forward substrate surface 1021 and rear substrate surface 1022, a chamfer 1031, and a coupling recess 1036 for receiving coupling projection 1036 of superabrasive table 1014 (see, e.g., coupling projection 136 and coupling recess 138 illustrated in FIGS. 3-8B).

As shown in FIG. 18, superabrasive table 1014 may be formed such that coupling projection 1036 extends between forward superabrasive surface 1026 and rear superabrasive surface 1027. According to at least one embodiment, coupling projection 1036 may extend in a direction that is generally parallel to a central axis 1034 of superabrasive element 1010. Additionally, coupling recess 1038 may be defined in substrate 1012 such that coupling recess 1038 extends between forward substrate surface 1021 and rear substrate surface 1022. In some embodiments, coupling recess 1038 may extend in a direction that is generally along or parallel to substrate side surface 1023 so as to accommodate coupling projection 1036.

Coupling projection 1036 may be secured in coupling recess 1038 defined in substrate 1012 through any suitable coupling technique, without limitation. For example, coupling projection 1036 of superabrasive table 1014 may be secured within coupling recess 1038 through, for example, press-fitting, interference-fitting, brazing, welding, sintering, bonding, pin attachment, frictional engagement, threaded attachment, mechanical fastening, and/or through any other suitable attachment technique, without limitation. Superabrasive table 1014 may be at least partially leached or substantially leached. Such a configuration may improve thermal stability and/or wear resistance during use.

Figure 19:
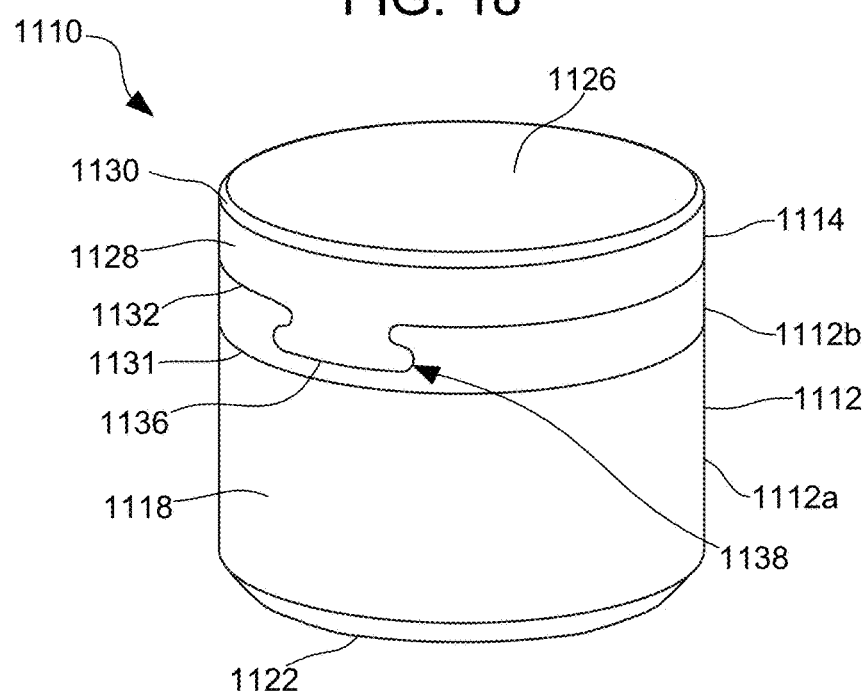
FIG. 19 is a perspective view of an exemplary superabrasive element according to at least one embodiment.

FIG. 19 shows an exemplary superabrasive element 1110 according to at least one embodiment. Superabrasive element 1110 may include a superabrasive table 1114 coupled to a substrate 1112. Superabrasive table 1114 may include a superabrasive face 1126, a superabrasive side surface 1128, a chamfer 1130, and a coupling projection 1136. Substrate 1112 may include a substrate side surface 1118, a substrate rear surface 1122, and a coupling recess 1138 for receiving coupling projection 1136 of superabrasive table 1114 (see, e.g., coupling projection 136 and coupling recess 138 illustrated in FIGS. 3-8B).

Substrate 1112 may include a first substrate portion 1112a and a second substrate portion 1112b. According to some embodiments, first substrate portion 1112a and second substrate portion 1112b may be made of different materials. For example, first substrate portion 1112a may comprise a cemented carbide material, such as a cobalt-cemented tungsten carbide material and/or any other suitable material. In some embodiments, first substrate portion 1112a may include a suitable metal-solvent catalyst material, such as, for example, cobalt, nickel, iron, and/or alloys thereof. First substrate portion 1112a may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Second substrate portion 1112b may also comprise one or more of the materials listed above with respect to first substrate portion 1112a. Second substrate portion 1112b may additionally or alternatively comprise, for example, a PDC impregnated carbide material, a composite diamond material, and/or any other suitable material or combination of materials, without limitation. Second substrate portion 1112b may be coupled to first substrate portion 1112a using any suitable technique, including, for example, brazing, welding, sintering, bonding, threaded attachment, mechanical fastening, and/or through any other suitable coupling technique, without limitation.

As illustrated in FIG. 19, coupling recess 1138 defined in substrate 1112 may extend at least partially through second substrate portion 1112b such that superabrasive table 1114 is positioned adjacent to substrate second portion 1112b when coupling projection 1136 is disposed within coupling recess 1138. First substrate portion 1112a may meet second substrate portion 1112b at a first interface 1131 to form substrate 1112. Superabrasive table 1114 may meet second substrate portion 1112b at a second interface 1132. According to some embodiments, as shown in FIG. 19, coupling recess 1138 may not extend to first substrate portion 1112a. Accordingly, coupling projection 1136 of superabrasive table 1114 may abut second substrate portion 1112b but not first substrate portion 1112a. In additional embodiments, coupling recess 1138 may extend through second substrate portion 1112b to first substrate portion 1112a such that coupling projection 1136 of superabrasive table 1114 is positioned adjacent to both second substrate portion 1112b and first substrate portion 1112a when coupling projection 1136 is disposed within coupling recess 1138.

Coupling projection 1136 may be secured in coupling recess 1138 defined in substrate 1112 through any suitable coupling technique, without limitation. For example, coupling projection 1136 of superabrasive table 1114 may be secured within coupling recess 1138 through, for example, press-fitting, interference-fitting, brazing, welding, sintering, bonding, pin attachment, frictional engagement, threaded attachment, mechanical fastening, and/or through any other suitable attachment technique, without limitation.

Figure 20:
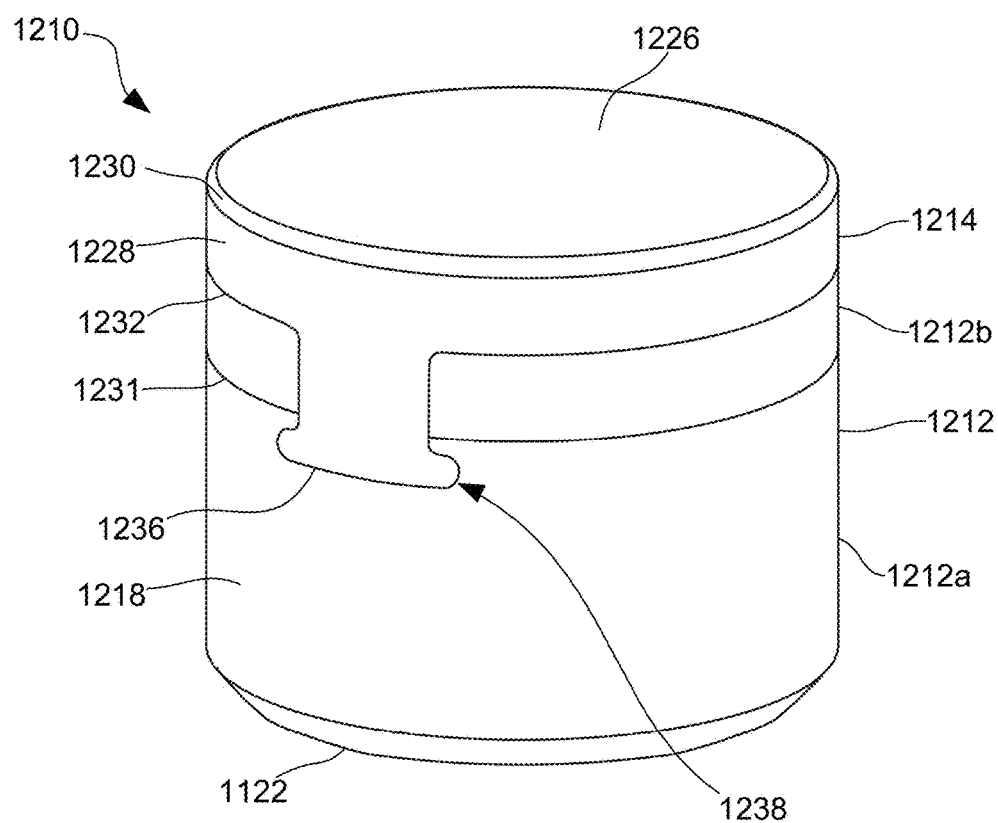
FIG. 20 is a perspective view of an exemplary superabrasive element according to at least one embodiment.

FIG. 20 shows an exemplary superabrasive element 1210 according to at least one embodiment. As illustrated in FIG. 20, superabrasive element 1210 may include a superabrasive table 1214 coupled to a substrate 1212. Superabrasive table 1214 may include a superabrasive face 1226, a superabrasive side surface 1228, a chamfer 1230, and a coupling projection 1236. Substrate 1212 may include a substrate side surface 1218, a substrate rear surface 1222, and a coupling recess 1238 for receiving coupling projection 1236 of superabrasive table 1214 (see, e.g., coupling projection 136 and coupling recess 138 illustrated in FIGS. 3-8B).

Substrate 1212 may include a first substrate portion 1212a and a second substrate portion 1212b. According to some embodiments, first substrate portion 1212a and second substrate portion 1212b may be made of different materials. For example, first substrate portion 1212a may comprise a cemented carbide material, such as a cobalt-cemented tungsten carbide material and/or any other suitable material. In some embodiments, first substrate portion 1212a may include a suitable metal-solvent catalyst material, such as, for example, cobalt, nickel, iron, and/or alloys thereof. First substrate portion 1212a may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Second substrate portion 1212b may also comprise one or more of the materials listed above with respect to first substrate portion 1212a. Second substrate portion 1212b may additionally or alternatively comprise, for example, a PDC impregnated carbide material, a composite diamond material, and/or any other suitable material or combination of materials, without limitation.

As illustrated in FIG. 20, coupling recess 1238 defined in substrate 1212 may extend through second substrate portion 1212b and through at least a portion of first substrate portion 1212a such that superabrasive table 1214 is positioned adjacent to first substrate portion 1212a and second substrate portion 1212b when coupling projection 1236 is disposed within coupling recess 1238. First substrate portion 1212a may meet second substrate portion 1212b at a first interface 1231 to form substrate 1212. Superabrasive table 1214 may meet second substrate portion 1212b at a second interface 1232. First substrate portion 1212a may be adhered to second substrate portion 1212b and/or second substrate portion 1212b may be adhered to superabrasive table 1214 through brazing, welding, and/or any other suitable bonding technique.

According to additional embodiments, first substrate portion 1212a and second substrate portion 1212b may be adhered to each other and to superabrasive table 1214 by a coupling between coupling projection 1236 of superabrasive table 1214 and coupling recess 1238 of substrate 12. For example, coupling projection 1236 may securely hold second substrate portion 1212b between first substrate portion 1212a and superabrasive table 1214.

Coupling projection 1236 may be secured in coupling recess 1238 defined in substrate 1212 through any suitable coupling technique, without limitation. For example, coupling projection 1236 of superabrasive table 1214 may be secured within coupling recess 1138 through, for example, press-fitting, interference-fitting, brazing, welding, sintering, bonding, pin attachment, frictional engagement, threaded attachment, mechanical fastening, and/or through any other suitable attachment technique, without limitation.

Figure 21:
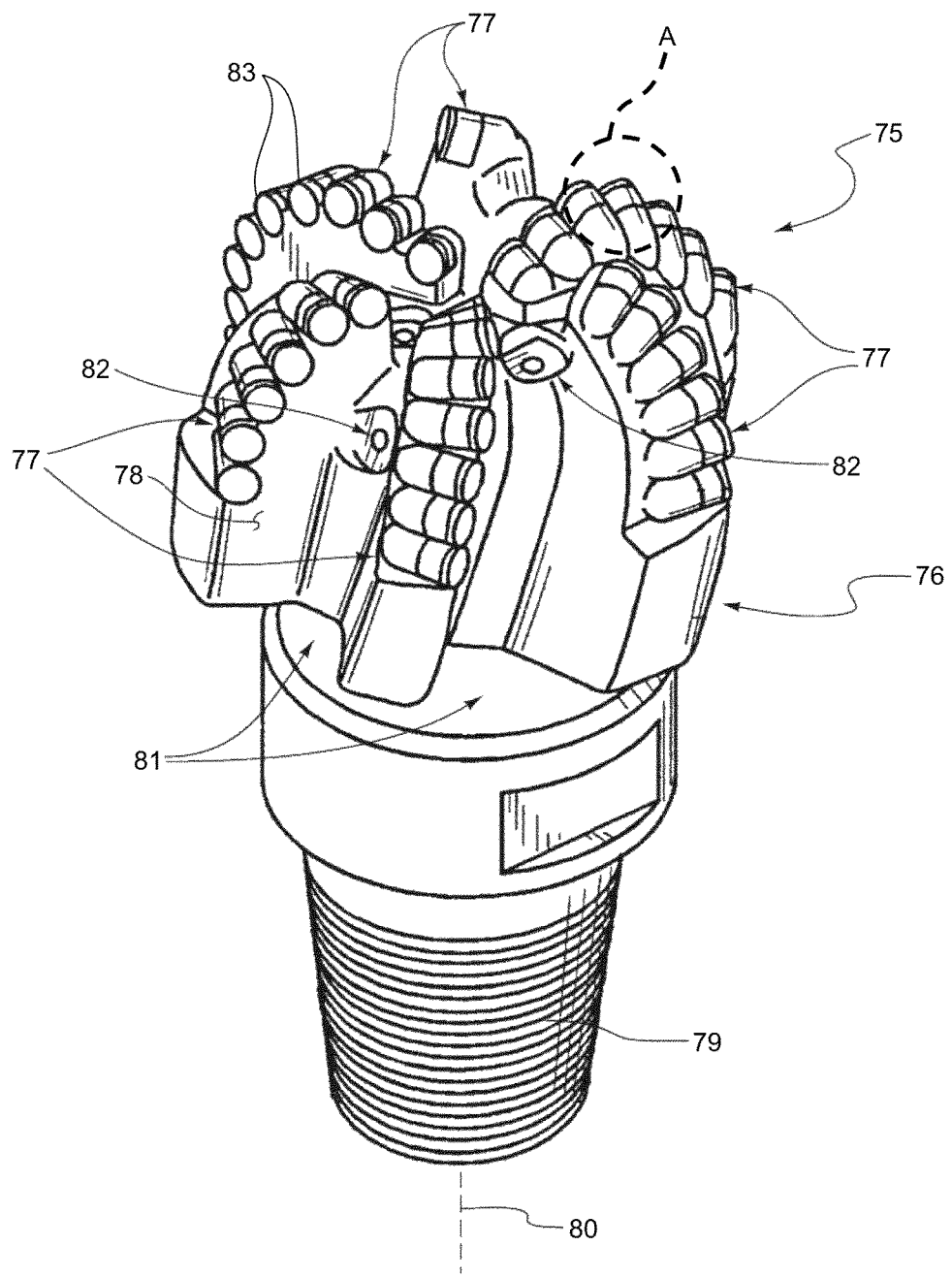
FIG. 21 is a perspective view of an exemplary drill bit according to at least one embodiment.

FIG. 21 is a perspective view of an exemplary drill bit 75 according to at least one embodiment. Drill bit 75 may represent any type or form of earth-boring or drilling tool, including, for example, a rotary drill bit.

As illustrated in FIG. 21, drill bit 75 may comprise a bit body 76 having a longitudinal axis 80. Bit body 76 may define a leading end structure for drilling into a subterranean formation by rotating bit body 76 about longitudinal axis 80 and applying weight to bit body 76. Bit body 76 may include radially and longitudinally extending blades 77 with leading faces 78 and a threaded pin connection 79 for connecting bit body 76 to a drill string.

At least one cutting element 83 may be coupled to bit body 76. For example, as shown in FIG. 21, a plurality of cutting elements 83 may be coupled to blades 77. Cutting elements 83 may comprise any suitable superabrasive cutting elements, without limitation. In at least one embodiment, cutting elements 83 may be configured according to any of the previously described superabrasive element embodiments and/or superabrasive disc embodiments.

Circumferentially adjacent blades 77 may define so-called junk slots 81 therebetween. Junk slots 81 may be configured to channel debris, such as rock or formation cuttings, away from cutting elements 83 during drilling. Rotary drill bit 75 may also include a plurality of nozzle cavities 82 for communicating drilling fluid from the interior of rotary drill bit 75 to cutting elements 83.

FIG. 21 depicts an example of a rotary drill bit 75 that employs at least one cutting element 83 comprising a superabrasive table fabricated and structured in accordance with the disclosed embodiments, without limitation. For example, a superabrasive table may be coupled to a substrate and then attached to drill bit 75 as discussed in greater detail hereinbelow. Rotary drill bit 75 may additionally represent any number of earth-boring tools or drilling tools, including, for example, core bits, roller-cone bits, fixed-cutter bits, eccentric bits, bicenter bits, reamers, reamer wings, or any other downhole tool including superabrasive cutting elements and discs, without limitation.

The superabrasive elements and discs disclosed herein may also be utilized in applications other than cutting technology. For example, embodiments of superabrasive elements disclosed herein may also form all or part of heat sinks, wire dies, bearing elements, cutting elements, cutting inserts (e.g., on a roller cone type drill bit), machining inserts, or any other article of manufacture as known in the art. Thus, superabrasive elements and discs, as disclosed herein, may be employed in any suitable article of manufacture that includes a superabrasive element, disc, or layer. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. For an example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements as disclosed herein.

Figure 22:
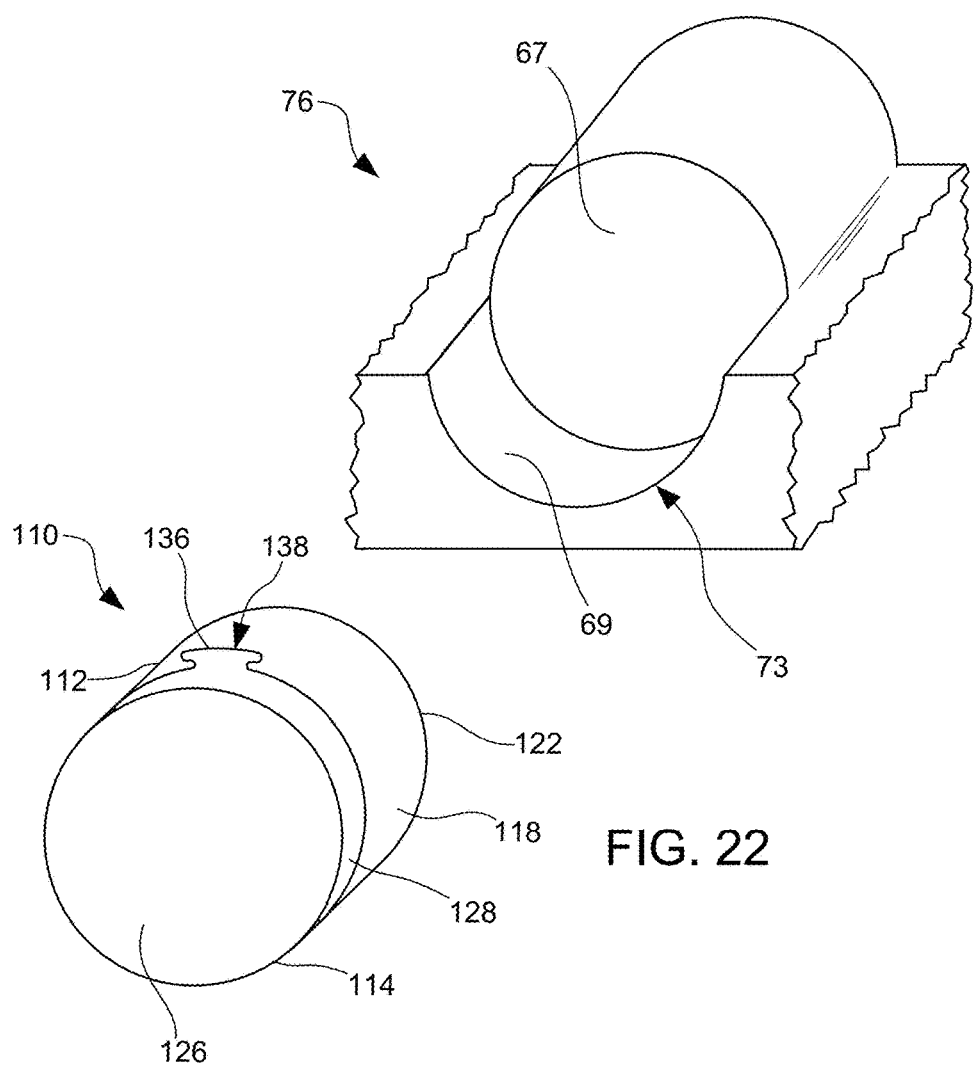
FIG. 22 is a perspective view of a portion of an exemplary drill bit according to at least one embodiment.

FIG. 22 is a perspective view of a portion of an exemplary drill bit 75 according to at least one embodiment. FIG. 22 is a close-up view of the portion of drill bit 75 identified as region A in FIG. 21. Region A of drill bit 75 may include a bit body 76 and a mounting pocket 73. FIG. 22 shows a view of superabrasive element 110 (see, e.g., FIGS. 3 and 7-8B), which is configured to be positioned in mounting pocket 73 defined in bit body 76. Superabrasive element 110 may comprise a superabrasive table 114 attached to a substrate 112. Superabrasive table 114 may include a superabrasive face 126, a superabrasive side surface 128, and a coupling projection 136. Substrate 112 may include a substrate side surface 118, a substrate rear surface 122, and a coupling recess 138 for receiving coupling projection 136 of superabrasive table 114.

Superabrasive element 110 may be brazed, press-fit, or otherwise secured into a preformed pocket, socket, or other receptacle, such as mounting pocket 73, formed in bit body 76 of rotary drill bit 75. For example, mounting pocket 73 may include a rear surface 67 configured to abut substrate rear surface 122 of superabrasive element 110. Additionally, mounting pocket 73 may include a side surface 69 configured to abut substrate side surface 118 and/or superabrasive side surface 128 of superabrasive element 110. In some embodiments, substrate 112 of superabrasive element 110 may be brazed or otherwise joined to an attachment member such as a stud or a cylindrical backing. Generally, rotary drill bit 75 may include one or more PCD cutting elements affixed to bit body 76 of rotary drill bit 75.

While FIG. 22 shows only superabrasive element 110 configured to be mounted in mounting pocket 73 of bit body 76, any of the superabrasive element embodiments described in this application may be attached to bit body 76 in the same or similar manner, or any other suitable manner, without limitation.

Figure 23:
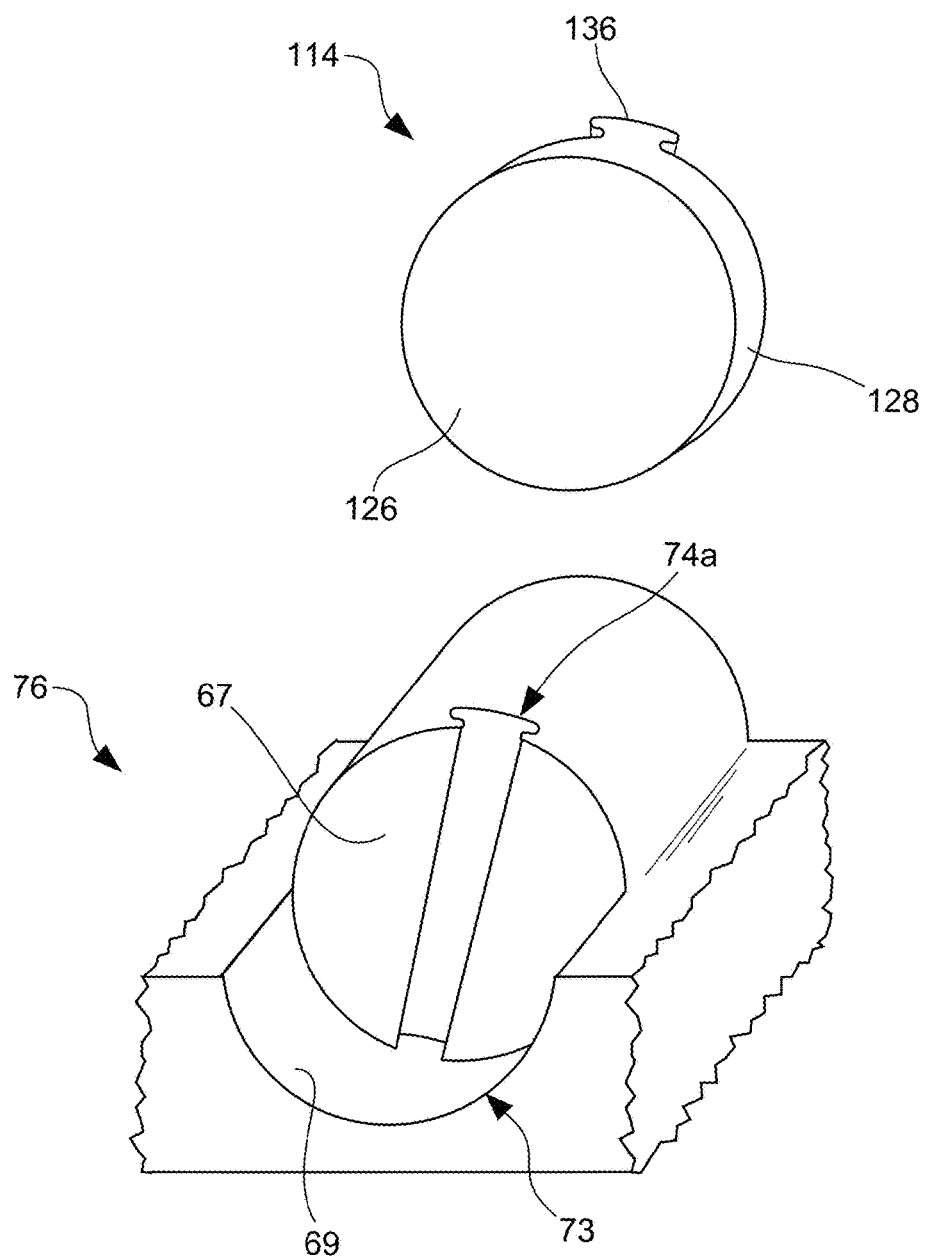
FIG. 23 is a perspective view of a portion of an exemplary drill bit according to at least one embodiment.

In other embodiments any of the superabrasive tables, coupling projections, coupling recesses, and/or combinations thereof disclosed herein, may be employed to attach a superabrasive table directly to the drill bit, as discussed in reference to FIG. 23. FIG. 23 is a perspective view of a portion of exemplary drill bit 75 according to at least one embodiment. FIG. 23 is a close-up view of the portion of drill bit 75 identified as region A in FIG. 21. As illustrated in FIG. 23, region A of drill bit 75 may include a bit body 76 and a mounting pocket 73. Mounting pocket 73 may include a coupling recess 74a formed adjacent to rear surface 67 of mounting pocket 73. FIG. 23 shows a view of superabrasive table 114 having a coupling projection 136 that is configured to be at least partially inserted or positioned within coupling recess 74a defined in mounting pocket 73. Coupling recess 74a may have a shape that is the same as or similar to coupling recess 138 (see, e.g., coupling recess 138 defined in substrate 112 as illustrated in FIGS. 3 and 6A-8B) in order to accommodate coupling projection 136 of superabrasive table 114 (see, e.g., coupling projection 136 and coupling recess 138 as illustrated in FIGS. 3-8B). Additionally, mounting pocket 73 may include a side surface 69 configured to abut superabrasive side surface 128 of superabrasive table 114.

Superabrasive table 114 having coupling projection 136 may be secured in coupling recess 74a through any suitable coupling technique, without limitation. For example, coupling projection 136 of superabrasive table 114 may be secured within coupling recess 74a through, for example, press-fitting, interference-fitting, brazing, welding, sintering, bonding, pin attachment, frictional engagement, threaded attachment, mechanical fastening, and/or through any other suitable attachment technique, without limitation. Accordingly, superabrasive table 114 may be directly secured to bit body 76.

While FIG. 23 shows superabrasive table 114 configured to be mounted in coupling recess 74a of mounting pocket 73, any of the superabrasive table or superabrasive insert embodiments described in this application may be attached to bit body 76 in the same or similar manner. Additionally, coupling recess 74a may be formed to correspond to the shape of any of each corresponding superabrasive table or insert mounted to bit body 76.

Figure 24:
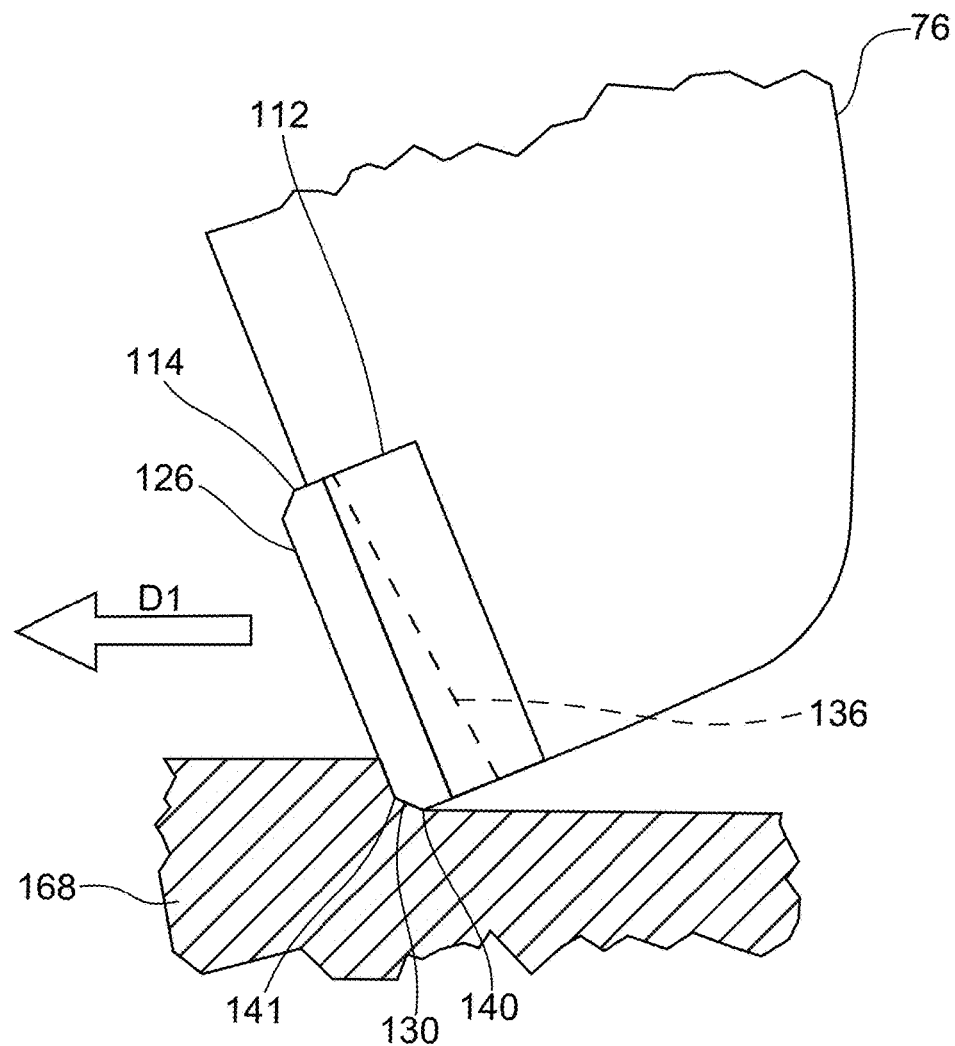
FIG. 24 is a partial cross-sectional side view of an exemplary superabrasive element contacting a formation during drilling according to at least one embodiment.

FIG. 24 illustrates an exemplary superabrasive element 110 during drilling of a formation 168. While superabrasive element 110 is shown in FIG. 24, any of the superabrasive elements, superabrasive tables, and/or superabrasive inserts described in this application may be mounted to bit body 76 in the same or similar manner shown in FIG. 24. Superabrasive elements 110 used as cutting elements may be mounted and oriented on bit body 76 so as to prevent spalling and/or other wear or damage to the superabrasive elements 110. For example, a superabrasive element 110 having a superabrasive table 114 attached to a substrate 112 by a coupling projection 136 of superabrasive table 114 that is at least partially inserted or positioned within a coupling recess 138 defined in substrate 112 may be mounted on bit body 76 such that the orientation of superabrasive element 110 relative to formation 168 results in a desired wear pattern during drilling. Such a wear pattern may result in reduced spalling and/or increased superabrasive element life.

As illustrated in FIG. 24, superabrasive element 110 may be mounted to a bit body 76 of a drill bit (e.g., drill bit 75 illustrated in FIG. 21) at a back rake angle. With superabrasive element 110 mounted at a selected back rake angle, a portion of superabrasive face 126 and superabrasive chamfer 130 may contact and cut through a layer of formation 168, such as a subterranean formation, as superabrasive element 110 is moved in direction D1 relative to formation 168 during drilling. Over time, as superabrasive element 110 is used for drilling formation 168, at least a portion of superabrasive element 110 may become worn through use.

Following extended amounts of drilling, a portion of superabrasive element 110 may become worn down through direct contact with formation 168, thereby forming a wear flat on superabrasive element 110. Having a superabrasive table 114 that is mechanically attached to substrate 112 by means of inserting coupling projection 136 of superabrasive table 114 into coupling recess 138 of substrate 112 may allow for easy installation, repair and replacement should any of superabrasive elements 110 become worn or broken through extended cutting or use. Because of the corresponding tapered shapes of coupling projection 136 and coupling recess 138 and their orientations with respect to formation 168, coupling projection 136 may be forced into and further secured within coupling recess 136 of substrate 112 during drilling. This allows superabrasive table 114 to be firmly attached to substrate 112 and prevents separation of superabrasive table 114 from substrate 112 during operation. Additionally, various stresses may be developed in superabrasive table 114 and/or substrate 112 due to interactions between coupling projection 136 and substrate 112 during drilling; such stresses may result in frictional engagement between superabrasive table 114 and substrate 112 as superabrasive table 114 and substrate 112 are forced against one another, thereby securing superabrasive table 114 to substrate 112 and preventing separation of superabrasive table 114 from substrate 112 during use.

Figure 25:
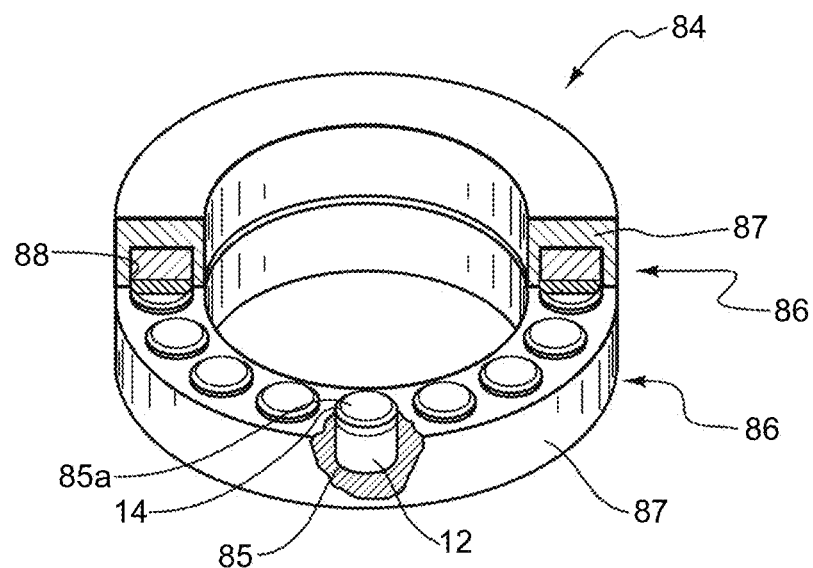
FIG. 25 is a partial cut-away perspective view of an exemplary thrust bearing apparatus according to at least one embodiment.

FIG. 25 is partial cross-sectional perspective view of an exemplary thrust-bearing apparatus 84 according to at least one embodiment. Thrust-bearing apparatus 84 may utilize any of the disclosed superabrasive element embodiments as bearing elements 85. Thrust-bearing apparatus 84 may also include bearing assemblies 86. Each bearing assembly 86 may include a support ring 87 fabricated from a material, such as steel, stainless steel, or any other suitable material, without limitation.

Each support ring 87 may include a plurality of recesses 88 configured to receive corresponding bearing elements 85. Each bearing element 85 may be mounted to a corresponding support ring 87 within a corresponding recess 88 by brazing, welding, press-fitting, using fasteners, or any another suitable mounting technique, without limitation. One or more of bearing elements 85 may be configured in accordance with any of the disclosed superabrasive element embodiments described above. For example, each bearing element 85 may include a substrate and a superabrasive table comprising a PCD material according to any of the above described embodiments. Each superabrasive table may form a bearing surface 85*a*.

Bearing surfaces 85*a* of one bearing assembly 86 may bear against opposing bearing surfaces 85*a* of a corresponding bearing assembly 86 in thrust-bearing apparatus 84, as illustrated in FIG. 25. For example, a first bearing assembly 86 of thrust-bearing apparatus 84 may be termed a "rotor." The rotor may be operably coupled to a rotational shaft. A second bearing assembly 86 of thrust-bearing apparatus 84 may be held substantially stationary relative to the first bearing assembly 86 and may be termed a "stator."

Figure 26:
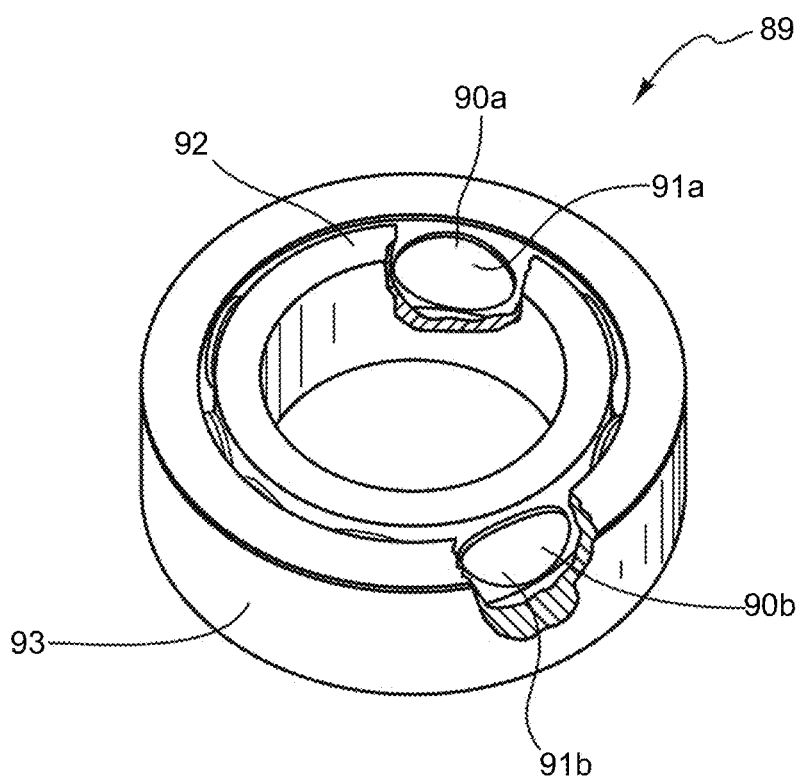
FIG. 26 is a partial cut-away perspective view of an exemplary radial bearing apparatus according to at least one embodiment.

FIG. 26 is a partial cross-sectional perspective view of a radial bearing apparatus 89 according to another embodiment. Radial bearing apparatus 89 may utilize any of the disclosed superabrasive element embodiments as bearing elements 90*a* and 90*b*. Radial bearing apparatus 89 may include an inner race 92 positioned generally within an outer race 93. Inner race 92 may include a plurality of bearing elements 90*b* affixed thereto, and outer race 93 may include a plurality of corresponding bearing elements 90*b* affixed thereto. One or more of bearing elements 90*a* and 90*b* may be configured in accordance with any of the superabrasive element embodiments disclosed herein.

Inner race 92 may be positioned generally within outer race 93. Thus, inner race 92 and outer race 93 may be configured such that bearing surfaces 91*a* defined by bearing elements 90*a* and bearing surfaces 91*b* defined by bearing elements 90*b* may at least partially contact one another and move relative to one another as inner race 92 and outer race 93 rotate relative to each other. According to various embodiments, thrust-bearing apparatus 84 and/or radial bearing apparatus 89 may be incorporated into a subterranean drilling system.

Figure 27:
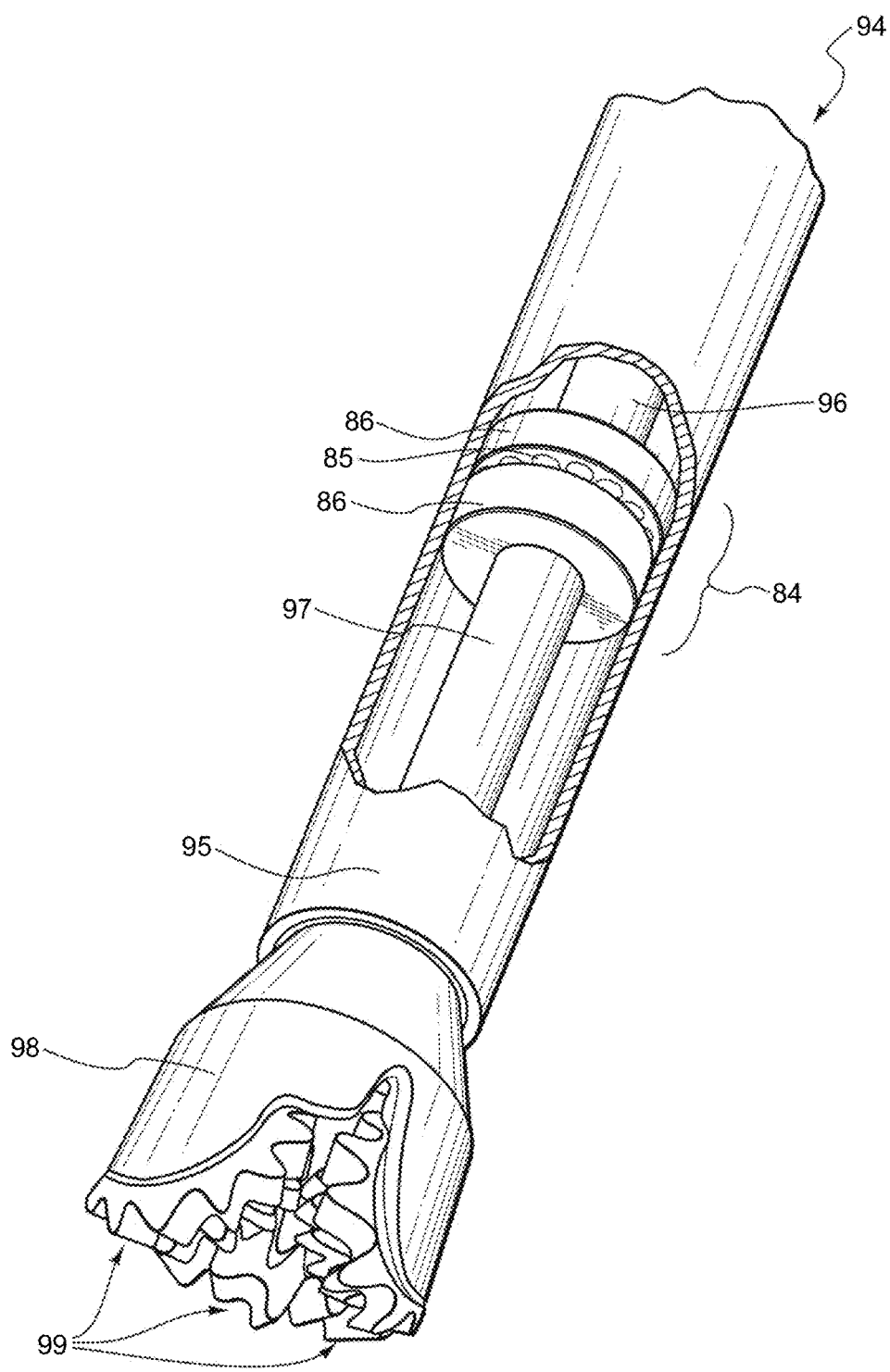
FIG. 27 is a partial cut-away perspective view of an exemplary subterranean drilling system according to at least one embodiment.

FIG. 27 is a partial cross-sectional perspective view of an exemplary subterranean drilling system 94 that includes a thrust-bearing apparatus 84, as shown in FIG. 25, according to at least one embodiment. Subterranean drilling system 94 may include a housing 95 enclosing a downhole drilling motor 96 (i.e., a motor, turbine, or any other suitable device capable of rotating an output shaft, without limitation) that is operably connected to an output shaft 97.

The thrust-bearing apparatus 84 shown in FIG. 25 may be operably coupled to downhole drilling motor 96. A rotary drill bit 98, such as a rotary drill bit configured to engage a subterranean formation and drill a borehole, may be connected to output shaft 97. As illustrated in FIG. 27, rotary drill bit 98 may be a roller cone bit comprising a plurality of roller cones 99. According to additional embodiments, rotary drill bit 98 may comprise any suitable type of rotary drill bit, such as, for example, a so-called fixed-cutter drill bit. As a borehole is drilled using rotary drill bit 98, pipe sections may be connected to subterranean drilling system 94 to form a drill string capable of progressively drilling the borehole to a greater depth within a subterranean formation.

A first thrust-bearing assembly 86 in thrust-bearing apparatus 84 may be configured as a rotor that is attached to output shaft 97 and a second thrust-bearing assembly 86 in thrust-bearing apparatus 84 may be configured as a stator. During a drilling operation using subterranean drilling system 94, the rotor may rotate in conjunction with output shaft 97 and the stator may remain substantially stationary relative to the rotor.

According to various embodiments, drilling fluid may be circulated through downhole drilling motor 96 to generate torque and effect rotation of output shaft 97 and rotary drill bit 98 attached thereto so that a borehole may be drilled. A portion of the drilling fluid may also be used to lubricate opposing bearing surfaces of bearing elements 85 on thrust-bearing assemblies 86.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A superabrasive element, comprising:
   at least one superabrasive table including at least one coupling projection, the at least one coupling projection tapering in a width direction and in a height direction, and comprising:
      a narrow portion;
      a wide portion having a greater width than the narrow portion;
   a substrate defining at least one coupling recess, the at least one coupling recess extending from a narrow portion to a wide portion;
   wherein:
      at least a portion of the at least one coupling projection of the at least one superabrasive table is disposed in the at least one coupling recess defined in the substrate such that the narrow portion of the at least one coupling projection is adjacent to the narrow portion of the at least one coupling recess and the wide portion of the at least one coupling projection is adjacent to the wide portion of the at least one coupling recess;
      the at least one coupling projection and the at least one coupling recess mechanically couple the at least one superabrasive table to the substrate.

2. The superabrasive element according to claim 1, wherein the at least one coupling projection is brazed to the at least one coupling recess.

3. The superabrasive element according to claim 1, wherein at least one gap is defined between the superabrasive table and the substrate.

4. The superabrasive element according to claim 1, wherein the coupling recess narrows along a direction extending inward from a side surface of the substrate.

5. The superabrasive element according to claim 1, wherein the at least one superabrasive table comprises a cylindrical surface.

6. The superabrasive element according to claim 1, wherein:

the at least one coupling recess comprises a plurality of coupling recesses;

the at least one superabrasive table comprises a plurality of coupling projections, at least a portion of each of the plurality of coupling projections being disposed in a corresponding one of the plurality of coupling recesses, respectively.

7. The superabrasive element according to claim 1, wherein the substrate includes a first substrate portion and a second substrate portion, the first substrate portion comprising a different material than the second substrate portion.

8. The superabrasive element according to claim 7, wherein the second substrate portion is disposed between the superabrasive table and the first substrate portion.

9. The superabrasive element according to claim 8, wherein at least a portion of the coupling recess is defined in the second substrate portion.

10. The superabrasive element according to claim 9, wherein at least another portion of the coupling recess is defined in the first substrate portion.

11. The superabrasive element according to claim 1, wherein the at least one superabrasive table is at least partially leached.

12. The superabrasive element according to claim 11, wherein the coupling projection is unleached.

13. The superabrasive element according to claim 11, wherein the at least one superabrasive table is substantially completely leached.

14. The superabrasive element according to claim 1, wherein the at least one superabrasive table comprises a plurality of separate superabrasive inserts.

15. The superabrasive element according to claim 1, further comprising an intervening superabrasive table positioned between the at least one superabrasive table and the substrate.

16. The superabrasive element according to claim 1, wherein a malleable material is disposed in the at least one coupling recess between the at least one superabrasive table and the substrate.

17. The superabrasive element according to claim 16, wherein the malleable material is a shim.

18. The superabrasive element according to claim 16, wherein the malleable material is a coating.

19. The superabrasive element according to claim 16, wherein the malleable material comprises a metallic material.

20. The superabrasive element according to claim 1, wherein the at least one superabrasive table comprises a polycrystalline diamond material.

* * * * *